(12) United States Patent
Urban et al.

(10) Patent No.: US 12,460,166 B2
(45) Date of Patent: Nov. 4, 2025

(54) CELL CULTURE SYSTEM WITH CONTROLLED GAS TRANSFER BOUNDARY CONDITIONS

(71) Applicant: Nextern Innovation, LLC, White Bear Lake, MN (US)

(72) Inventors: Jon F. Urban, Minneapolis, MN (US); Riazul Islam, St. Paul, MN (US); John Swoyer, Blaine, MN (US); Fernando Buarque, White Bear Lake, MN (US); John D. Foley, Libertyville, IL (US)

(73) Assignee: Nextern Innovation, LLC, White Bear Lake, MN (US)

( * ) Notice: Subject to any disclaimer, the term of this patent is extended or adjusted under 35 U.S.C. 154(b) by 0 days.

(21) Appl. No.: 18/705,278

(22) PCT Filed: Oct. 28, 2022

(86) PCT No.: PCT/US2022/078924
§ 371 (c)(1),
(2) Date: Apr. 26, 2024

(87) PCT Pub. No.: WO2023/077096
PCT Pub. Date: May 4, 2023

(65) Prior Publication Data
US 2025/0011701 A1    Jan. 9, 2025

Related U.S. Application Data

(60) Provisional application No. 63/381,519, filed on Oct. 28, 2022, provisional application No. 63/263,283, filed on Oct. 29, 2021.

(51) Int. Cl.
C12M 1/04     (2006.01)
C12M 1/00     (2006.01)
(Continued)

(52) U.S. Cl.
CPC ............ *C12M 23/24* (2013.01); *C12M 23/40* (2013.01); *C12M 23/44* (2013.01); *C12M 23/54* (2013.01);
(Continued)

(58) Field of Classification Search
None
See application file for complete search history.

(56) References Cited

U.S. PATENT DOCUMENTS

| 4,906,577 A | 3/1990 | Armstrong et al. |
| 4,937,196 A | 6/1990 | Wrasidlo et al. |

(Continued)

FOREIGN PATENT DOCUMENTS

| CN | 215460745 U | | 1/2022 |
| EP | 307048 A | * | 3/1989 |

(Continued)

OTHER PUBLICATIONS

Bakmiwewa, et al.; "An effective, low-cost method for achieving and maintaining hypoxia during cell culture studies," BioTechniques.com, vol. 59, No. 4, 2015, 5 pages.
(Continued)

*Primary Examiner* — William H. Beisner
(74) *Attorney, Agent, or Firm* — Definitive Patents, member Synchrony IP; Timothy D. Snowden; Yau H. Chan

(57) ABSTRACT

Apparatus and associated methods relate to cell culture systems having controlled gas concentration boundary conditions around cell culture. In an illustrative example, a programmable cell culture system (PCCS) may include one or more manifolds, each releasably coupled to multiple cell culture modules. The cell culture modules, for example, may include a nutrient capacitive medium (NCM) in fluid communication with a concentration-controlled gas source
(Continued)

through at least two gas transfer interfaces. The gas transfer interfaces (GTIs) may, for example, be spatially distributed in relation to a cell growth surface in the NCM. Each GTI, for example, may include a gas permeable membrane (GPM) and a plenum. The GPM may be disposed between the plenum and the NCM. Various embodiments may advantageously selectively control a concentration of at least one target gas in the NCM by maintaining predetermined boundary conditions of the cell growth surface via the GTIs.

25 Claims, 37 Drawing Sheets

(51) Int. Cl.
*C12M 1/12* (2006.01)
*C12M 1/34* (2006.01)
*C12M 1/36* (2006.01)
*C12M 3/00* (2006.01)

(52) U.S. Cl.
CPC ............ *C12M 25/06* (2013.01); *C12M 29/04* (2013.01); *C12M 41/34* (2013.01); *C12M 41/48* (2013.01)

(56) References Cited

U.S. PATENT DOCUMENTS

| | | | |
|---|---|---|---|
| 6,048,721 A | 4/2000 | Armstrong et al. | |
| 10,087,925 B2 | 10/2018 | Douglas et al. | |
| 11,124,754 B2 | 9/2021 | Douglas et al. | |
| 11,285,471 B2 | 3/2022 | Douglas et al. | |
| 2002/0055166 A1 | 5/2002 | Cannon et al. | |
| 2004/0077075 A1 | 4/2004 | Jensen et al. | |
| 2006/0199260 A1 | 9/2006 | Zhang et al. | |
| 2008/0227176 A1 | 9/2008 | Wilson | |
| 2008/0248552 A1 | 10/2008 | Castillo Fernandez | |
| 2009/0098593 A1 | 4/2009 | Ehrhardt et al. | |
| 2009/0111180 A1 | 4/2009 | Vilendrer et al. | |
| 2010/0076380 A1 | 3/2010 | Hui | |
| 2010/0291674 A1 | 11/2010 | Beese et al. | |
| 2011/0020863 A1 | 1/2011 | Coger et al. | |
| 2016/0086784 A1 | 3/2016 | Brekenfeld et al. | |
| 2018/0187139 A1 | 7/2018 | Patel | |
| 2019/0284518 A1 | 9/2019 | Feng et al. | |
| 2021/0214668 A1 | 7/2021 | Kilpatrick et al. | |
| 2023/0220323 A1* | 7/2023 | Hashimoto | C12M 23/06 435/289.1 |

FOREIGN PATENT DOCUMENTS

| | | |
|---|---|---|
| EP | 2674480 A1 | 12/2013 |
| JP | 2015198619 A | 11/2015 |
| WO | 1995004813 | 2/1995 |
| WO | 2022093882 A1 | 5/2022 |

OTHER PUBLICATIONS

Chapter II Demand Brief and Amended Claims filed in related PCT Application Serial No. PCT/US2022/078924 on Aug. 29, 2023.
Corning Incorporated. "Corning® CellSTACK® Culture Chambers." 2011. Accessed: Oct. 4, 2022. [Online]. Available: https://cdn.stemcell.com/media/files/manual/MADX21631-Corning_CellSTACK_Culture_Chambers.pdf.
Corrected Demand Brief and Amended Claims filed in related PCT Application Serial No. PCT/US2022/078924 on Oct. 9, 2023.
International Preliminary Report on Patentability, issued Dec. 5, 2023 by the USPTO in Application No. PCT/US2022/078924, 5 pages.
International Search Report and Written Opinion, issued Feb. 14, 2023 by the European Patent Office in Application No. PCT/US2022/078924, 14 pages.
Pavlacky and Polak, Technical Feasibility and Physiological Relevance of Hypoxic Cell Culture Models, Frontiers in Endocrinology, Feb. 21, 2020, 15 pages.
ScaleReady USA. "G-Rex® closed-system bioreactors: Predictable, scalable cell expansion." ScaleReady. Accessed: Oct. 4, 2022. [Online]. Available: https://www.scaleready.com/product/g-rex-closed-system-bioreactors/.

\* cited by examiner

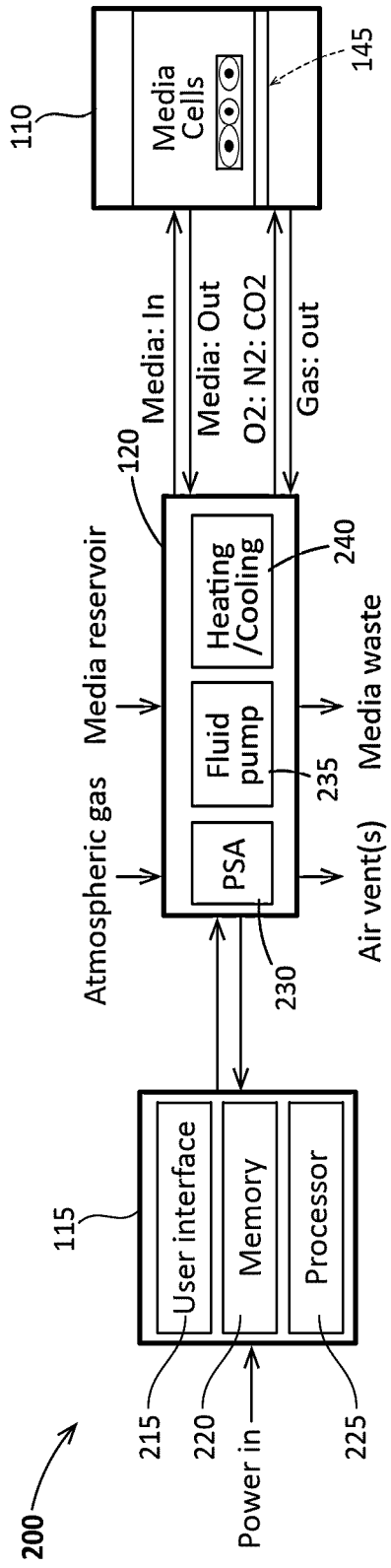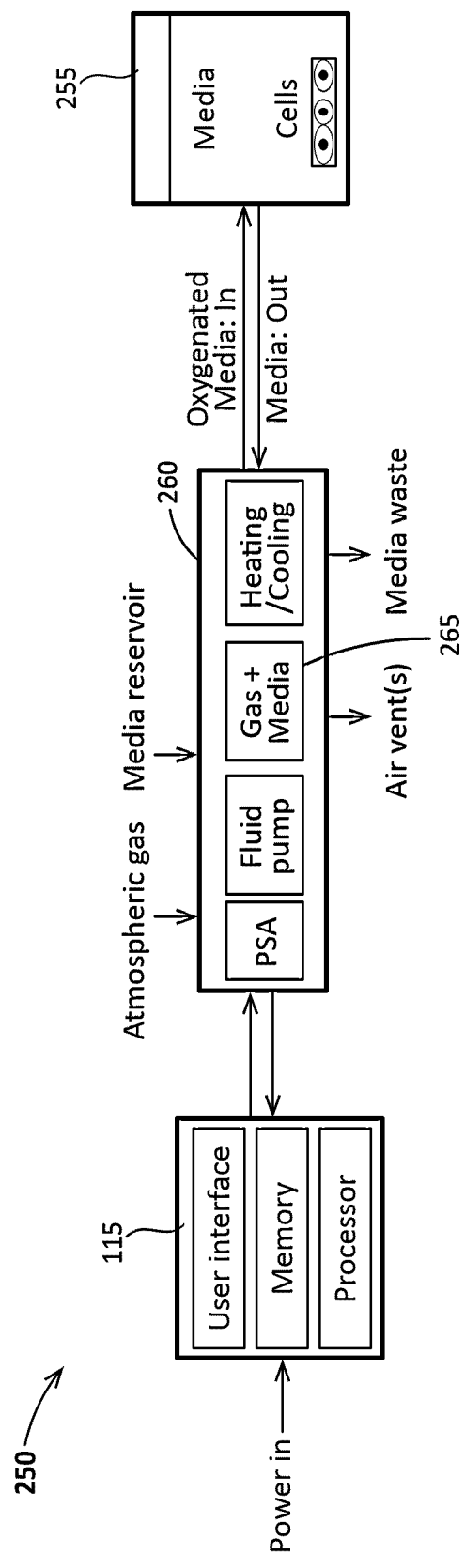

CELL CULTURE SYSTEM WITH CONTROLLED GAS TRANSFER BOUNDARY CONDITIONS

CROSS-REFERENCE TO RELATED APPLICATIONS

This application is a national stage application under 35 U.S.C. 371 of and claims the benefit of PCT application serial number PCT/US2022/078924, titled "CONTROLLED BIOREACTOR BOUNDARY CONDITIONS," filed by Nextern Innovation, LLC, on Oct. 28, 2022, which application both claims the benefit of U.S. Provisional Application Ser. No. 63/381,519, titled "CONTROLLED BIOREACTOR BOUNDARY CONDITIONS," filed by Jon F. Urban, et al., on Oct. 28, 2022, and also claims the benefit of priority of U.S. Provisional Application Ser. No. 63/263,283, titled "CONTROLLED BIOREACTOR BOUNDARY CONDITIONS," filed by Jon F. Urban, et al., on Oct. 29, 2021.

This application incorporates the entire contents of the foregoing application(s) herein by reference.

TECHNICAL FIELD

Various embodiments relate generally to actively controlled cell culture environments.

BACKGROUND

A cell culture or a tissue culture is the process by which cells are grown under controlled conditions, generally outside their natural environment. In some examples, flasks may be used to do basic cell culture research. Cultured cells may consume oxygen dissolved in fluid media within the flask. Once consumed, the oxygen may, for example, be replaced from ambient air. For example, researchers may change the fluid media on a daily basis.

Cell cultures sometimes may be developed in $CO_2$ incubators that require $CO_2$ gas supply. In some examples, some labs may control $O_2$ concentration by using hypoxic chambers and incubators. For example, large hypoxic workstations and/or hypoxic chambers may be used to control $CO_2$ and $N_2$.

For some cell cultures, environmental conditions are controlled by incubators. The incubators may range in size and expense. Standard incubators may include a control for temperature and carbon dioxide. Standard cell growth may, for example, follow a phased curve. The growth of the cell culture may sometimes be limited by an availability of reactants and accumulation of wastes. Typically, cell cultures may include media exchanges to replenish reactants and expel the wastes.

SUMMARY

Apparatus and associated methods relate to cell culture systems having controlled gas concentration boundary conditions around cell culture. In an illustrative example, a programmable cell culture system (PCCS) may include one or more manifolds, each releasably coupled to multiple cell culture modules. The cell culture modules, for example, may include a nutrient capacitive medium (NCM) in fluid communication with a concentration-controlled gas source through at least two gas transfer interfaces. The gas transfer interfaces (GTIs) may, for example, be spatially distributed in relation to a cell growth surface in the NCM. Each GTI, for example, may include a gas permeable membrane (GPM) and a plenum. The GPM may be disposed between the plenum and the NCM. Various embodiments may advantageously selectively control a concentration of at least one target gas in the NCM by maintaining predetermined boundary conditions of the cell growth surface via the GTIs.

Various embodiments may achieve one or more advantages. For example, some embodiments may reduce oxygen gradient in the NCM. Some embodiments, for example, may advantageously control temperature in the cell culture modules. For example, some embodiments may advantageously reduce labor requirement by providing a programmable control of the PCCS. Some embodiments may advantageously allow growing a large number of adherent cells in a limited volume. Some embodiments may advantageously allow, for example, scalability of cell cultures in the PCCS. Some embodiments may, for example, advantageously provide on-demand gas mixture supply using atmospheric gas. For example, some embodiments may advantageously reduce a space requirement of the PCCS. Some embodiments may, for example, advantageously provide real-time control over bioreactor parameters.

The details of various embodiments are set forth in the accompanying drawings and the description below. Other features and advantages will be apparent from the description and drawings, and from the claims.

BRIEF DESCRIPTION OF THE DRAWINGS

FIG. 2A and FIG. 2B are block diagrams depicting embodiments of exemplary PCCS having a cell culture chamber.

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a programmable cell culture system (PCCS) is introduced with reference to FIGS. 1-4. Second, that introduction leads into a description with reference to FIGS. 5-13 of some exemplary embodiments of portable PCCS. Third, with reference to FIGS. 14-21B, this document describes exemplary apparatus and methods useful for scaling of PCCS. Fourth, with reference to FIGS. 22-26, the discussion turns to exemplary embodiments that illustrate perfusion effects in exemplary PCCS. Fifth, and with reference to FIG. 27-30, this disclosure turns to a review of experimental data and a discussion of oxygen gradients within a bioreactor with a plenum and membrane structure. Sixth, some embodiments are designed with reference to 31-33 for designing a boundary condition controlling bioreactor (BCCB). An exemplary BCCB structure is reviewed with reference to FIGS. 34A-36D. Seventh, the document introduces methods to design and to operate a BCCB with reference to FIGS. 37-38. Finally, the document discusses further embodiments, exemplary applications and aspects relating to PCCS.

Figure 1:
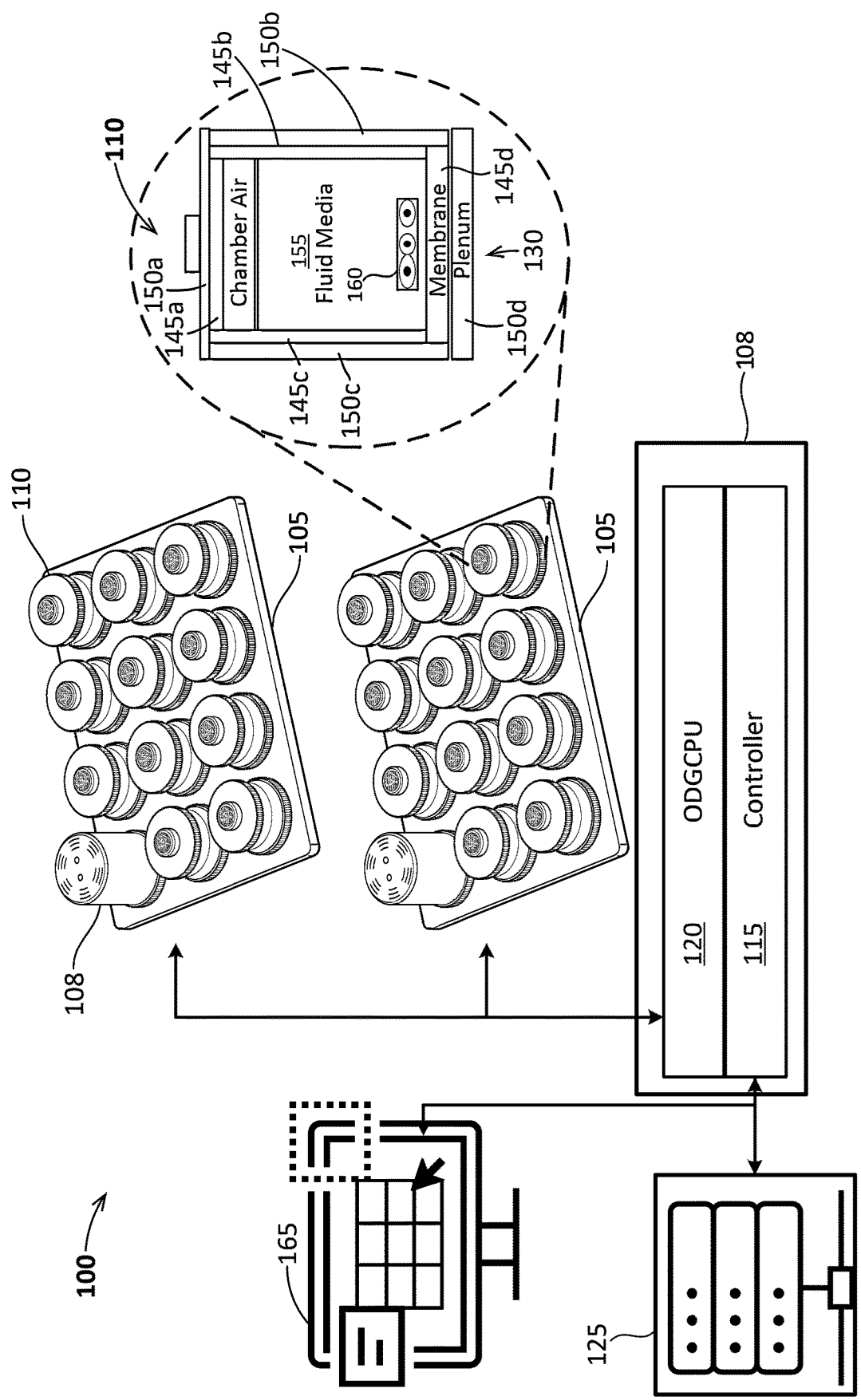
FIG. 1 depicts an exemplary programmable cell culture system (PCCS) employed in an illustrative use-case scenario.

FIG. 1 depicts an exemplary programmable cell culture system (PCCS) employed in an illustrative use-case scenario. A PCCS 100 includes, in this example, two portable cell culture manifolds (PCCM 105). For example, the PCCM 105 may provide a controlled cell culture environment for different types of cells at different phases of cell growth. As shown, the PCCM 105 is controlled by a control unit 108. The control unit 108 includes a controller 115 and an on-demand gas concentrator and pump unit (ODGCPU 120). The controller 115 may, for example, be a controlling device having a processor that executes program instructions stored in a memory module. For example, the controller may be a hardware circuit that adjusts boundary conditions (e.g., gas supply, temperature, humidity, osmotic pressure, acidity) at boundary conditions controlling bioreactor (BCCB 110) of the PCCM 105. For example, the BCCB 110 may be a cell culture module. For example, the BCCB 110 may be a bioreactor. The ODGCPU 120 may supply gas (e.g., oxygen, nitrogen, carbon dioxide) to the PCCM 105. For example, the ODGCPU 120 may remove waste gas from the PCCM 105. In various implementations, the controller 115 may control the ODGCPU 120 to dynamically maintain a steady boundary conditions of the BCCB 110. Accordingly, the PCCS 100 may advantageously reduce labor to manually monitor the BCCB 110. In some examples, the PCCS 100 may reduce chances of cell contamination at cell cultures in the BCCB 110.

As shown, the controller 115 is coupled to a programming server 125. In some implementations, the programming server 125 may include programmed instructions to control an environment of the PCCM 105 based on, for example, environmental conditions, progress in a corresponding cell culture process, research goals, and/or a combination thereof. For example, the programming server 125 may provide the PCCS 100 a programmable cell culture bioreactor to advantageously deliver specific (e.g., cell type and/or growth phase) conditions of oxygen and/or other gas mixture. In some implementations, the programming server 125 may include a data storage to store experimental results of the PCCS 100. For example, a researcher may retrieve experimental results and data to reproduce previous experimental results.

As shown in FIG. 1, the BCCB 110 includes a gas supply inlet 130. For example, the gas supply inlet 130 may be coupled to the ODGCPU 120 to receive gas/nutrients. For example, the gas supply inlet 130 may remove waste from the BCCB 110. The gas supply inlet 130 may include an inlet for receiving a desired gas mix, a culture media mix. The gas supply inlet 130 may also include outlets for releasing the circulated gas and wasted media. The BCCB 110 may, in some implementations, be detached from the rest of the system. For example, the BCCB 110 may be portably transferred from one PCCM 105 to another.

As shown in a close-up diagram in FIG. 1, the BCCB 110 includes gas permeable membranes 145a, 145b, 145c, 145d on a full perimeter of the BCCB 110. The gas permeable membranes 145a, 145b, 145c, 145d are further surrounded by plenum 150a, 150b, 150c, 150d. For example, the plenum 150a, 150b, 150c, 150d may form a sealed chamber to enable a non-ambient desired gas mix appropriate for cell culture. As shown, the plenum 150a, 150b, 150c, 150d interfaces with fluid media 155 through the membrane 145a, 145b, 145c, 145d. For example, the fluid media 155 may be a nutrient capacitive medium. For example, the nutrient capacitive medium may include a capacitance to hold oxygen. For example, the membrane 145a, 145b, 145c, 145d may be gas permeable enabling oxygen, nitrogen, carbon dioxide, and/or other gases to move between the plenum 150a, 150b, 150c, 150d and the fluid media 155. For example, the membrane 145a, 145b, 145c, 145d may be made with silicone.

In some implementations, from the gas supply inlet 130, gases may diffuse into the BCCB 110 through the gas permeable membranes 145a, 145b, 145c, 145d from the plenum 150a, 150b, 150c, 150d. For example, the gas permeable membranes 145a, 145b, 145c, 145d and the plenum 150a, 150b, 150c, 150d may form a gas transfer interface from a gas source (e.g., controllable gas source). In some implementations, the gas permeable membranes 145a, 145b, 145c, 145d and the plenum 150a, 150b, 150c, 150d are specifically placed so that a gas diffusion distance to the cells being cultured are predetermined. In some examples, gas concentrations at the cell cultures may be controlled by controlling distance of the culture to the gas permeable membranes 145a, 145b, 145c, 145d and the plenum 150a, 150b, 150c, 150d. For example, the gas permeable membranes 145a, 145b, 145c, 145d and the plenum 150a, 150b, 150c, 150d may advantageously be used to control environmental variables in the BCCB 110. Further discussion of such effects are described, by way of example and not limitation, with reference to FIGS. 28-30.

In various implementations, the BCCB 110 may control an oxygen concentration at the membrane 145a, 145b, 145c, 145d at a predetermined gas mix set by the user (e.g., through the controller 115). For example, the predetermined gas mix may be specific to a cell culture being expanded. In some examples, the predetermined gas mix may be non-ambient, differing from surrounding environments.

The predetermined gas mixture may, in some implementations, be adjusted by the controller 115 with PSA applied to generate a desired amount of nitrogen/oxygen mixture. As shown, a surface area of the membrane 145a, 145b, 145c, 145d may be expanded to one or multiple sides of the BCCB 110 to reduce the oxygen gradient in the fluid media 155. The membrane 145a, 145b, 145c, 145d may be disposed at a bottom and sides of the BCCB 110. In some examples, the membrane 145a, 145b, 145c, 145d may be disposed at the center, top, of the BCCB 110 and/or within the fluid media 155. As shown, a remote computer 165 may also access the experimental data stored in the control unit 108. In some embodiments, the remote computer 165 may remotely access the programming server 125 to adjust or import experimental protocols at the PCCS 100.

In various implementations, the PCCS 100 may include one or more (portable) BCCB 110 independently and releasably coupled to a PCCM 105 such that a nutrient capacitive medium (e.g., the fluid media 155) within each BCCB 110 may include a gas reservoir of predetermined controlled concentrations. For example, the gas reservoir may be supplied through at least two gas transfer interfaces (e.g., the plenum 150 and the gas permeable membrane 145) spatially distributed in relation to a cell growth surface in the nutrient capacitive medium. For example, each gas transfer interface may be in gas communication with the PCCM 105 and with the gas permeable membrane 145. For example, the ODGCPU 120 may control a concentration of at least one target gas in the BCCB 110 at the cell culture 160 by maintaining predetermined boundary conditions of the cell culture 160 via the gas transfer interfaces.

FIG. 2A and FIG. 2B are block diagrams depicting embodiments of exemplary PCCS having a cell culture chamber. As shown in FIG. 2A, a PCCS 200 includes the BCCB 110, the controller 115 and the ODGCPU 120. The controller 115 includes a user interface 215, a memory 220, and a processor 225. For example, from the user interface 215, the controller 115 may receive input selections from a user (e.g., a researcher) regarding a desired environment for a cell culture, generate environment profile (e.g., digital environment profile), and/or store profile. For example, the controller 115 may process the user selections using the processor 225 based on a program stored in the memory 220. For example, the program may include a predetermined set of rules for a cell culture experiment. In some implementations, the predetermined set of rules may include a predetermined concentration of delivered gas mix to meet a corresponding cell growth phase with specific oxygenation demand.

In some implementations, the controller 115 may implement the user selections by controlling the ODGCPU 120. The ODGCPU 120 may, for example, control gas pressure, flow rate, humidity, temperature, and/or purity. The ODGCPU 120 may supply gas to the BCCB 110 via the gas permeable membrane 145. In this example, the ODGCPU 120 includes a pressure switching adsorption module (PSA 230, also known as pressure swing adsorption), a fluid pump 235, and a temperature control unit (TCU 240). The PSA 230 may intake atmospheric gas to generate a gas mixture specified by the controller 115. For example, the TCU 240 may control gas pressure, flow rate, humidity, temperature, and purity based on received instructions. The fluid pump 235 may, for example, automate media perfusion at the BCCB 110. In some implementations, the fluid pump 235 may automatically harvest cells at an end of culture period by pumping out the fluid media 155 in the BCCB 110.

In some implementations, the controller 115 may receive a user-specified program to control gas concentration at different growth phases. For example, as cell culture progresses, the user may use the controller 115 to program for temporal variation of $O_2$ concentration to ensure cell viability. The memory 220 may store various programmable protocols for an entire culture duration before starting cell culture, for example. In some implementations, the controller 115 may allow a user to create cell culture protocol instructions to control varying gas mix, gas pressure, flow rate, pH humidity, temperature, and purity, with respect to time.

In some implementations, the protocol may be programmed remotely from the PCCS 200 (e.g., at the programming server 125. For example, the protocol may be uploaded to the controller 115. In some implementations, the protocol may be created using the user interface 215. In some implementations, the protocol may include rules to automatically modify and adjust for seed cell density, media volume, cell type, and/or other conditions inputted by the user. For example, the protocols may be accurately and conveniently replicated to other PCCS without manual input.

In some implementations, the memory 220 may include predefined protocols. For example, a cell culture bioreactor manufacturer may preprogram the memory to include protocols for various sets of protocols for various cell types, cell densities, culture volumes, durations, and/or other environmental charge requirements by loading optimized culture protocols into the memory 220. In various implementations, the PCCS 200 may allow the user to advantageously create a cell specific precise microenvironment and maintain a controlled environment during various culturing phases.

As shown in FIG. 2B, a PCCS 250 includes a BCCB 255 coupled to a ODGCPU 260. In this example, the PCCS 250 may perfuse media outside of the BCCM. The ODGCPU 260 includes a mixing unit 265 to oxygenate or deoxygenate the fluid media 155 with concentrated oxygen, for example. In some implementations, the oxygenated or deoxygenated media may be directly delivered to the BCCB 255. For example, the mixing unit 265 may eliminate a need for separate connections for gas and media delivery to the BCCB 255.

Figure 3:
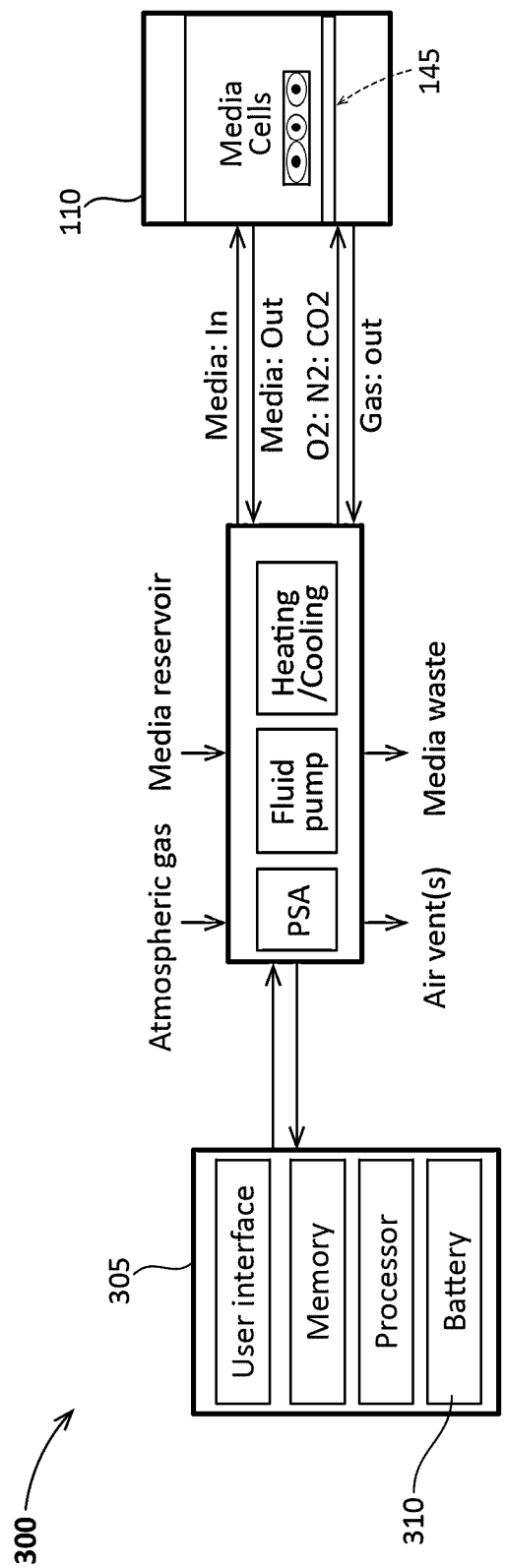
FIG. 3 is a block diagram depicting an exemplary PCCS having a battery unit.

FIG. 3 is a block diagram depicting an exemplary PCCS 300 having a battery unit. The PCCS 300 includes a portable controller 305. As shown, the portable controller 305 includes a battery 310. For example, the portable controller 305 may advantageously allow portability operations (e.g., transferring from benches to benches, from labs to labs, from labs to conferences) without continuously connecting to a power source.

Figure 4:
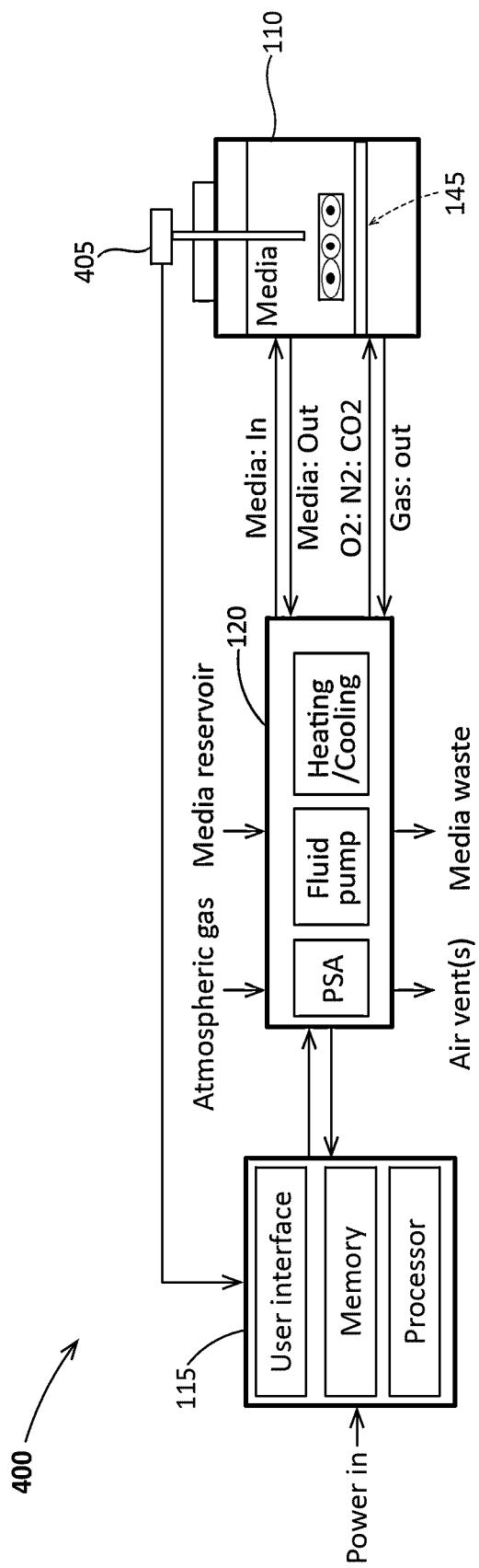
FIG. 4 is a block diagram depicting an exemplary PCCS having an exemplary sensor unit.

FIG. 4 is a block diagram depicting an exemplary PCCS 400 having an exemplary sensor unit 405. As shown, the exemplary sensor unit 405 may be one or more sensors (e.g., for measuring dissolved oxygen, pH, temperature, humidity, chemical sensing). The exemplary sensor unit 405 may be embedded or submerged in the BCCB 110 to provide accurate measurements. The controller 115 may receive data from the exemplary sensor unit 405. Based on the received data, the controller 115 may generate control signals to the ODGCPU 120 to regulate conditions at the BCCB 110. In some examples, the controller 115 may save the received measurement data. For example, the saved data may be used by one or more programmable protocols at a future time. In various embodiments, the exemplary PCCS 400 may record actual gas concentration at the BCCB 110 and control the actual gas concentration during a development of a cell culture in the BCCB 110.

Figure 5:
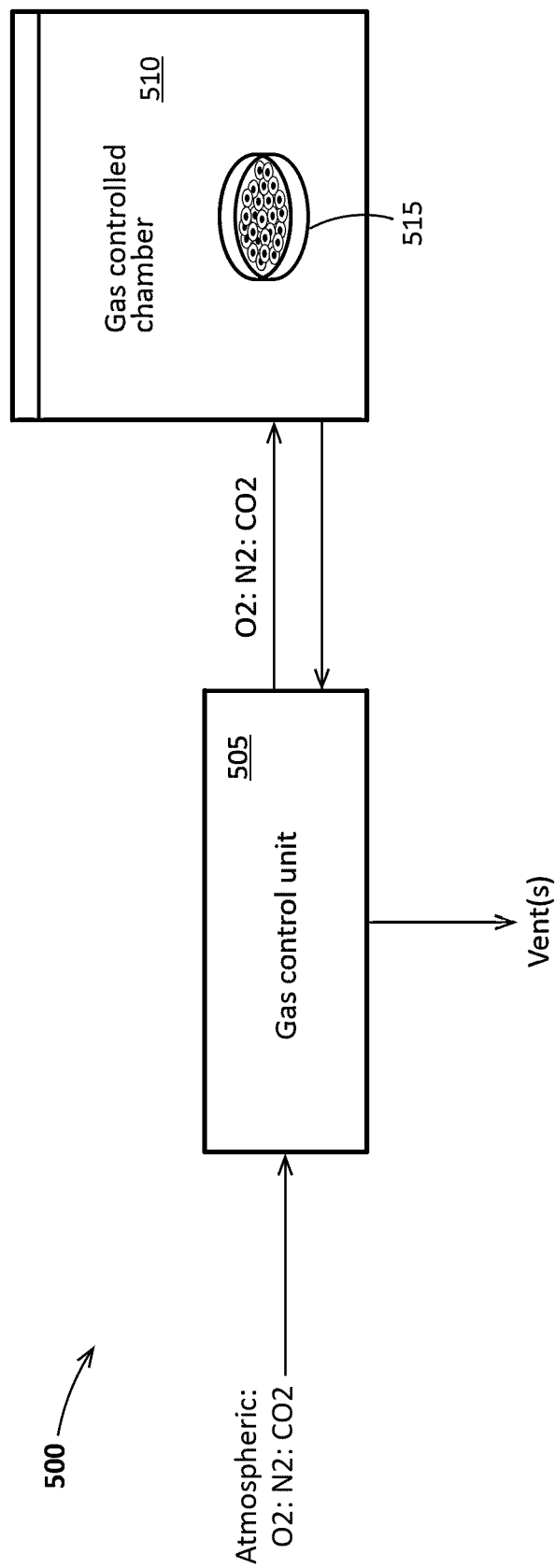
FIG. 5 is a block diagram depicting an exemplary PCCS having a gas control unit.

FIG. 5 is a block diagram depicting an exemplary PCCS having a gas control unit. In this example, a PCCS 500 includes a gas control unit (GCU 505). The GCU 505 may intake atmospheric gas (e.g., O2, N2, CO2) as shown in FIG. 5. In some implementations, using a PSA (e.g., the PSA 230) the GCU 505 may generate a predetermined gas mixture (of predetermined portion of O2, N2, CO2) using the atmospheric gas. In various embodiments, the GCU 505 may advantageously generate the predetermined gas mixture without using consumable gas supply (e.g., in a form of a canister).

The GCU 505 supplies an output gas of the generated gas mixture to a gas controlled chamber (e.g., the BCCB 110). In various embodiments, the gas controlled chamber 510 may receive non-atmospheric predetermined gas concentration (e.g., O2, N2). For example, the GCU 505 may selectively vary oxygen concentration of the output gas based on a measured or calculated demand to replenish gas supply. As shown, the gas controlled chamber 510 includes a (e.g., benchtop) cell culture vessel 515 (e.g., flasks, dish, well). For example, the gas controlled chamber 510 may control cell culture gas conditions of the cell culture vessel 515. For example, the gas controlled chamber 510 may house multiple cell culture vessels 515. The multiple cell culture vessels may, for example, be exposed to a same atmospheric gas mix. In certain embodiments the gas mix can be controlled using one or more sensors (e.g., the exemplary sensor unit 405).

In some implementations, the GCU 505 may be configured to deliver an output gas with oxygen concentration from 0% to 100% without requiring a gas cylinder or other preconcentrated gas supply. In some implementations, the GCU 505 may regulate gas flow rate, gas pressure, gas temperature, humidity, and other particle concentration of the output gas. In some examples, the GCU 505 may deliver the output gas mix to more than one gas-controlled chamber 510.

The concentration of a delivered gas mix can be preprogrammed to meet cell growth phase specific oxygenation demand. The gas concentration component can also sense the specific gas mix delivered and store it for the duration of the cell culture.

Figure 6:
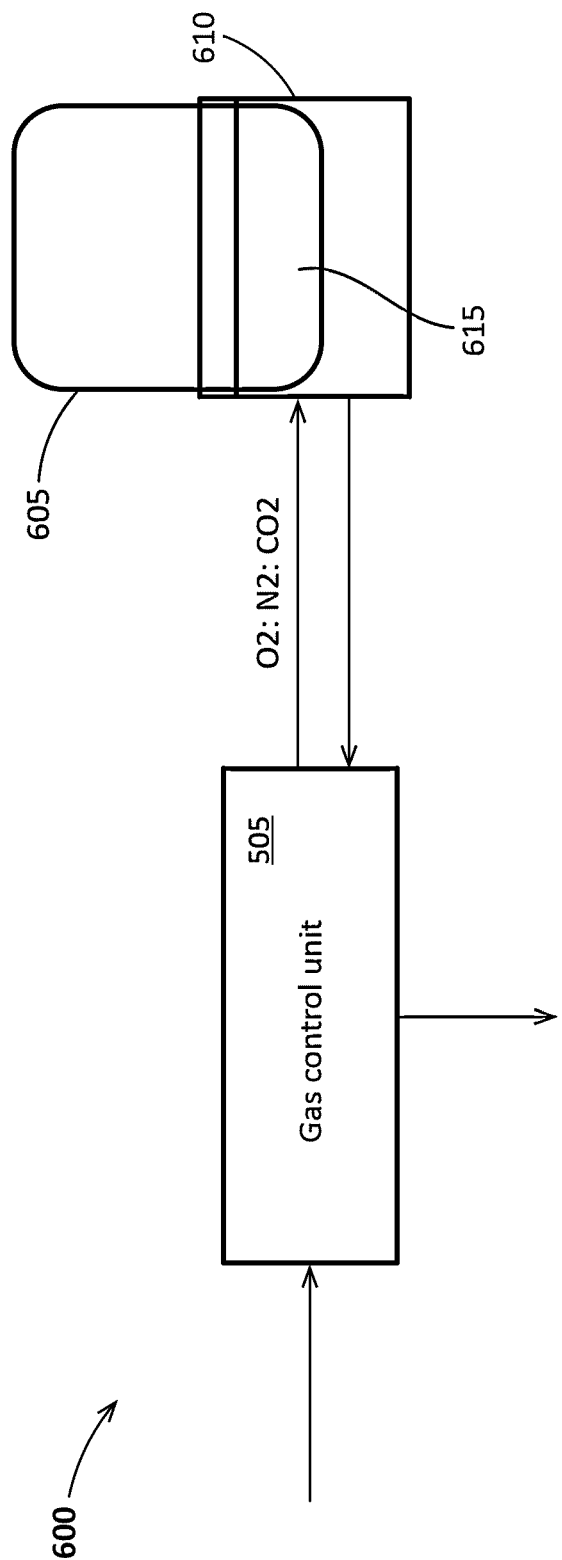
FIG. 6 is a block diagram depicting an exemplary PCCS having an insertable gas control unit.

FIG. 6 is a block diagram depicting an exemplary PCCS 600 having an insertable gas control unit. In this example, a gas-controlled chamber 605 (e.g., the BCCB 110) is placed on top of a gas socket 610 of the GCU 505. For example, the gas socket 610 may be connected to the GCU 505 via gas pipes.

In some implementations, the gas-controlled chamber 605 may include a specific shape configured to sealingly couple to one or more sides of the gas socket 610. For example, the gas-controlled chamber 605 may, for example, include a bottom interface 615 to sealingly connect to the gas socket 610. For example, cell culture conditions (e.g., concentration of various gases) within the gas-controlled chamber 605 may advantageously be accurately regulated. Various embodiments of the bottom interface 615 are further discussed with reference to FIGS. 34A-36D.

Figure 7:
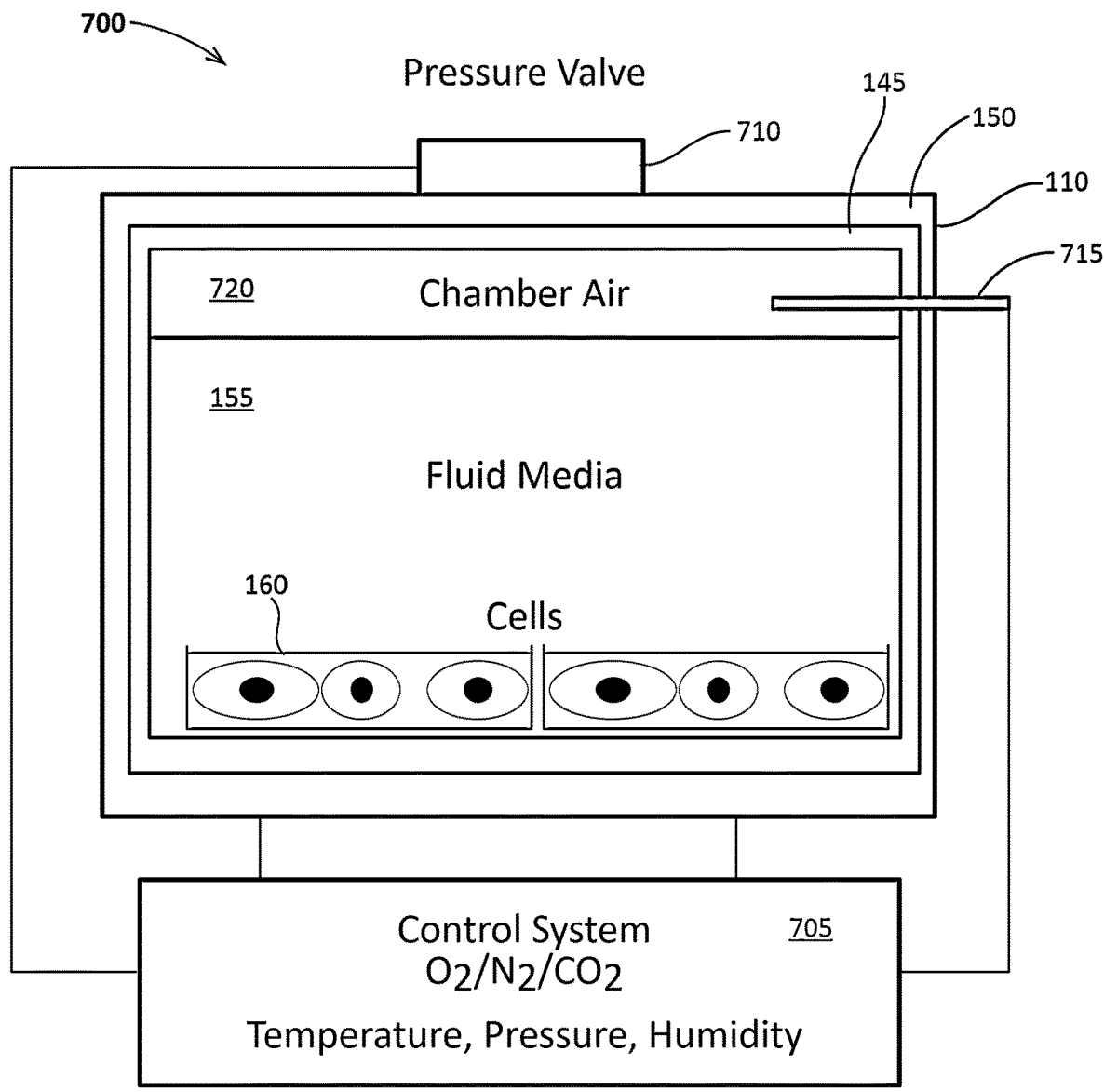
FIG. 7 is a block diagram depicting an exemplary boundary conditions controlling bioreactor (BCCB).

FIG. 7 is a block diagram depicting an exemplary boundary condition controlling bioreactor (BCCB). In this example, a PCCS 700 includes a controller 705. The controller 705, for example, may regulate an oxygen concentration, temperature, carbon dioxide level, humidity, and pressure of the BCCB 110. The controller 705 is connected to a pressure valve 710. For example, the pressure valve 710 may control pressure in a gas phase of the BCCB 110.

As shown, the BCCB 110 includes cell cultures 160 surrounded by the fluid media 155. On top of the fluid media 155, the BCCB 110 includes chamber air 720. As shown, the PCCS 700 includes a humidification unit 715 to, for example, control a humidity in the BCCB 110. For example, the humidification unit 715 may be a water source. At a peripheral of the BCCB 110, in this example, the BCCB 110 is enveloped by a gas permeable membrane 145 and a plenum 150. For example, gas supply may diffuse through the gas permeable membrane 145 and the plenum 150 into the BCCB 110. For example, the controller 705 may control a gas concentration at the plenum 150. By controlling the gas concentration, for example, a diffusion rate of a gas from the plenum through the gas permeable membrane 145 may be regulated.

Figure 8:
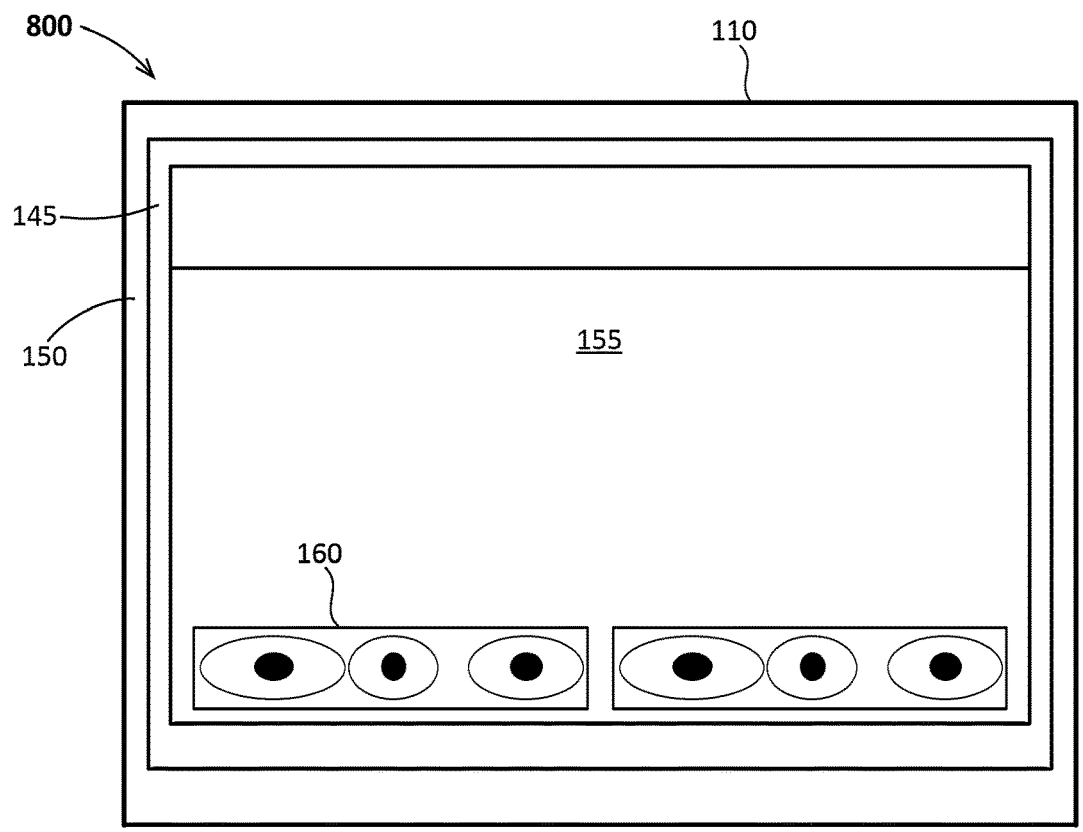
FIG. 8 and FIG. 9 are schematic diagrams of exemplary embodiments of a BCCB.
Figure 9:
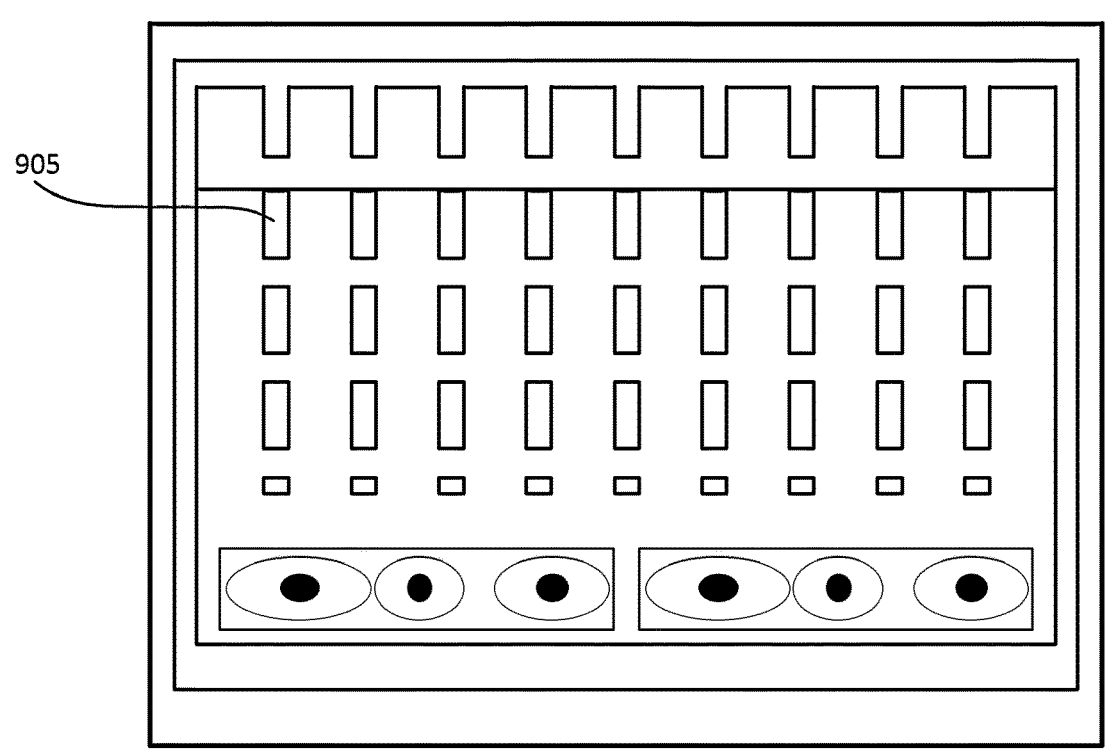

FIG. 8 and FIG. 9 are schematic diagrams of exemplary embodiments of a BCCB. As shown in FIG. 8, the gas permeable membrane 145 and the plenum 150 are enveloping the BCCB 110. In various implementations, an effectiveness of the gas permeable membrane 145 in providing gas (e.g., oxygen) to the cell culture 160 may depend on a permeability of the gas permeable membrane 145, an interfacing area of the gas permeable membrane 145 and the fluid media 155, a diffusion distance from the gas permeable membrane 145 to the cell culture 160, or a combination thereof. As shown, the plenum 150 is enveloping outside of the gas permeable membrane 145 on an opposite side the fluid media 155. For example, the controller 705 may set an oxygen level at the plenum 150 independent of an oxygen level in the fluid media 155. By enveloping the BCCB 110, a surface area between the gas permeable membrane 145 and the BCCB 110 may be increased for gas transport. In various implementations, the gas permeable membrane 145 may advantageously facilitate oxygen exchange at the BCCB 110, reducing an oxygen gradient within the fluid media 155.

As shown in FIG. 9, the gas exchange may be supplemented with additional gas permeable membranes 905 within the fluid media 155. For example, the additional gas permeable membranes 905 may further reduce a diffusion distance between a gas exchange interface and the cell culture 160.

Figure 10B:
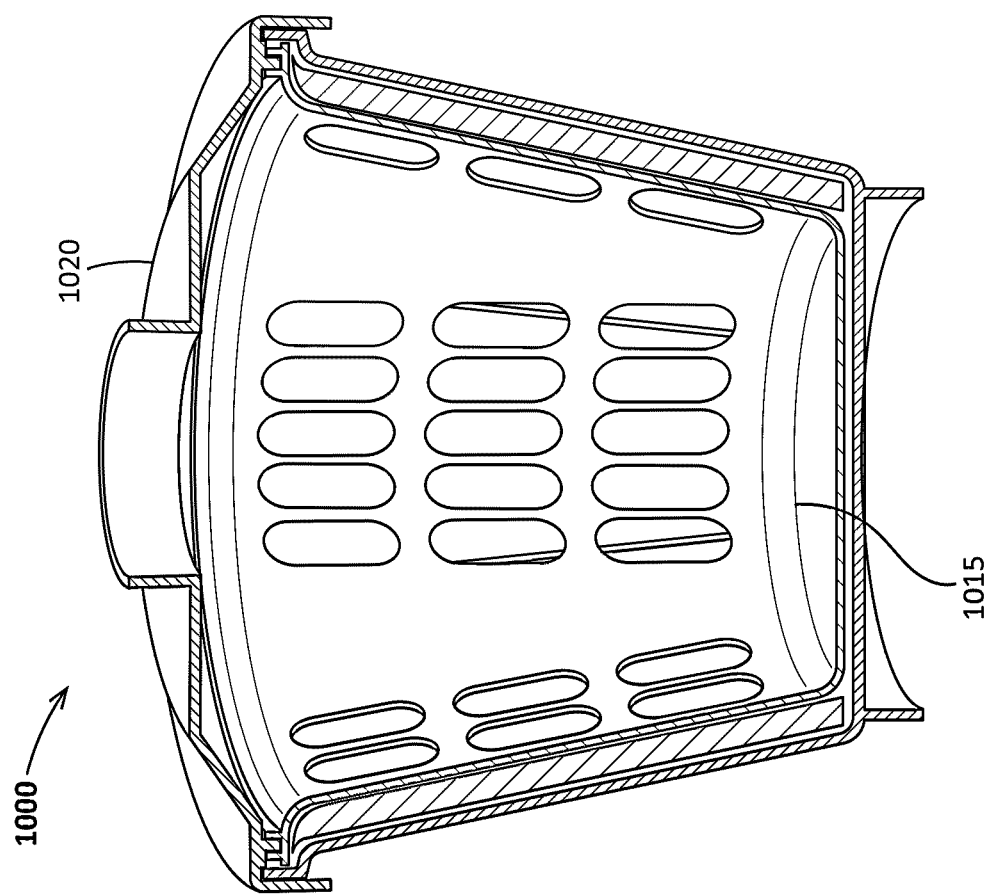
FIG. 10A and FIG. 10B are perspective views of an exemplary housing of a BCCB.
Figure 10A:
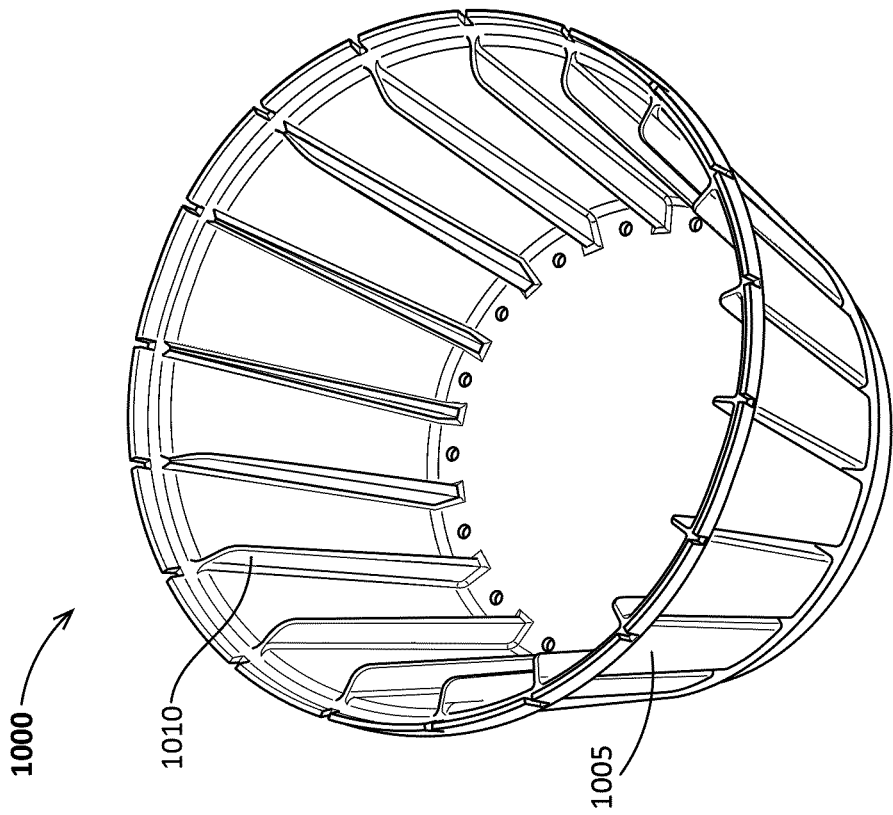

FIG. 10A and FIG. 10B are perspective views of an exemplary housing of a BCCB. In various embodiments, a housing 1000 may be configured to hold the gas permeable membrane 145 vertically between the fluid media 155 and the plenum 150. As shown in FIG. 10A, a load bearing wall 1005 may include inner protrusions 1010. For example, the wall 1005 may be made with a biocompatible material (e.g., polystyrene). The inner protrusions 1010 may create a plenum cavity. As shown in FIG. 10B, an inner wall 1015 is included with the weight bearing material and windows covered by the gas permeable membrane 145. The housing 1000 may also support a cover 1020. As shown, the housing 1000 may include a composite wall that may hold the gas permeable membrane 145 vertically and provide sufficient interface between the plenum and fluid media to aerate. In some embodiments, the housing 1000 may reinforce the gas permeable membrane 145 to advantageously prevent deflection under delivering gas mix at higher or lower than a pressure within the BCCB.

Figure 11:
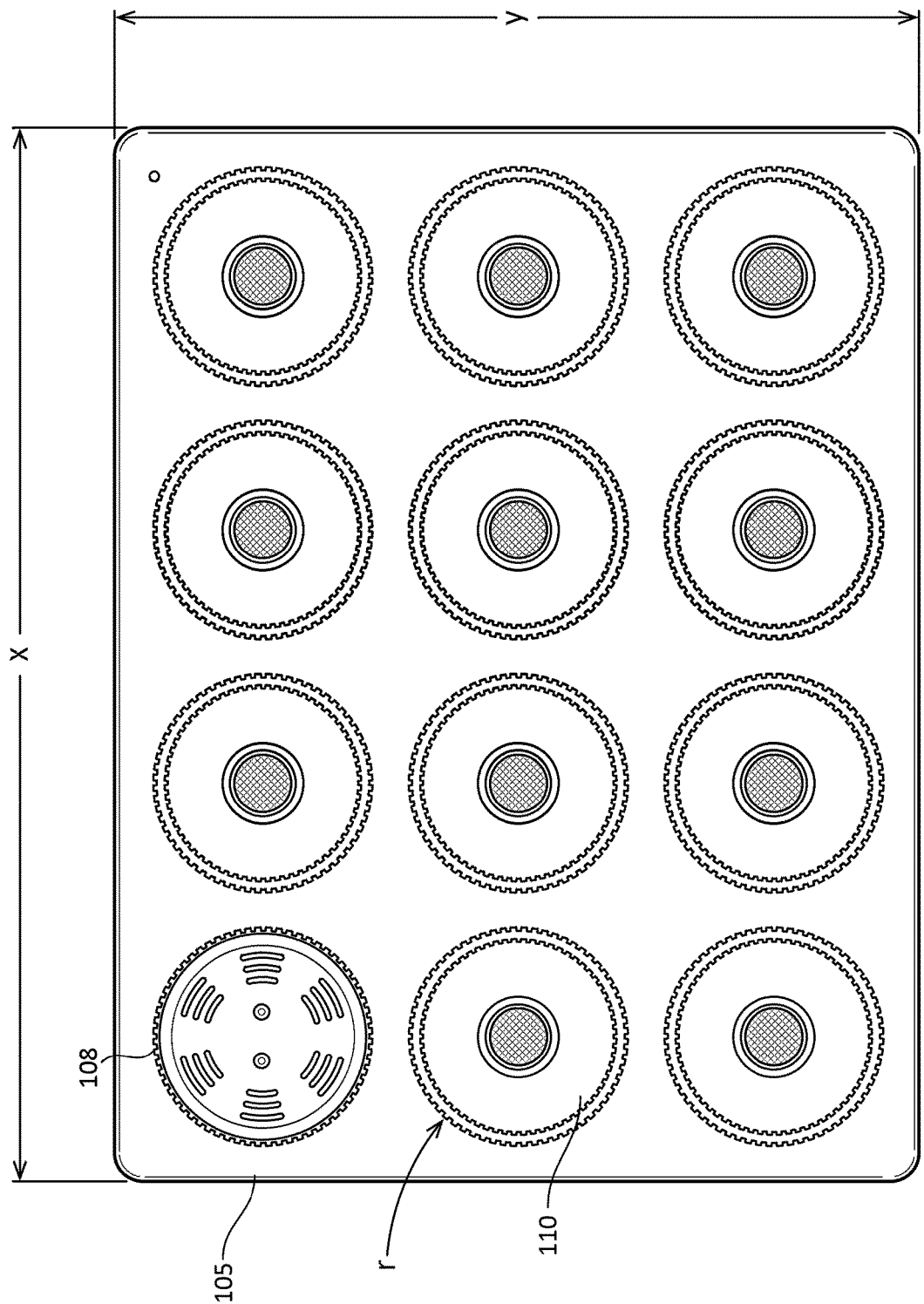
FIG. 11 shows a top view of an exemplary PCCS.

FIG. 11 shows a top view of an exemplary PCCM. As shown, the PCCM 105 includes a dimension of x in width, y in length, and a radius r for each of the BCCB 110. In various implementations, the PCCM 105 may be scalable. For example, the PCCM 105 may include more than one control unit 108. In some examples, the PCCM 105 may have other dimensions. For example, the PCCM 105 may include other number of BCCB 110. In some implementations, using the plenum 150 and the gas permeable membrane 145, the PCCM 105 may advantageously provide uniform spatial environmental conditions by reducing spatial gradients between different BCCB 110 positioned differently on the PCCM 105.

Figure 12:
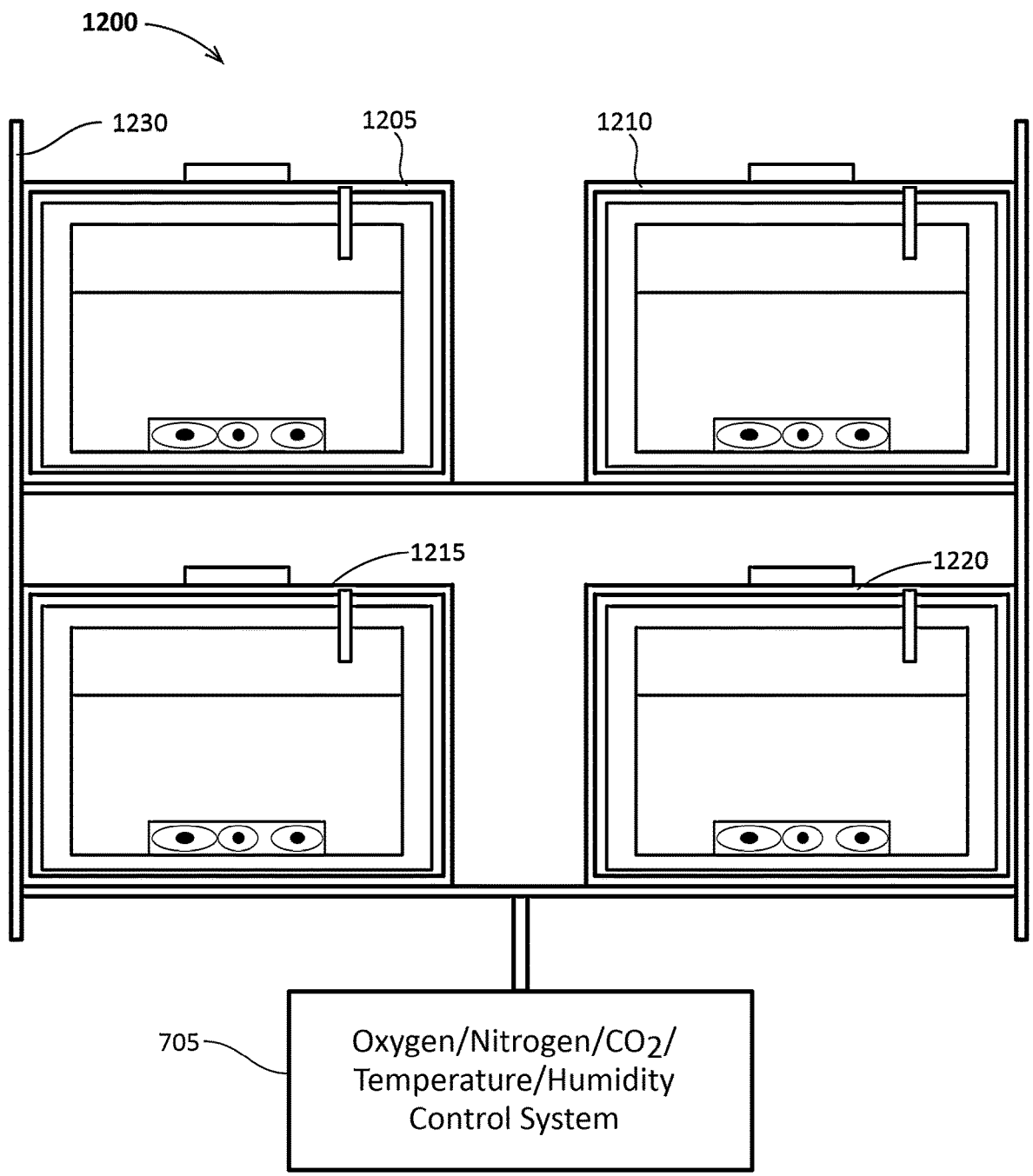
FIG. 12 is a schematic diagram showing an exemplary configuration of BCCB in an exemplary PCCS.

FIG. 12 is a schematic diagram showing an exemplary configuration 1200 of BCCB in an exemplary PCCS. In this example, two BCCBs 1205, 1210 are stacked on top of two BCCBs 1215, 1220. For example, the stackable BCCBs may advantageously reduce space (bench area) requirement for hosting the BCCMBs. In various embodiments, the BCCBs may be scaled in the horizontal and/or vertical direction.

Figure 13A:
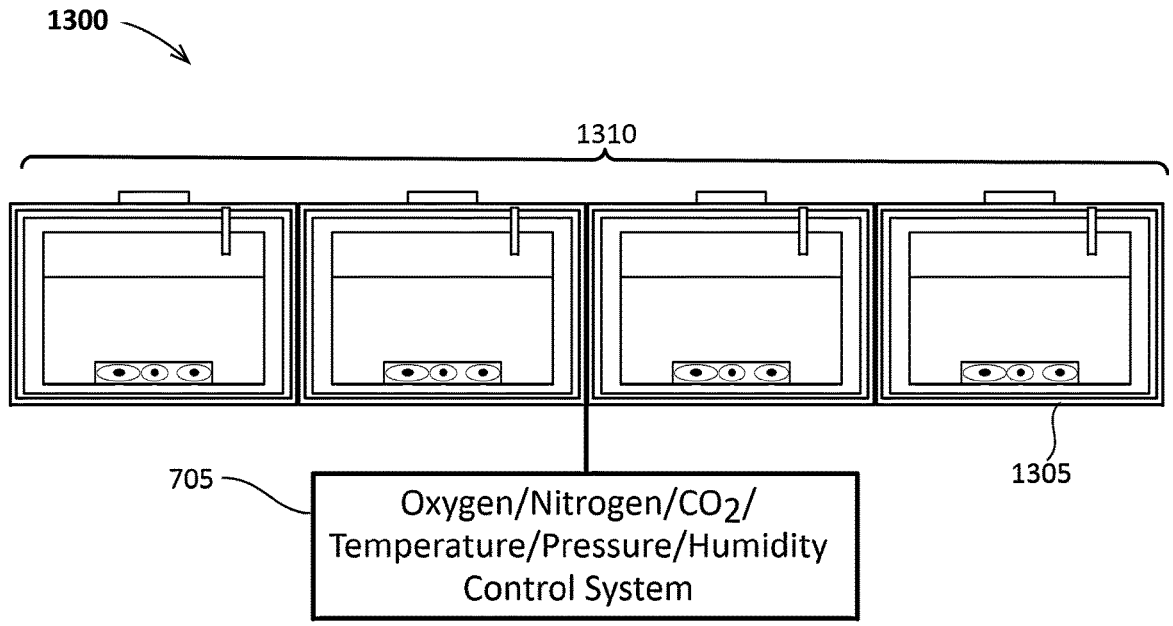
FIG. 13A and FIG. 13B are schematic diagrams showing a side view and a top view, respectively, of an exemplary configuration of BCCBs in an exemplary PCCS.
Figure 13B:
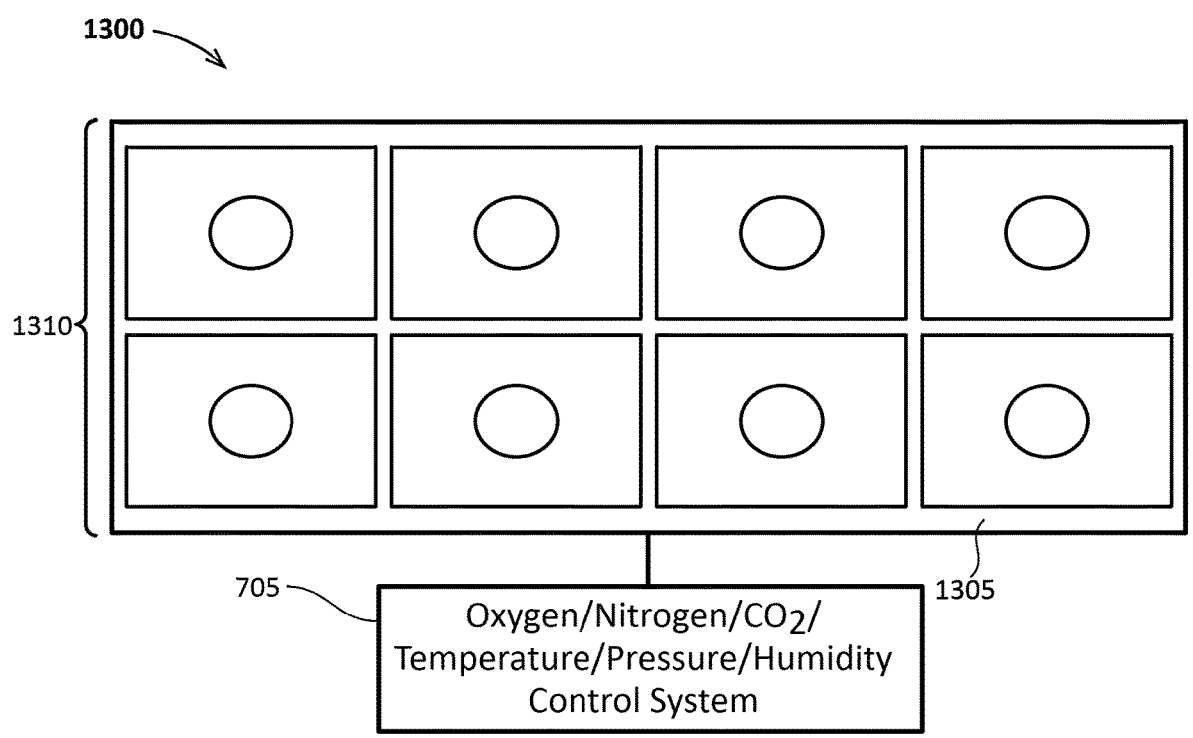

FIG. 13A and FIG. 13B are schematic diagrams showing a side view and a top view, respectively, of an exemplary configuration 1300 of BCCBs 1310 in an exemplary PCCS. As shown in FIG. 10B, the exemplary configuration 1300 includes eight BCCBs (e.g., the BCCB 110) scaled horizontally in longitudinal and lateral directions. In various implementations, environmental variables may be controlled at smaller well sizes advantageously for early-stage research. As shown in FIG. 10A, the controller 705 is coupled to a plenum 1305. For example, the plenum 1305 may be used to uniformly control boundary conditions within the BCCBs 1310. For example, the controller 705 may control an oxygen level in the BCCBs 1310 in hypoxia (e.g., $P_{O2}<18.6\%$ in vitro, $P_{O2}<21\%$ in vivo). For example, the controller 705 may control an oxygen level in the BCCBs 1310 in normoxia (e.g., $P_{O2}=18.6\%$ in vitro, $P_{O2}=21\%$ in vivo). For example, the controller 705 may control an oxygen level in the BCCBs 1310 in anoxia ($P_{O2}$ close to 0%). For example, the controller 705 may control an oxygen level in the BCCBs 1310 in hyperoxia (e.g., $P_{O2}>18.6\%$ in vitro, $P_{O2}>21\%$ in vitro).

In some implementations, for example, a partial pressure of oxygen may be controlled at physoxic level (e.g., maintaining physoxia), where phsyoxia refers to oxygen levels of a cell's physiological environment. The highest levels of oxygen currently known to be found in the human body, for example, may be in the lung. Lung cells may, for example, have a physoxic level of 14% $P_{O2}$. At least some human stem cells may have a physoxic level, by way of example and not limitation, of 3-6%.

In some implementations, for example, a partial pressure of oxygen may be controlled at anoxic levels (e.g., maintaining anoxia), where anoxia refers to oxygen levels close to zero (e.g., <1%).

Although oxygen has been used as an example, some embodiments may control other gas levels, such as instead of or in addition to oxygen.

In some implementations, for example, a level of multiple gases may be controlled (e.g., selectively, independently). For example, oxygen may be controlled at a first partial pressure. Carbon dioxide may, for example, be controlled at a second partial pressure. For example, carbon dioxide may be used as a pH buffer (e.g., at 5%, <5%, <1%).

Figure 14A:
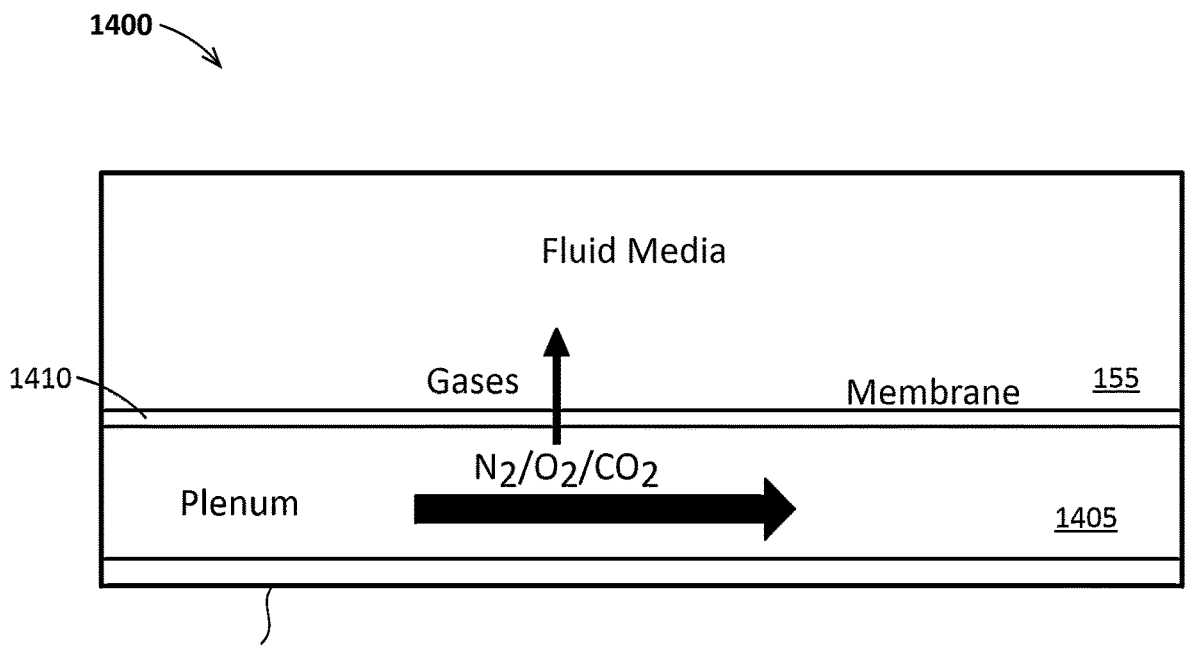
FIG. 14A is a schematic diagram showing an exemplary planar configuration of an exemplary plenum membrane structure (PMS) in a BCCB.

FIG. 14A is a schematic diagram showing an exemplary planar configuration of an exemplary plenum membrane structure (PMS) in a BCCB. A PMS 1400 includes a gas filled plenum 1405 (e.g., the plenum 150) and a gas permeable membrane 1410 (e.g., the gas permeable membrane 145). For example, the gas permeable membrane 1410 may be a silicone membrane. As shown, the gas filled plenum 1405 is separated from the fluid media 155 by the gas permeable membrane 1410. On an opposite side, as shown, the gas filled plenum 1405 is bounded and supported by an outer wall 1415 (e.g., the housing 1000). In some implementations, a gas mixture provided by a supply (e.g., the ODGCPU 120) may be pumped through the gas filled plenum 1405. For example, the supplied gas mixture may transport through the gas permeable membrane 1410 at the boundaries of the fluid media 155. In some implementations, the PMS 1400 may envelope boundaries of a bioreactor (e.g., a BCCB 110) with gas transport through one side of the plenum (e.g., the BCCB 110 as shown in FIG. 8).

Figure 14B:
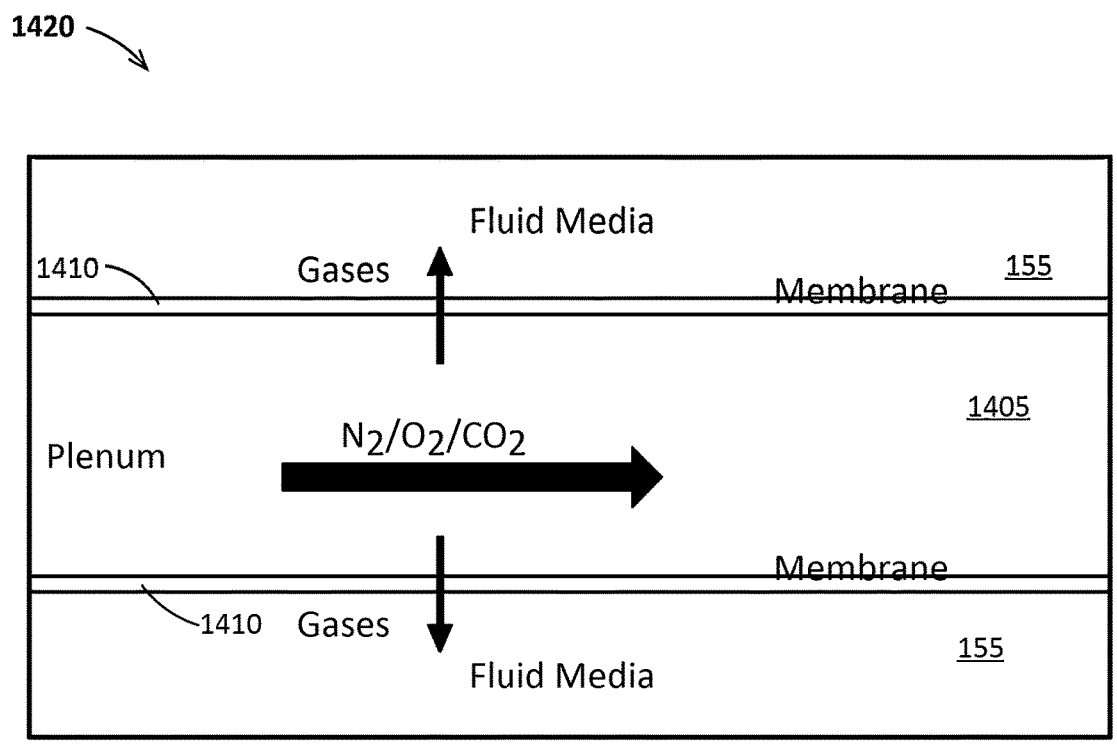
FIG. 14B is a schematic diagram showing an exemplary PMS tube in a BCCB.

FIG. 14B is a schematic diagram showing an exemplary PMS tube 1420 in a BCCB. In this example, the PMS tube 1420 may form a gas permeable (e.g., silicone) tubing through an interior of a bioreactor. For example, the PMS tube 1420 may be in tubular shape. For example, gas mixtures (e.g., $N_2/O_2/CO_2$) may be filled in the gas filled plenum 1405 in a predetermined ratio (e.g., static ratio, dynamic ratio) and diffused radially into the fluid media 155.

Figure 15A:
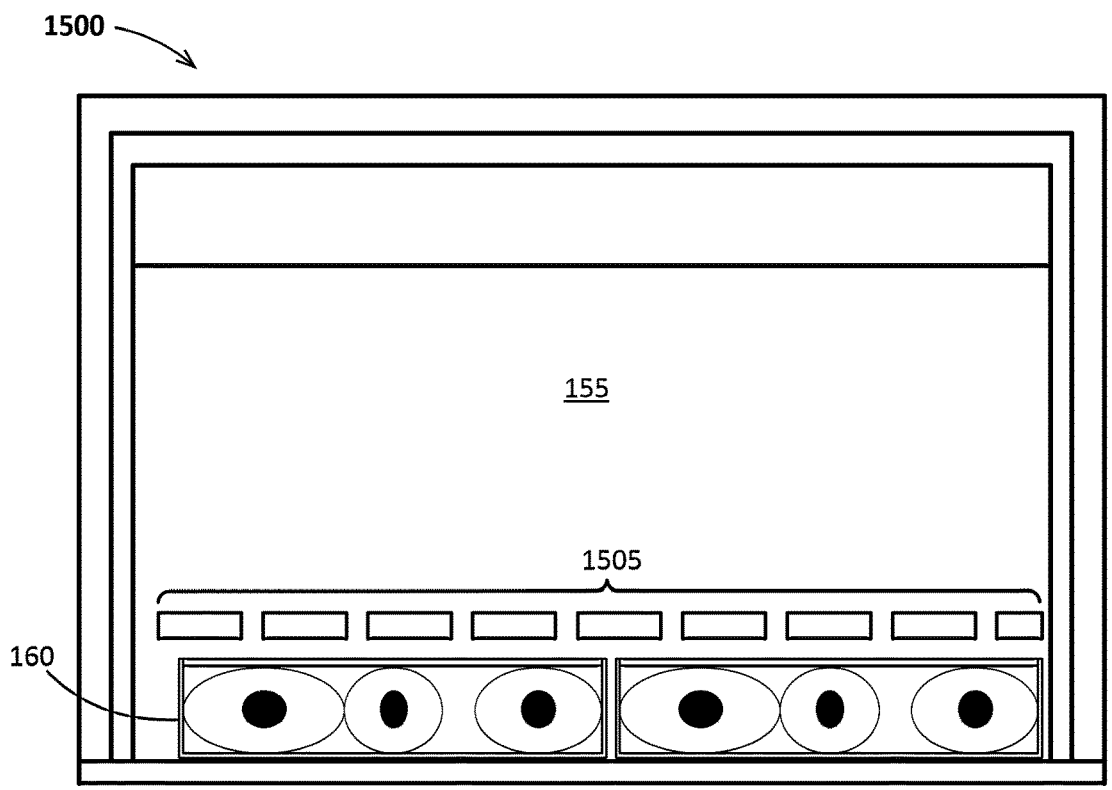
FIG. 15A is a schematic diagram showing an exemplary BCCB having an exemplary PMS divider.

FIG. 15A is a schematic diagram showing an exemplary BCCB having an exemplary PMS divider. A bioreactor 1500 (e.g., the BCCB 110) includes a PMS divider 1505. The PMS divider 1505 may be configured to place a PMS proximal to the cell cultures 160. For example, the PMS divider 1505 may reduce concentration gradient.

Figure 15B:
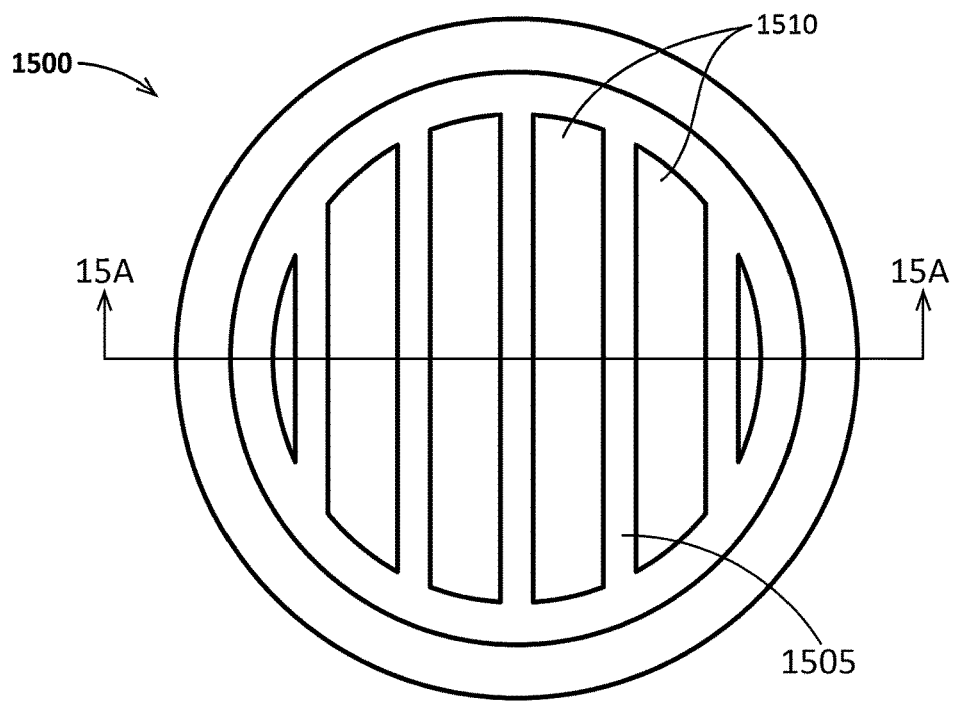
FIG. 15B is a schematic diagram showing a top view of the BCCB as described with reference to FIG. 15A.

FIG. 15B is a schematic diagram showing a top view of the BCCB as described with reference to FIG. 15A. As shown, the PMS divider 1505 is a grate-style to enable fluid media to diffuse through. In some implementations, the PMS divider 1505 may include PMS tube 1420 as described with reference to FIG. 14B. As shown in FIG. 15B, the PMS tube 1420 may be configured across the bioreactor 1500 with gaps 1510 for the fluid media 155 to diffuse through. In some examples, the gaps 1510 may be required to allow the fluid media 155 to diffuse to the cell cultures 160. Waste products may, for example, diffuse away from the cell culture 160 through the gaps.

Figure 16A:
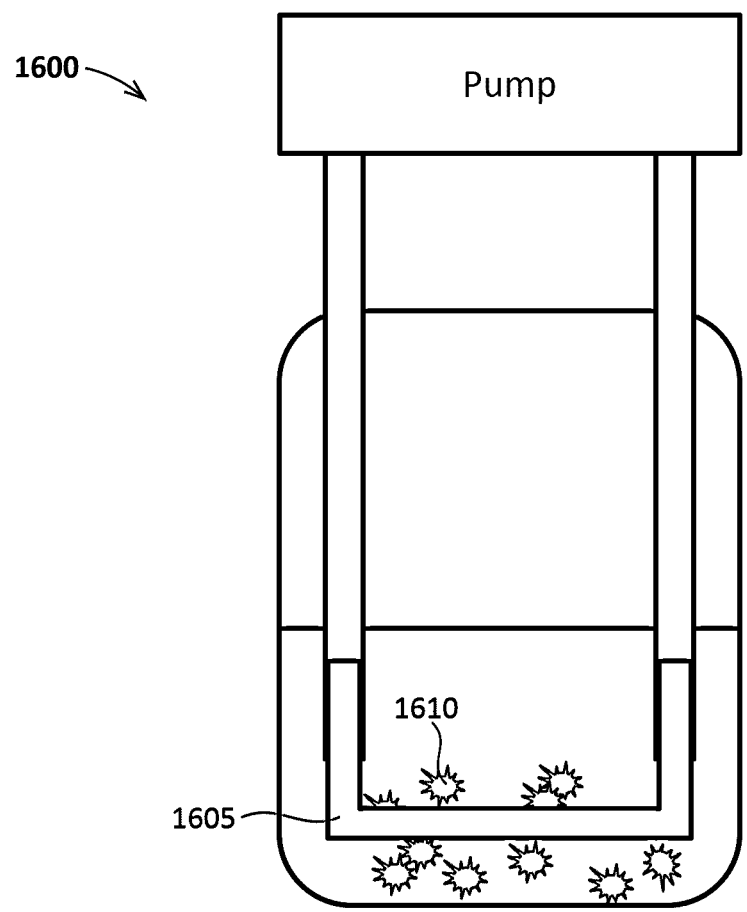
FIG. 16A and FIG. 16B are schematic diagrams showing an exemplary aeration BCCB configuration to aerate adherent cells.
Figure 16B:
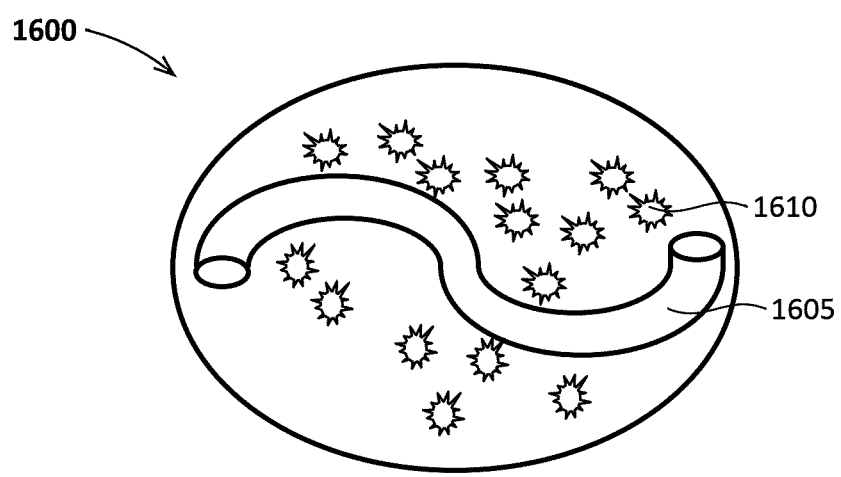

FIG. 16A and FIG. 16B are schematic diagrams showing an exemplary aeration BCCB configuration to aerate adherent cells. As shown, a PCCS 1600 may include various geometries of a PMS tube 1605 to allow diffusion of gases to reach the cells 1610.

Figure 17:
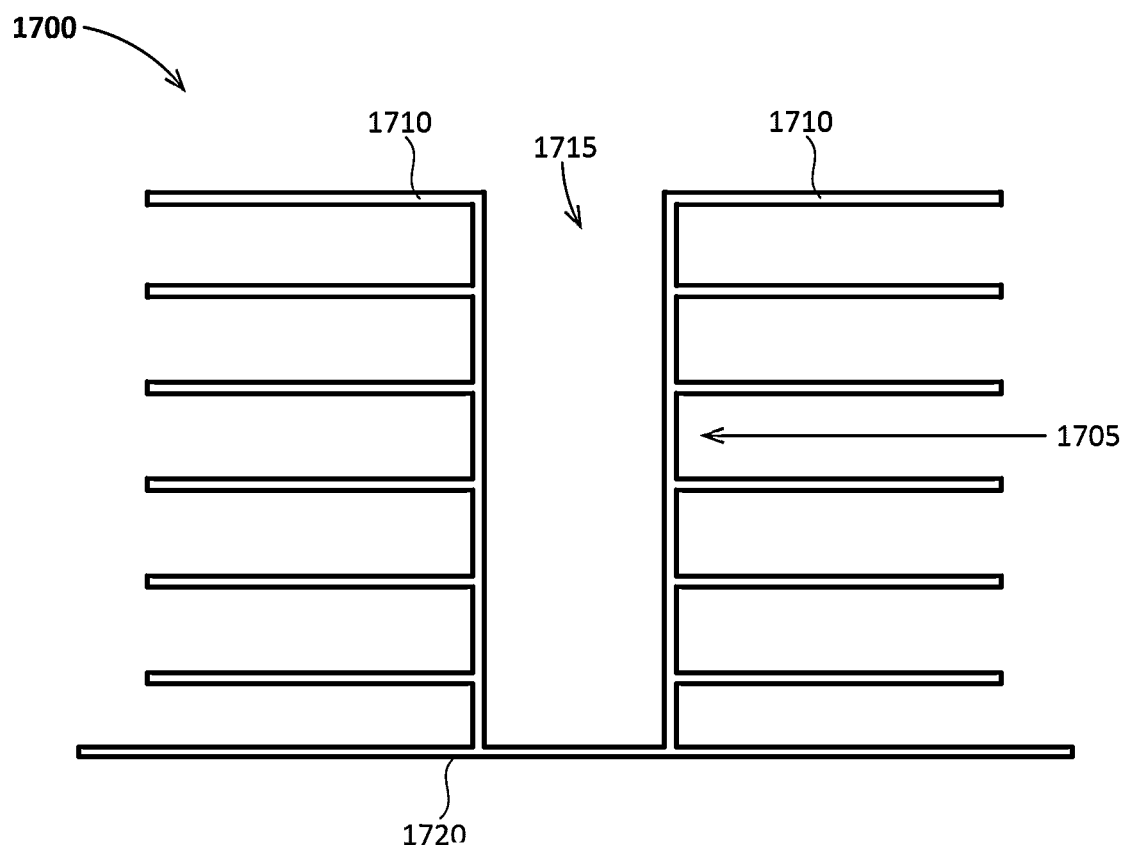
FIG. 17 is a schematic diagram showing an exemplary polymer shelving.

FIG. 17 is a schematic diagram showing an exemplary polymer. In this example, a polymer shelving 1700 may be configured to be installed in a BCCB (and/or other bioreactors) for adherent cell culture. In some examples, the shelving 1700 may be configured to be a stand-alone apparatus for cell culture. The shelving 1700 includes support struts 1705 and shelves 1710 on a stabilizing base plate 1715. In some implementations, the shelves 1710 may include adherent molecules surface to advantageously allow adherent cells to be fully separated from an impellor and its wake. The shelving 1700 also includes a central mixing area 1720. In some implementations, the shelving 1700 may include an impellor at every level of the shelves 1710 such as, for example, to promote balanced mixing.

Figure 18A:
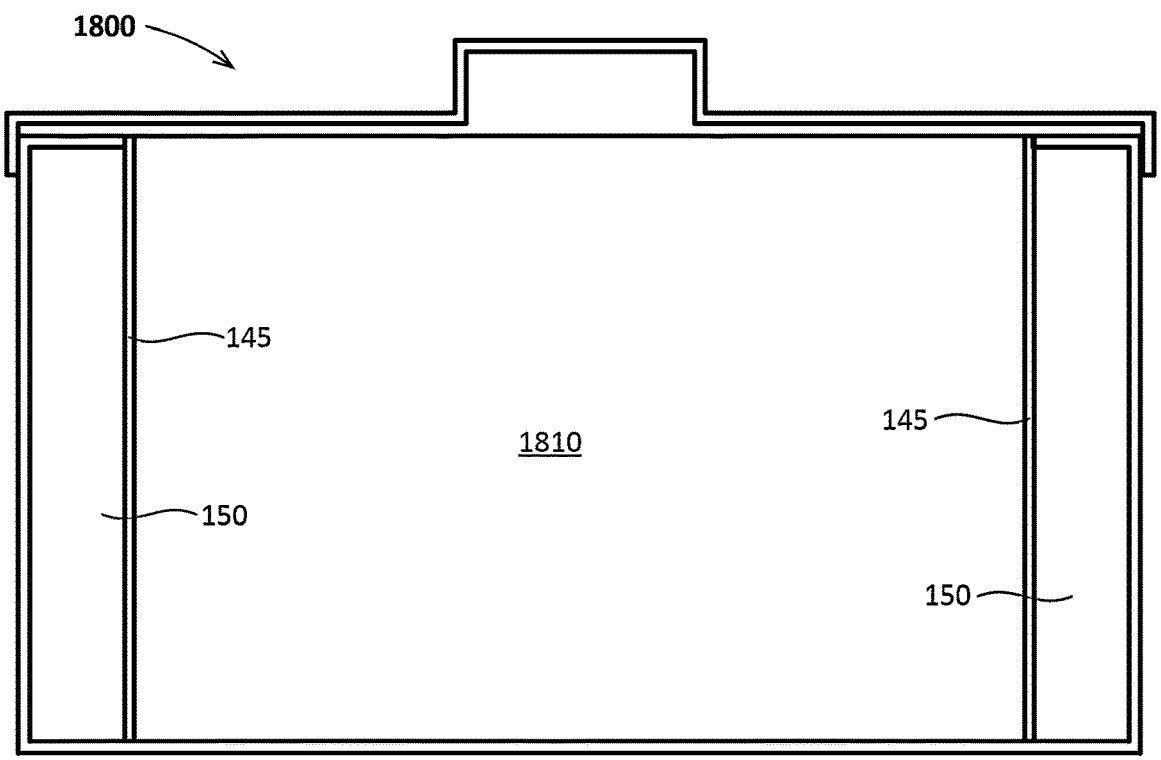
FIG. 18A shows an exemplary BCCB without the polymer shelving described with reference to FIG. 17.
Figure 18B:
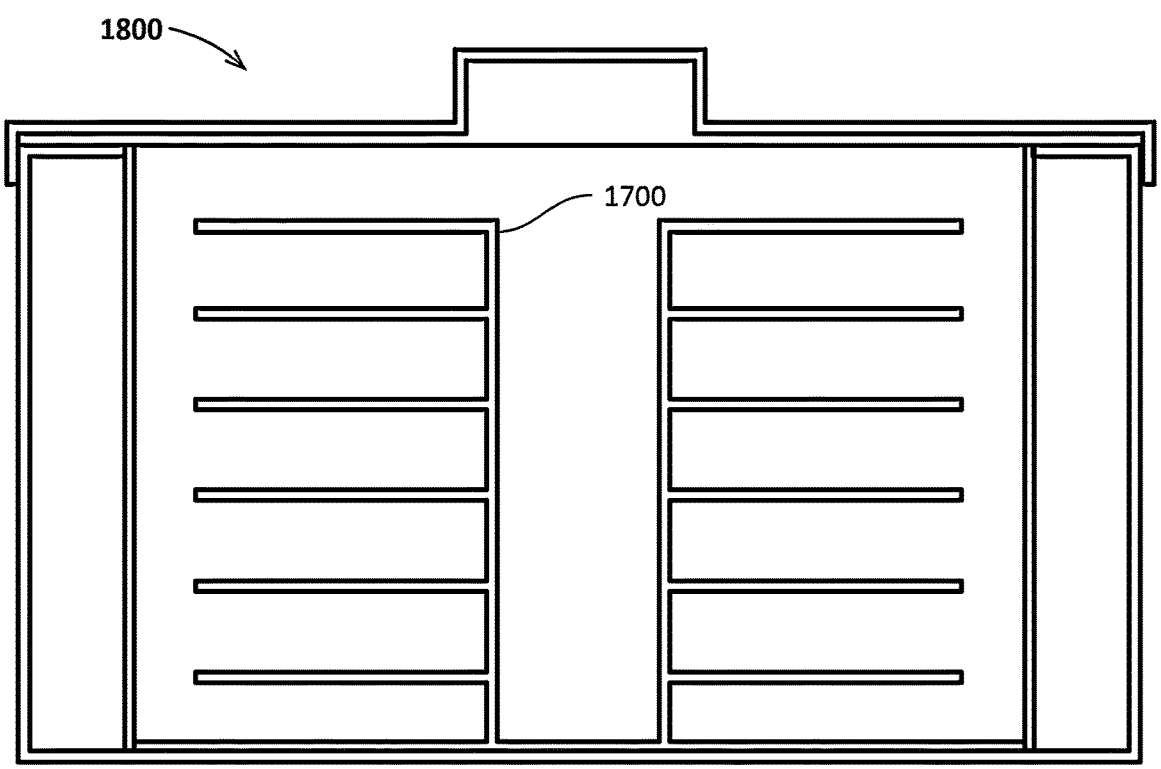
FIG. 18B shows an exemplary BCCB having the polymer shelving described with reference to FIG. 17.

FIG. 18A shows an exemplary BCCB without the polymer shelving described with reference to FIG. 17. FIG. 18B shows an exemplary BCCB 1800 having the polymer shelving 1700 described with reference to FIG. 17. As shown, the shelving 1700 may be fully inserted in a cell culture media 1810 of the BCCB 1800. For example, the shelving 1700 may advantageously allow the BCCB 1800 to be convertible into a bioreactor appropriate for both adherent and non-adherent cells.

Figure 19:
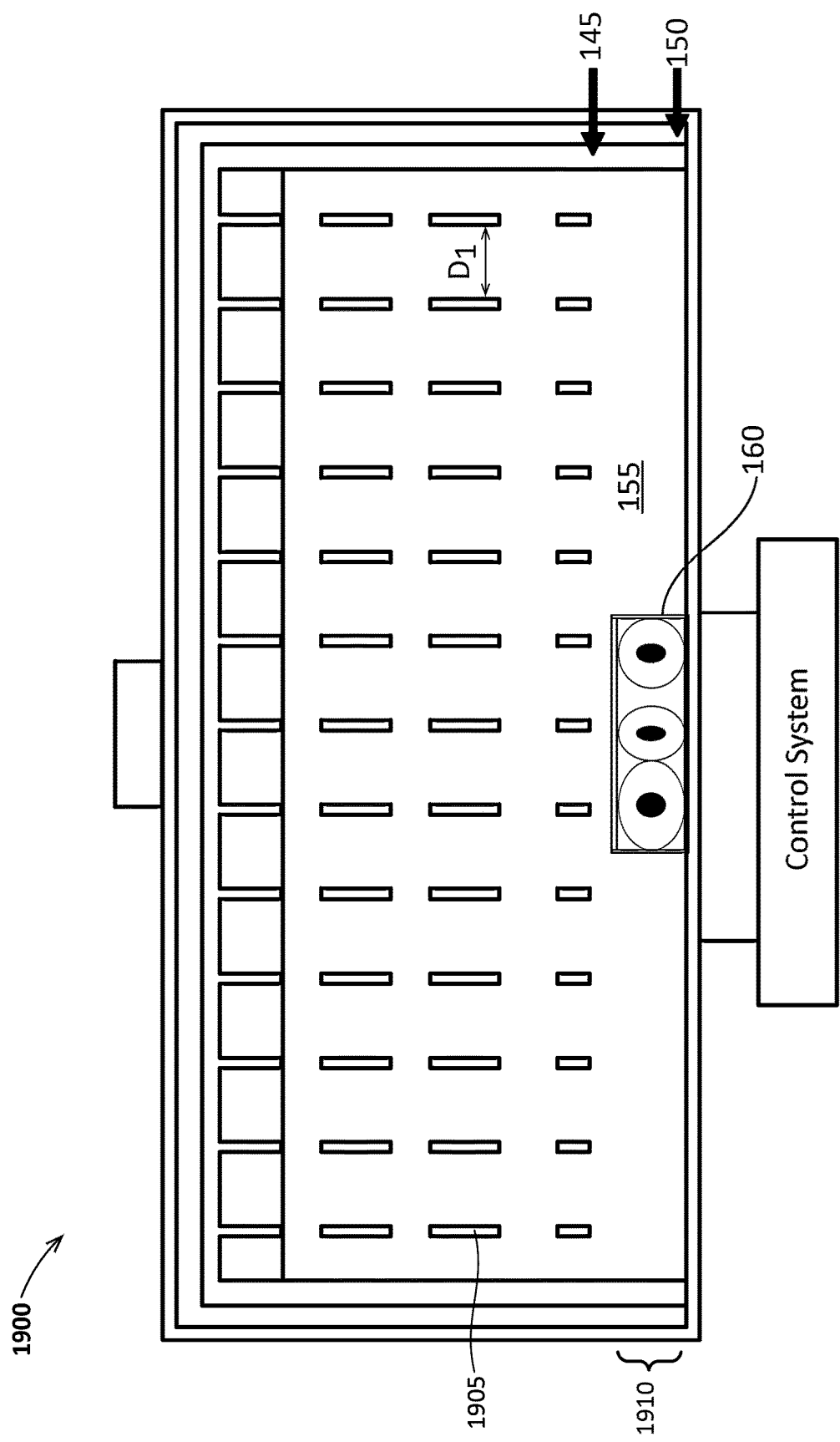
FIG. 19 shows an exemplary wide BCCB.

FIG. 19 shows an exemplary wide BCCB 1900. As shown, the exemplary wide BCCB 1900 includes PMS 1905. As shown, the PMS 1905 may be configured to be separated by a distance D1. By controlling D1, for example, the PMS 1905 may reduce oxygen concentration gradient across a cell culture region 1910 of the widened BCCB 1900. For example, the PMS 1905 may advantageously enable the bioreactor size to be increased by providing aeration while still enabling fluid media to reach the cells by diffusion. For example, the PMS 1905 may advantageously keep an oxygen concentration at the cell culture region 1910 uniform.

Figure 20:
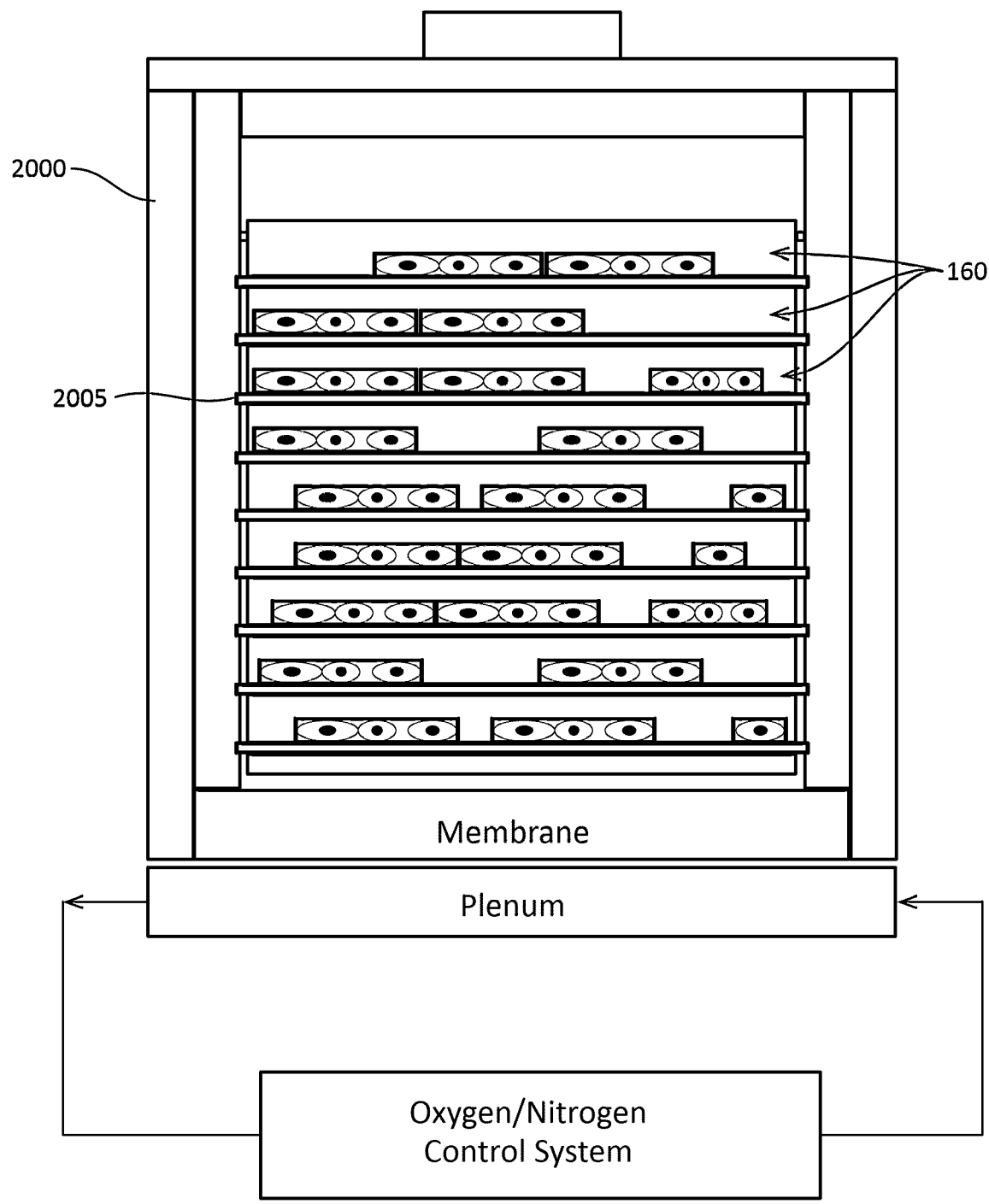
FIG. 20 shows an exemplary scalable BCCB.

FIG. 20 shows an exemplary scalable BCCB. In this example, a BCCB 2000 includes a gas permeable membrane 145 surrounding the BCCB 2000. The BCCB 2000 also includes an adjustable number of shelving 2005. The number and size of the shelving 2005 may, for example, vary based on a scale of an experiment. The shelving 2005 may be made of polystyrene, for example. The shelving 2005 may be made with other hydrophilic materials. For example, the shelving 2005 may use material that facilitates retaining of the cell cultures 160.

Figure 21A:
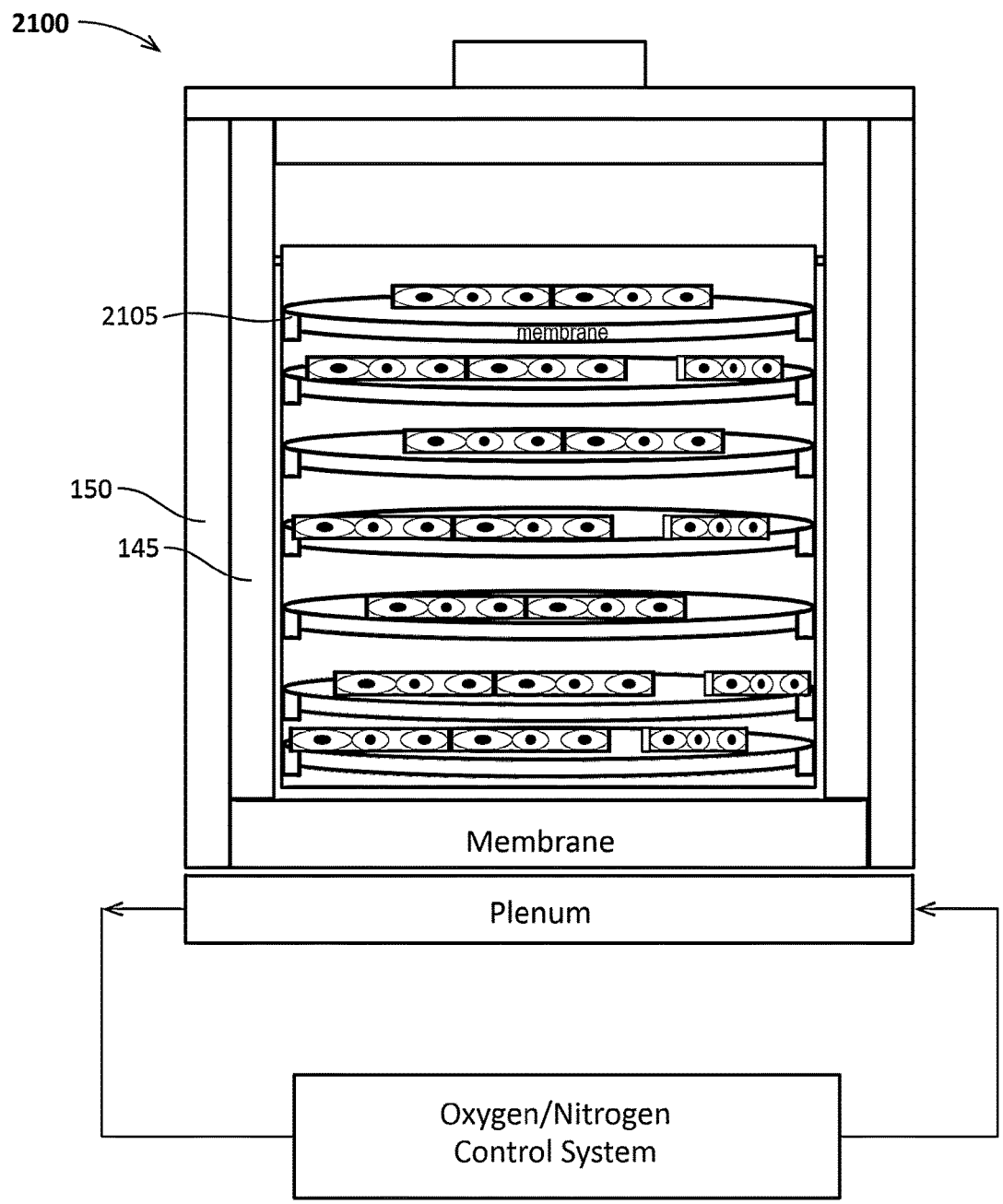
FIG. 21A and FIG. 21B show exemplary cell adherence plates employed in an illustrative use-case scenario.
Figure 21B:
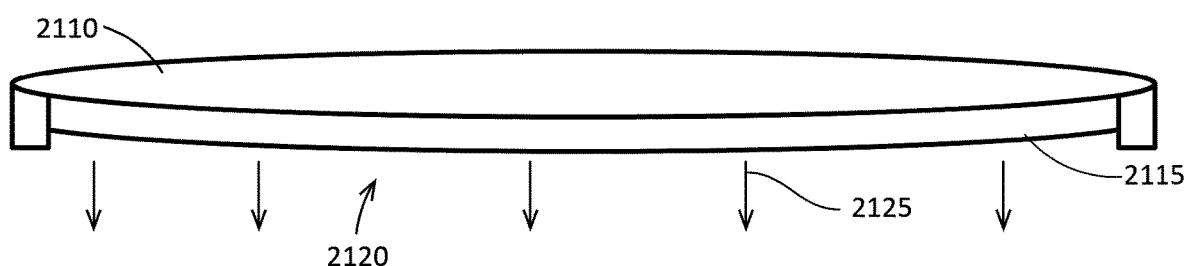

FIG. 21A and FIG. 21B show exemplary cell adherence plates employed in an illustrative use-case scenario. As shown, a BCCB 2100 includes a shelf 2105. The BCCB 2100 includes the gas permeable membrane 145 surrounding internal cavity of the BCCB 2100 having the cell culture 160. In this example, as shown in FIG. 21B, a shelf 2105a (one of the shelves 2105 as shown in FIG. 21A) includes a hydrophilic polystyrene top layer 2110, a gas permeable bottom layer 2115, and hollow inside 2120. The polystyrene top layer 2110 allows cells to attach to the shelves 2105. The gas permeable bottom layer 2115 provide oxygen (shown by arrows 2125) to the cells growing on the shelf (not shown) immediately below. Accordingly, the gas permeable membrane 145 and the gas permeable bottom layer 2115 are only disposed on sides and on a top of the cell culture 160 on the shelves 2105. The shelves 2105 may advantageously be preserved for a horizontal cell growth surface, in some implementations. For example, the shelves 2105 may provide a uniform gas concentration gradient across the BCCB 2100.

In various implementations, the BCCB 2100 may provide a static culture, and low-media change option for large scale adherent cell production. For example, because the BCCB 2100 is scalable, the BCCB 2100 may allow growing a large number of adherent cells in a limited volume.

In various embodiments, a BCCB may apply perfusion to supply in a static cell culture. For example, the BCCB may use perfusion to supply necessary reaction products and remove waste. In some implementations, the perfusion may be configured to provide cell-to-cell contact and avoid confounding shear forces of dynamic cultures.

Figure 22:
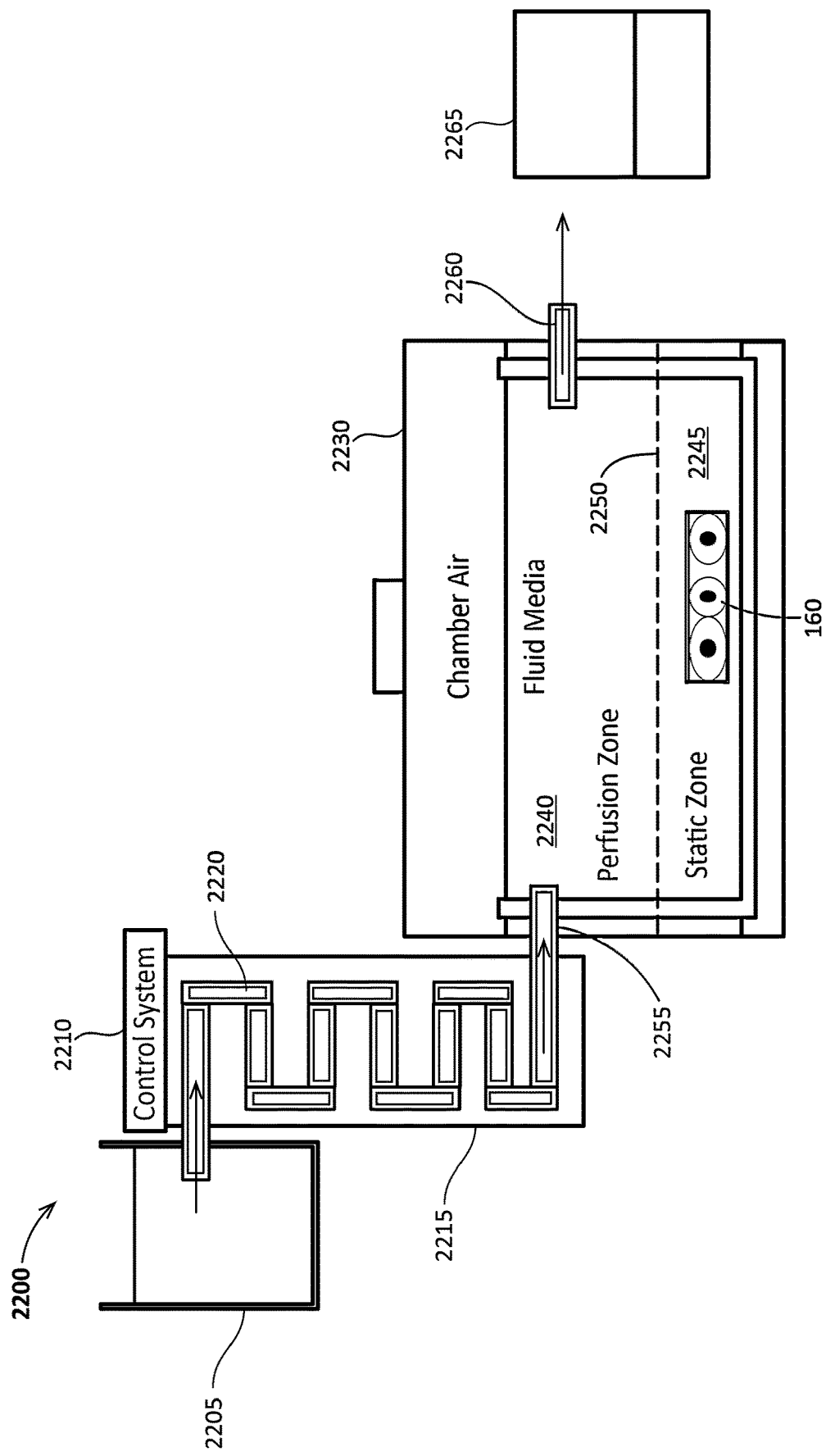
FIG. 22 shows an exemplary multi-zone BCCB employed in an illustrative use-case scenario.

FIG. 22 shows an exemplary multi-zone BCCB employed in an illustrative use-case scenario. In this example, a static culture system 2200 may include a reservoir 2205, a control system 2210, and an oxygenator 2215. The reservoir 2205 may include a fresh volume of fluid media 2220. The control system 2210 may control conditions including gases (e.g., $N_2/O_2/CO_2$), regulate perfusion pump pressure, temperature, humidity, and air pressure. The control system 2210 may, for example, control the conditions based on real-time response in the oxygenator 2215.

The oxygenator 2215 may include a pathway for the fluid media to oxygenate.

The oxygenator 2215 is coupled to a BCCB 2230. The BCCB 2230 includes a perfusion zone 2240 and a static zone 2245 separated by a barrier 2250. For example, the BCCB 2230 may receive the fluid media 2220 at the perfusion zone 2240. For example, the perfusion zone 2240 may include a region where fluid media is exchanged with the static zone 2245. For example, the static zone 2245 may include a region without bulk water flow. Cells are deposited here for cell growth.

In some implementations, the fluid media may be exchanged by diffusion between the perfusion zone 2240 and the static zone 2245. In some implementations, the fluid media may be exchanged between an inflow port 2255 and an outflow port 2260 through the perfusion zone 2240. The barrier 2250 may be, for example, a semi-permeable membrane. In some implementations, the barrier 2250 may be impermeable to cells and permeable to fluid media. In this example, the outflow port 2260 is coupled to a waste repository 2265 to store spent media.

Figure 23:
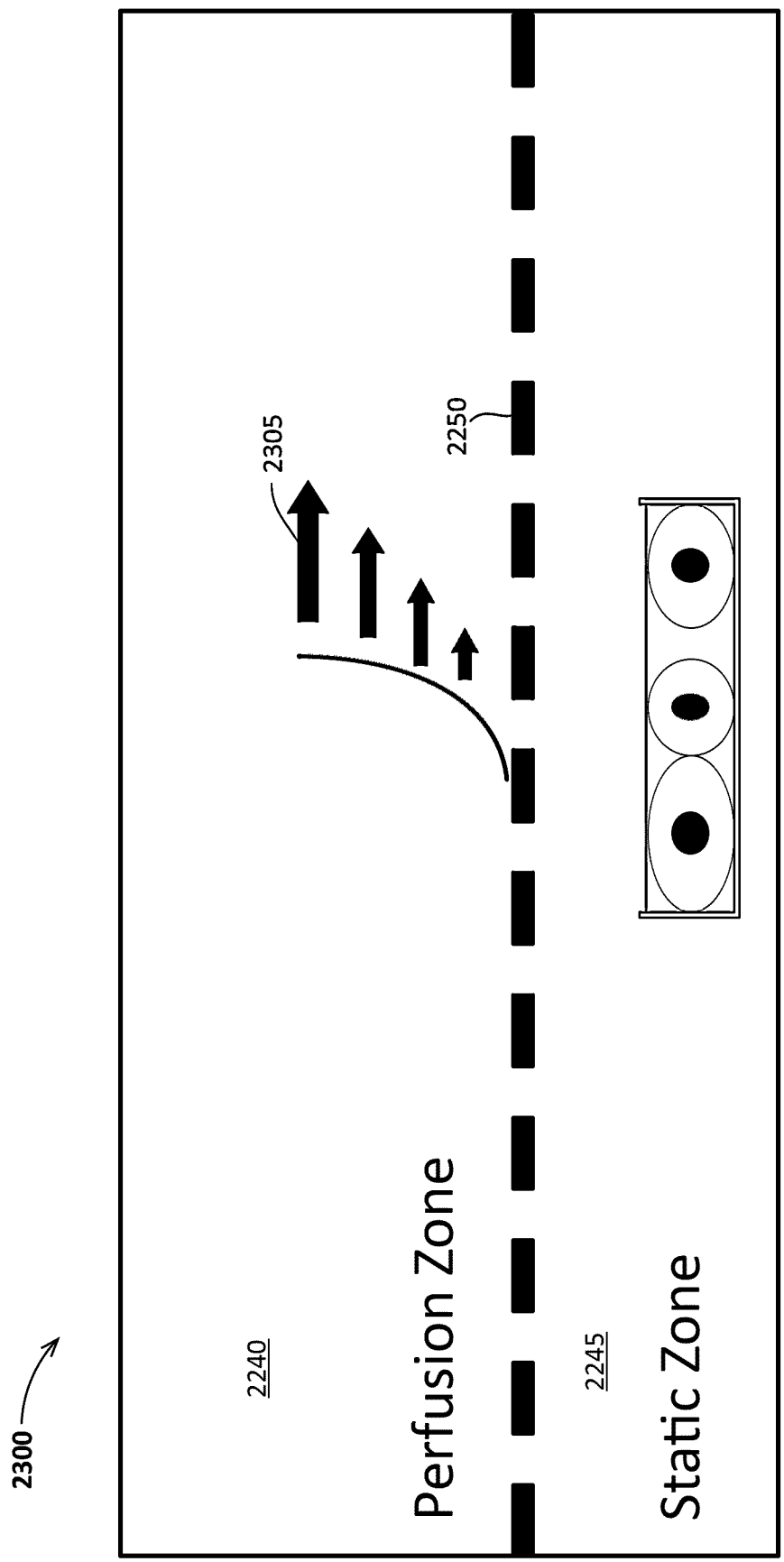
FIG. 23 shows an exemplary fluid velocity profile at a border of a perfusion zone.

FIG. 23 shows an exemplary fluid velocity profile 2300 at a border of a perfusion zone. As shown, the perfusion zone 2240 may induce a laminar flow 2305. Fluid velocity, for example, may be modeled by a "no-slip" condition at an interface with the barrier 2250. For example, at the interface, the flow may be close to zero. For example, the laminar flow may prevent shear from being translated to the static zone 2245. In some implementations, the fluid velocity may be slow enough to enable diffusion to reach the barrier 2250. The barrier 2250 may be permeable to the fluid media, but not to the cell cultures 160.

Figure 24:
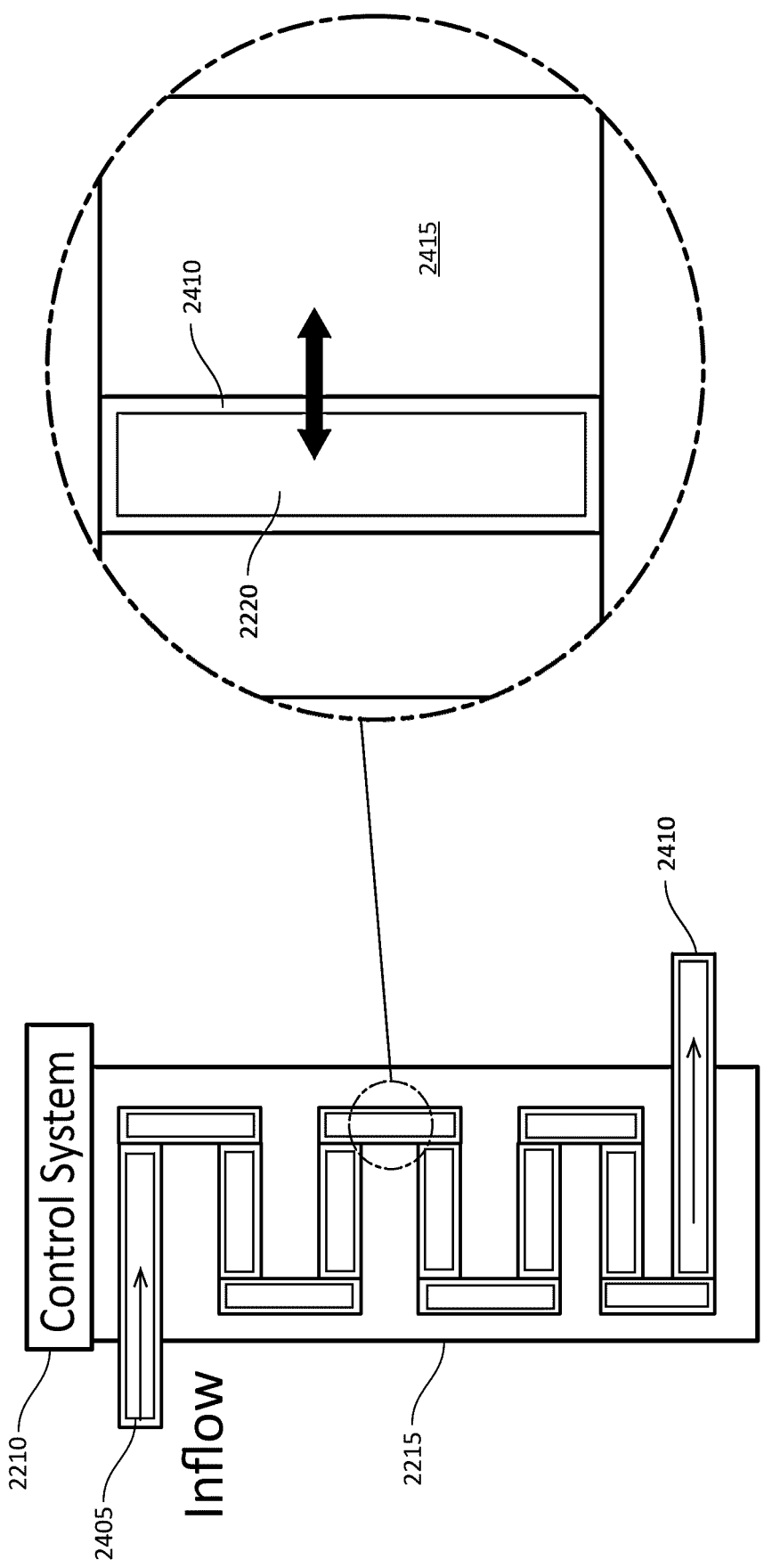
FIG. 24 shows an exemplary oxygenator including a PMS tubing.

FIG. 24 shows an exemplary oxygenator including a PMS tubing. As an illustrative example without limitation, an oxygen concentration may need to be adjusted to a predetermined level before entering the BCCB 2230. As shown in FIG. 24, the oxygenator 2215 includes PMS tube 2405 for oxygenation. In this example, the PMS tube 2405 includes a gas permeable membrane 2410 with a plenum 2415 on the outside. Oxygen in the plenum 2415 is controlled by the control system 2210. The PMS tube 2405 may include an increased surface area to enable the gas content of fluid media (e.g., Oxygen) in the gas permeable membrane 2410 to equilibrate to the plenum 2415.

Figure 25A:
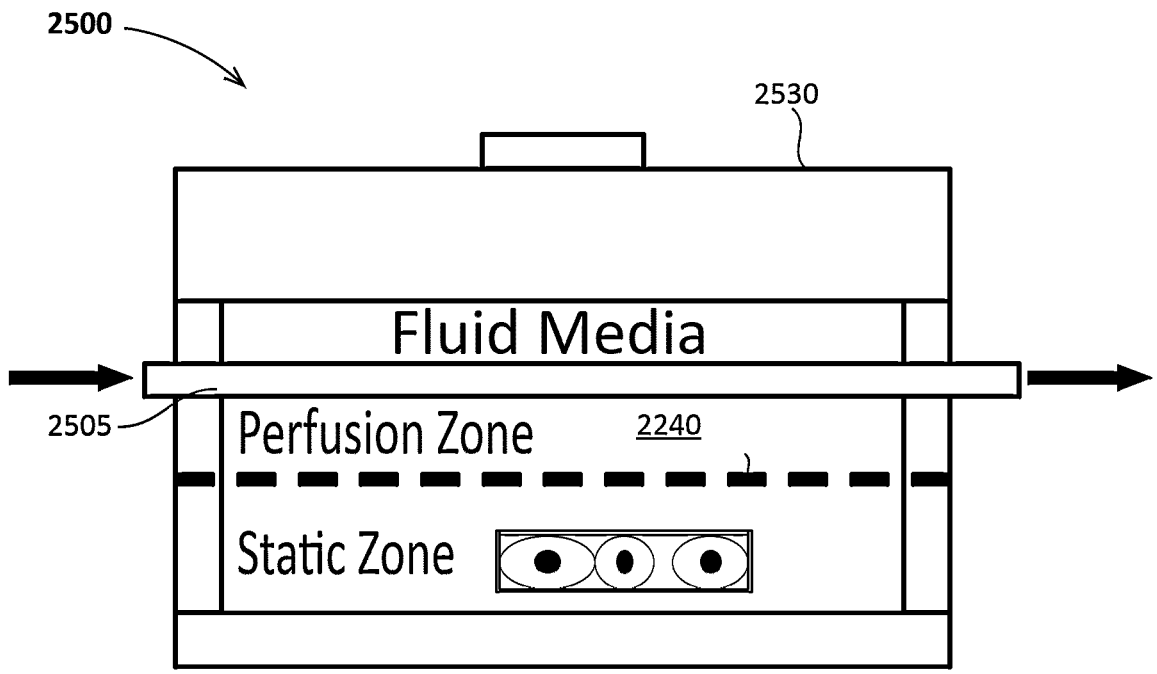
FIG. 25A shows a side view of an exemplary perfusion pipe through a fluid media.

FIG. 25A shows a side view of an exemplary perfusion pipe through a fluid media. As shown, a BCCB 2500 includes one or more pipes 2505 through the perfusion zone 2240. The pipes 2505, for example, may include a semipermeable membrane.

Figure 25B:
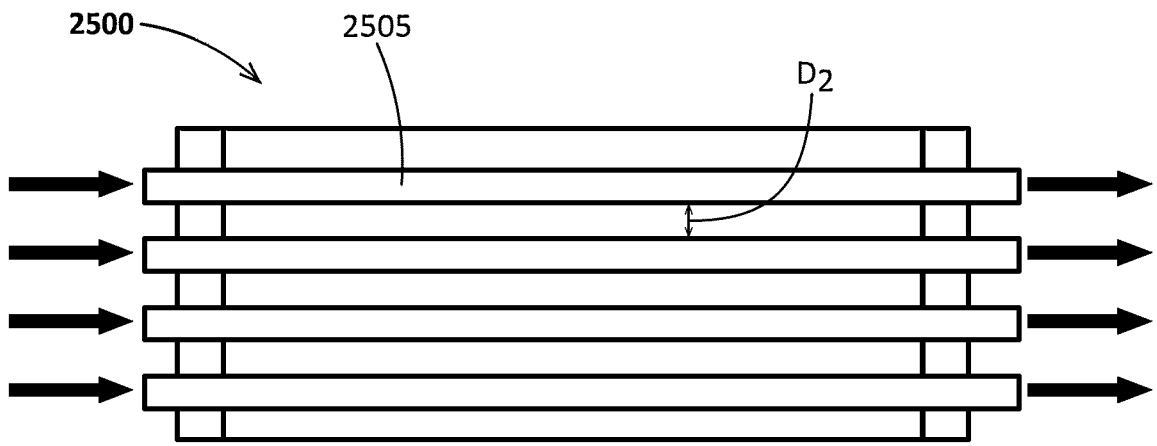
FIG. 25B shows a top view of the exemplary perfusion pipe described in FIG. 25A.

FIG. 25B shows a top view of the exemplary perfusion pipe described in FIG. 25A. As shown, the pipes 2505 are separated by a distance D2. For example, D2 may be configured such that the oxygen gradient between the pipes 2505 is less than a predetermined threshold.

Figure 26:
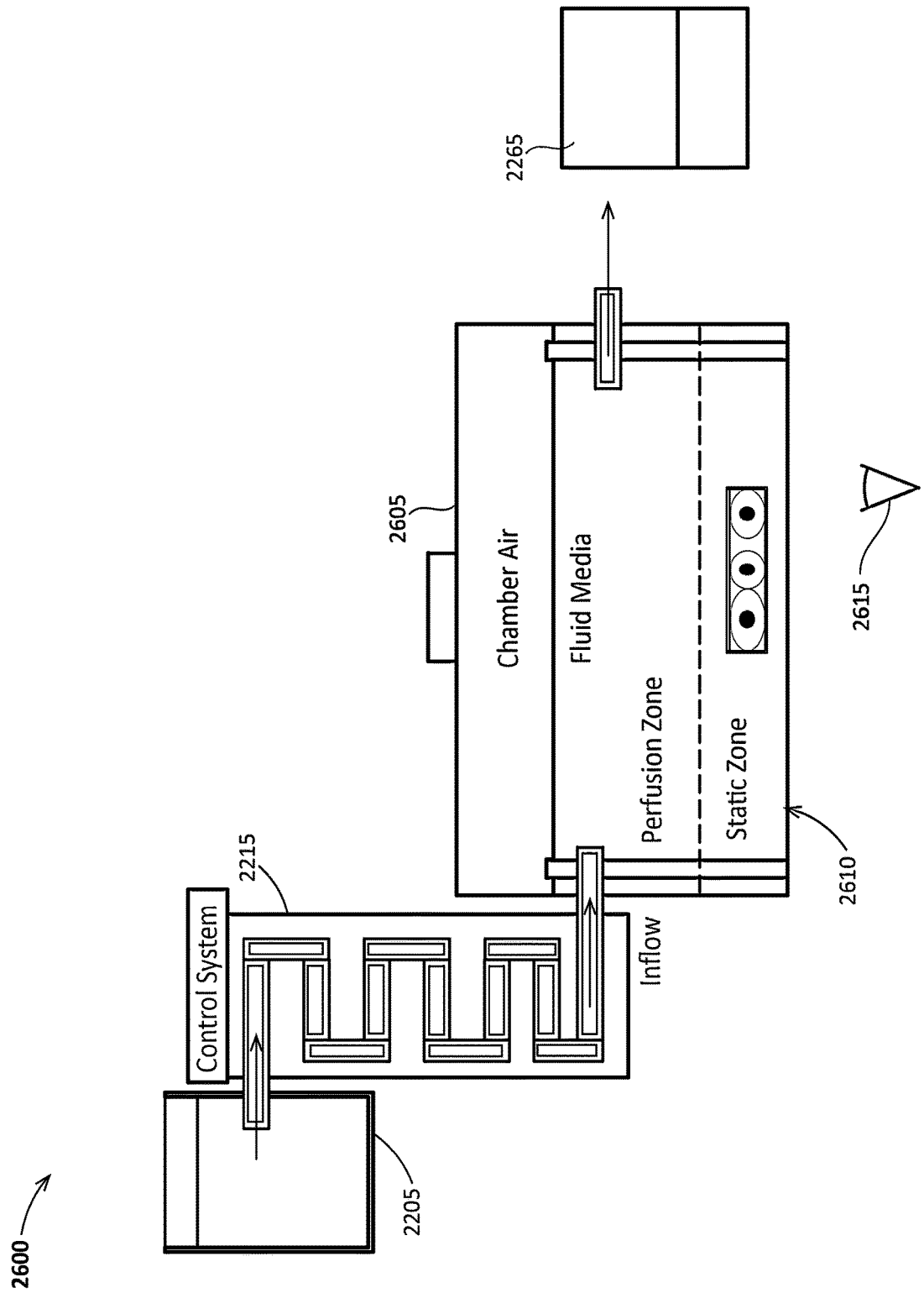
FIG. 26 shows an exemplary PCCS having an exemplary BCCB with a visualization feature.

FIG. 26 shows an exemplary PCCS having an exemplary BCCB with a visualization feature. In this example, a PCCS 2600 includes a BCCB 2605 having a bottom 2610 made with a transparent material (e.g., polystyrene). In some implementations, a depth of the fluid media 155 in the BCCB 2605 may be shallow. A microscope 2615 may be used to monitor the visual of the cell cultures 160 in the BCCB 2605.

Figure 27:
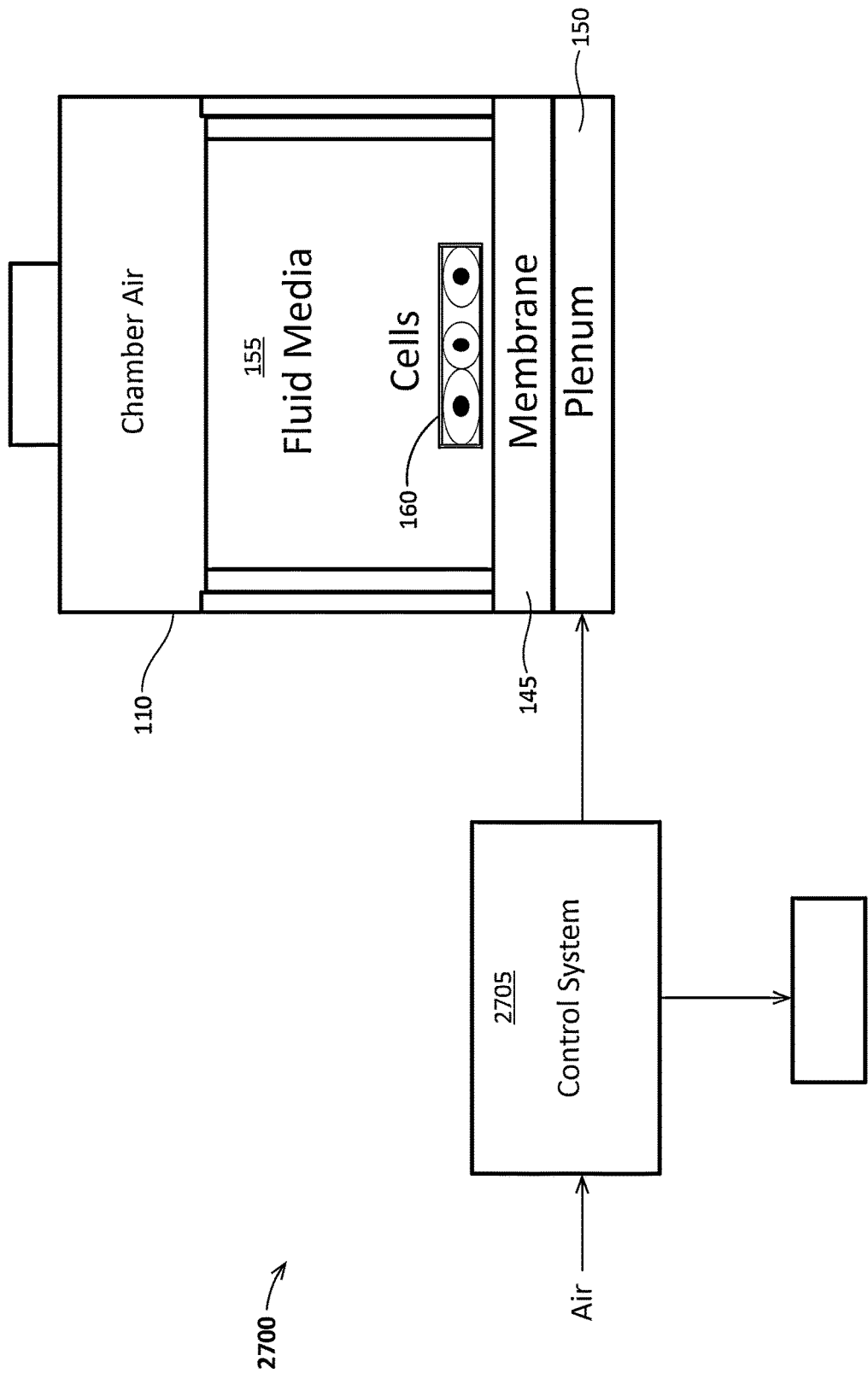
FIG. 27 shows an exemplary PCCS.

Various embodiments may include a perfusion zone to advantageously enable static cell culture without media changes, speed up cell expansion, and reduce labor. In some examples, a shallow depth and transparent bottom enables in-situ visualization FIG. 27 shows an exemplary PCCS. In this example, a PCCS 2700 includes a control system 2705 and the BCCB 110. For example, the control system 2705 may intake atmospheric air. For example, the control system 2705 may mix and filter the intake air into a predetermined mixture. The predetermined mixture may be delivered directly to the BCCB 110 through the plenum 150 and the gas permeable membrane 145. In this example, the plenum 150 is separated from the cell culture 160 and the fluid media 155. In some implementations, the gas permeable membrane 145 may be a gas permeable membrane but liquid impermeable membrane.

Figure 28:
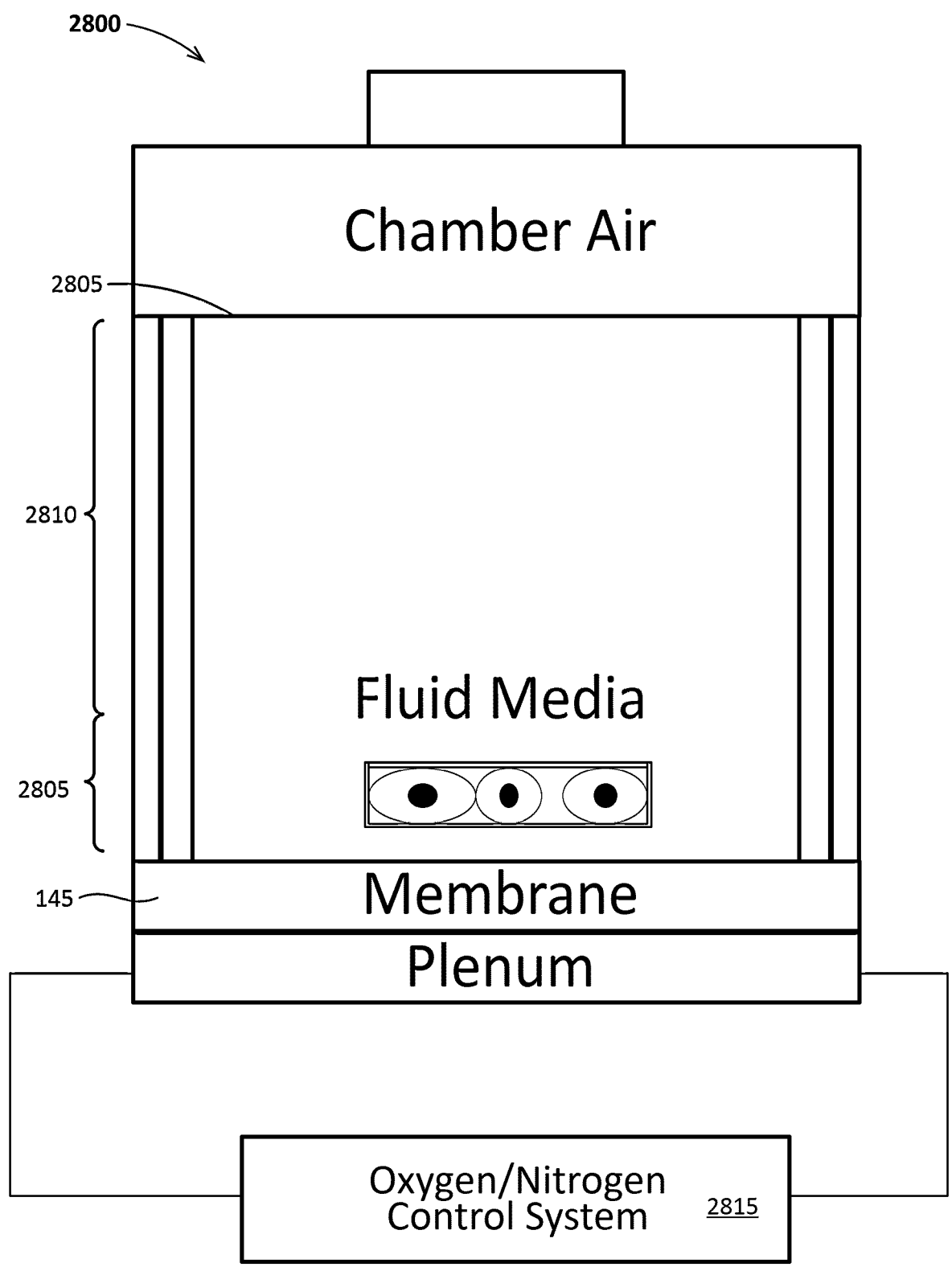
FIG. 28 shows an exemplary BCCB having exemplary oxygen gradient zones.

FIG. 28 shows an exemplary BCCB having exemplary oxygen concentration zones. As shown in FIG. 28, a BCCB 2800 may include multiple oxygen concentration zones. At a top of the fluid media 155 and at the bottom of the membrane 145 are both subject to boundary conditions of the plenum 150 (e.g., at 18% oxygen). In a middle region 2810, oxygen concentration may vary in the fluid media 155.

In some implementations, a control system 2815 (e.g., the ODGCPU 120) may regulate oxygen level to have a gradual oxygen gradient in the fluid media 155. For example, the cell cultures 160 may be exposed to a more controlled oxygen level appropriate for the cell type. Controlling conditions at the fluid media 155 around the cells at a much tighter range of oxygen may reduce the oxygen concentration required at the membrane 145. For example, cells near the membrane 145 may be advantageously prevented from over-oxygenated. Accordingly, the BCCB 2800 may generate more consistent cell culture output.

In various implementations, fluid communication interfaces (e.g., the gas permeable membrane 145) may be configured to achieve hypoxic conditions by maintaining a sub-ambient concentration of oxygen in the plenum 150.

Figure 29:
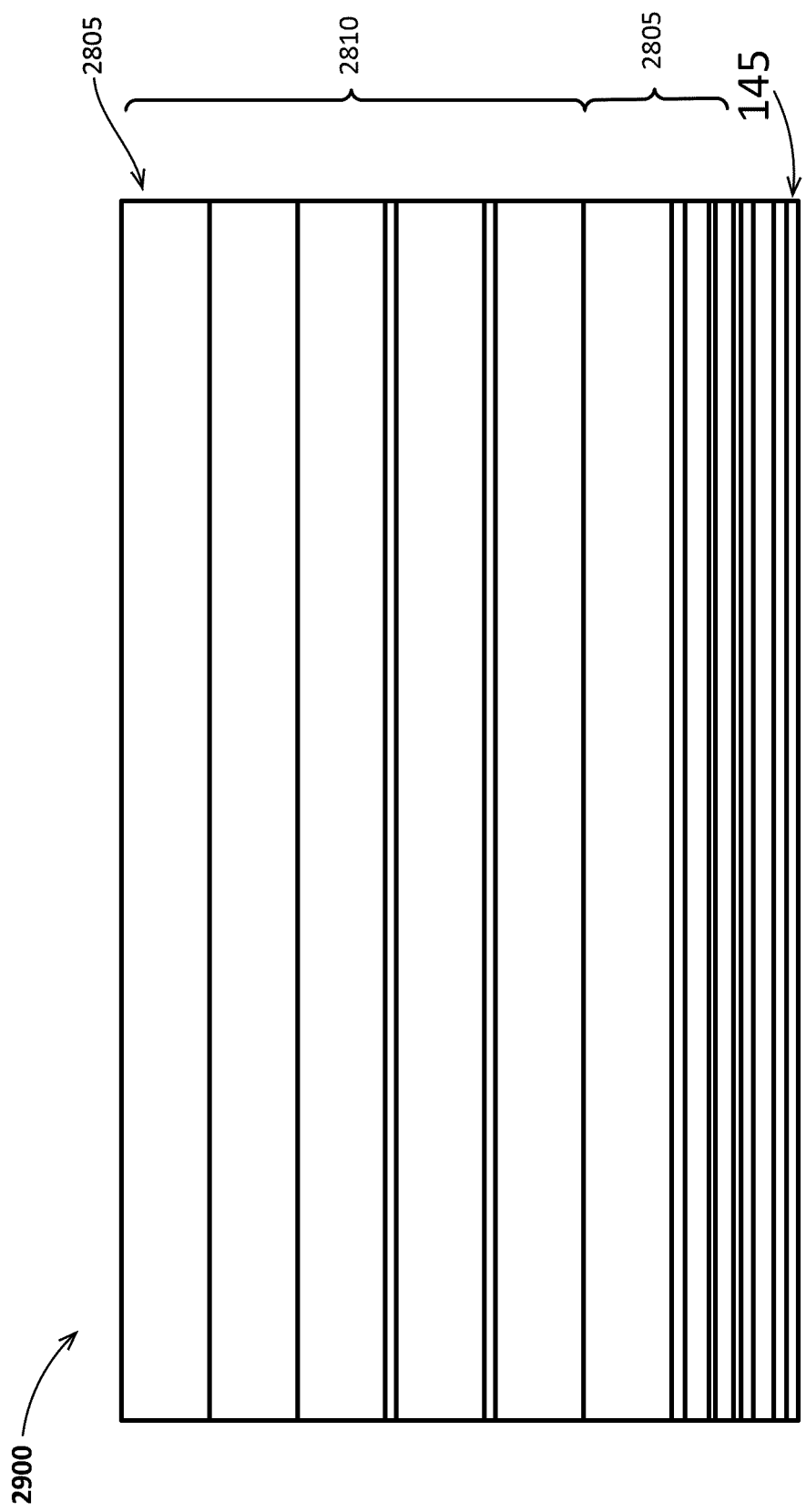
FIG. 29 is a topological diagram showing various oxygen gradient zones in an exemplary BCCB.
Figure 30:
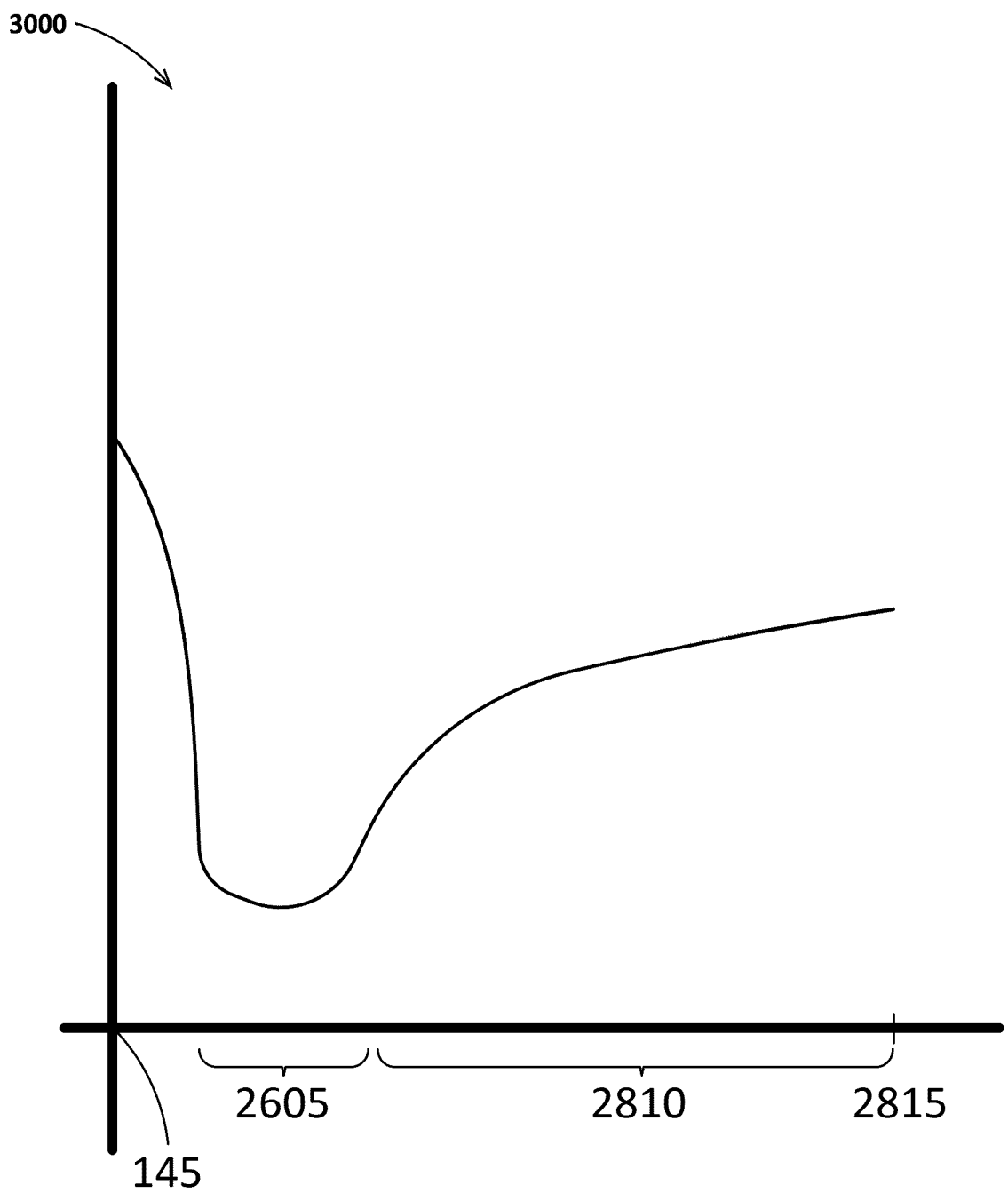
FIG. 30 is a graph showing a relationship between oxygen gradient concentration and a distance from the PMS of an exemplary BCCB.

FIG. 29 is a topological diagram showing various oxygen gradient zones in an exemplary BCCB. FIG. 30 is a graph showing a relationship between oxygen gradient concentration and a distance from the PMS of an exemplary BCCB. As shown, the oxygen concentration is highest at the top and near the bottom near the membrane 145. A gradual gradient is featured in the middle zone 2810. In some examples, oxygen in cell culture flasks and wells (e.g., the BCCB 110) may include multiple variables that change oxygen concentration available to cells over the course of the experiment. Some variables may be a gradient from the top of the cell culture, and oxygen consumption at the bottom of the cell. An oxygen gradient may, for example, be defined as $$\text{Gradient} = \frac{\Delta C}{\Delta x}$$

Where $\Delta C$ is the difference in concentration and $\Delta x$ is the difference in distance from a boundary condition (e.g., at the gas permeable membrane 145 where the gas mixture is supplied) to the cell culture. Because the BCCB includes at least two gas transfer interfaces, the oxygen gradient within the BCCB may be kept steady by a shorter distance between the cell culture to a gas permeable membrane. Accordingly, the BCCB may advantageously produce well-regulated cell culture products. In some examples, the oxygen gradient may be less than 0.2%/mm.

The concentration may be related to the partial pressure by Henry's Law: Cx=s*Px, where Px is the partial pressure of the gas of interest (e.g., O2 gas), and s is the solubility of that gas in the material. The solubility (s) may, for example, be given by Henry's constant, k, for water.

The gradient may, for example, vary over the height of the bioreactor. The gradient may, for example, only be uniform throughout the flask if the cell consumption is steady for an extended amount of time, a steady state. However, steady state may serve as a good reference point to compare different bioreactors (see Table 1, below, for illustrative calculations). Some flat tray-type culture dishes (e.g., stacking type) may be configured for 0.2 to 0.3 mL of volume, for a target height of 0.2 cm=2 mm, per square centimeter of cell culture surface area for wells and flasks. This may, for example, yield a partial pressure gradient of 9%/mm (18.6%/2 mm height) at steady state.

For a bioreactor with a silicone membrane on the bottom, there may, for example, be two gradients: 1) from the top of the fluid media to the cells, and 2) through the silicone membrane to the cells. Oxygen may, for example, move faster through silicone rubber than water due to higher solubility and diffusivity of oxygen in silicone than water. If oxygen transport through the membrane is sufficient to supply the cells' oxygen needs this may, for example, result in low gradients. If cell growth oxygen consumption exceeds the oxygen transport through the membrane, gradients may become asymmetric (e.g., larger at the bottom than the top). As an illustrative example, a bioreactor with a silicone membrane on the bottom (only) may have 10 cm depth of fluid (measured from the top of the fluid media), resulting in, for example, a maximum gradient of 18.6%/100 mm=0.2%/mm gradient from the top. The bottom membrane (e.g., single membrane) may, for example, be 0.01" (0.254 mm). Accordingly, the gradient may, for example, reach levels as high as 18.6%/0.254 mm=73%/mm.

Table 1 below provides illustrative bioreactors and corresponding calculated example partial pressure gradients.

TABLE 1

| | Partial pressure gradients | | | |
|---|---|---|---|---|
| | Measurement Point | Material at Measurement Point | Distance from gas supply (mm) | Partial pressure gradient for 18.6% supply (%/mm) |
| PLASTIC OPEN-AIR FLASK OR WELL | Top | Fluid media | 2.5 | 7.4% |
| | Bottom | Plastic | NA | NA |
| BIOREACTOR WITH SINGLE SILICONE RUBBER MEMBRANE | Top | Fluid media | 100 | 0.2% |
| | Bottom | Silicon rubber | 0.254 | 73.2% |

Figure 31:
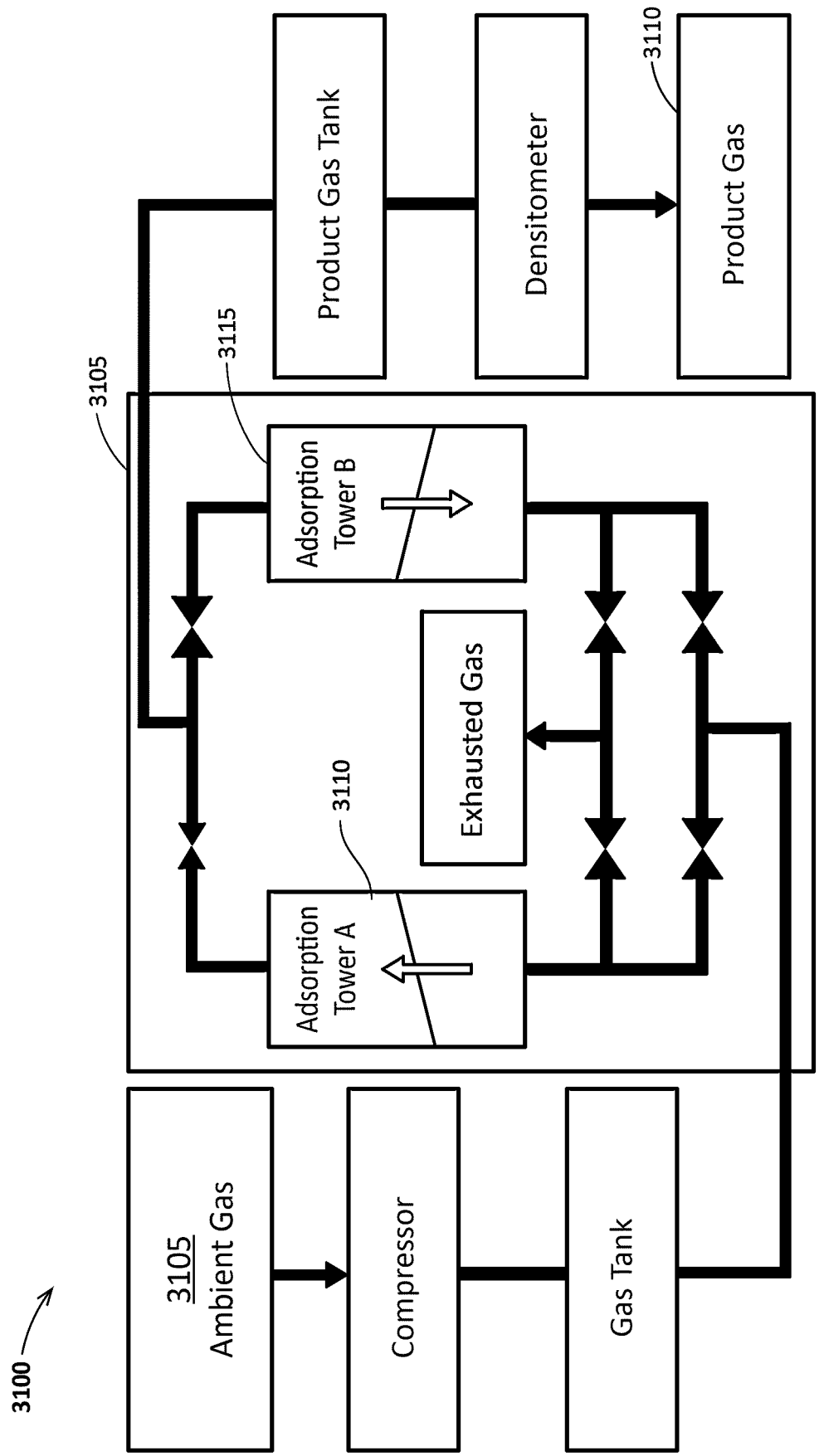
FIG. 31 is a block diagram showing an exemplary gas mixture generator (GMG) with a pressure swing absorption (PSA) module.

FIG. 31 is a block diagram showing an exemplary gas mixture generator (GMG 3100) with a pressure swing absorption (PSA) module. For example, the ODGCPU 120 may include the GMG 3100. For example, the GMG 3100 may intake atmospheric gas 3105 and filter oxygen, nitrogen, and other gases to generate a product gas 3110 required for a target cell culture (in a BCCB).

In this example, the GMG 3100 includes a PSA module 3115. The PSA module 3115, in this example, leverages a pair of absorption tanks 3120, 3125. The absorption tanks 3120, 3125 may regulate a gas mix by preferentially absorbing a specific gas. As an illustrative example without limitation, for nitrogen generation, the absorption tanks 3120, 3125 may include carbon molecular sieves (CMS) to preferentially absorb oxygen and let nitrogen pass. In some examples, generations of nitrogen may set oxygen percentages lower in gas output. In some implementations, the PSA module 3115 may utilize other absorption and filtration materials (e.g., zeolite) to generate the product gas 3110.

In some embodiments, the GMG 3100 may generate the product gas 3110 may be adjusted to compensate for an oxygen pressure variance caused by a variance in atmospheric pressure. For example, the GMG 3100 may advantageously provide a uniform culture environment at PCCS across different laboratories.

Figure 32A:
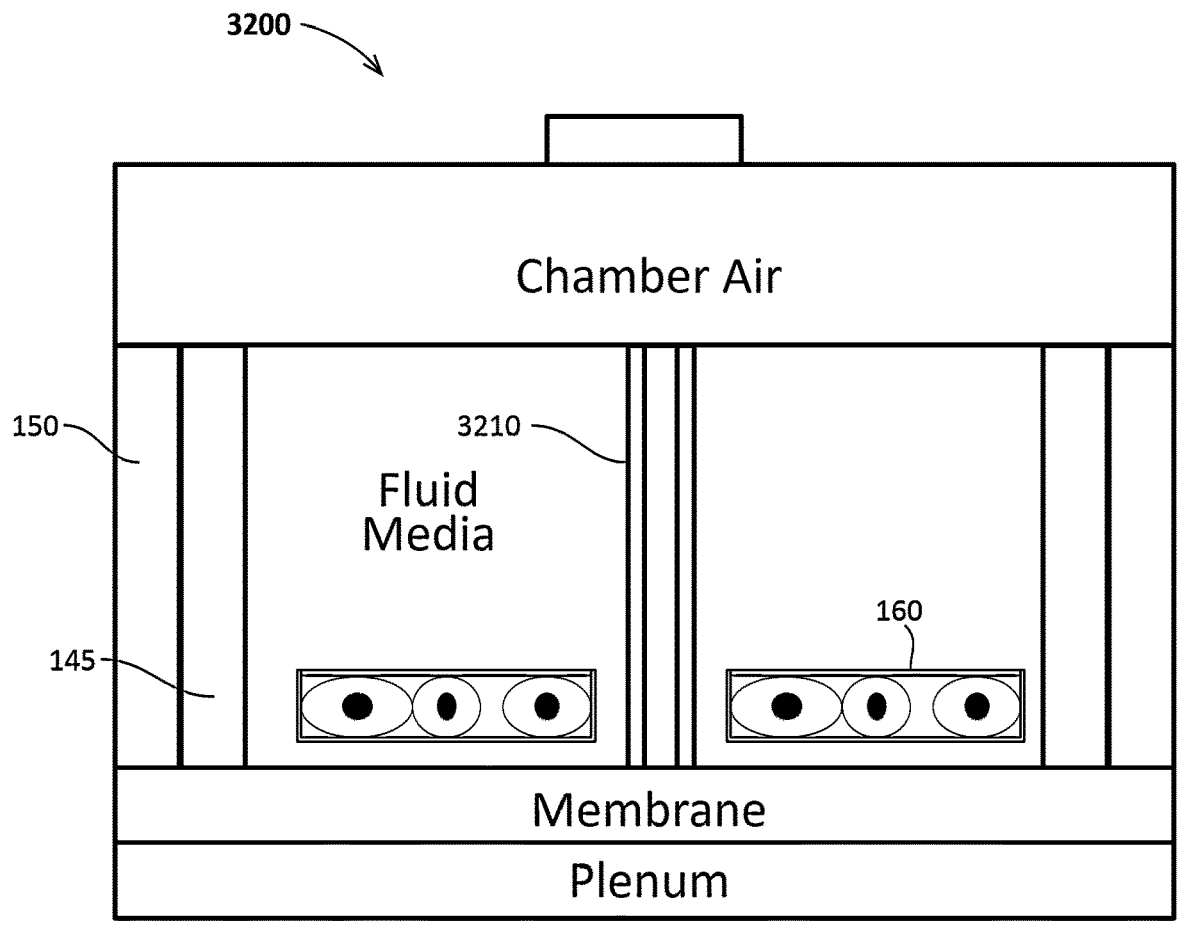
FIG. 32A and FIG. 32B show an exemplary BCCB having an exemplary PMS configuration.
Figure 32B:
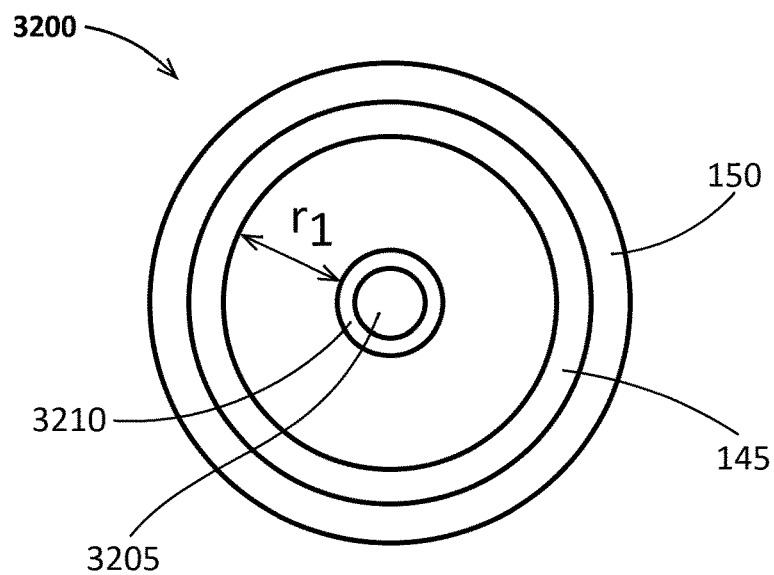

FIG. 32A and FIG. 32B show an exemplary BCCB having an exemplary PMS configuration. As shown in FIG. 32A, the BCCB 3200 includes a PMS tube 3210 at a center of the BCCB 3200. For example, the PMS tube 3210 may reduce the oxygen gradient in the fluid media 155. As shown in FIG. 32B, the PMS tube 3210 is located at the center of the BCCB 3200 of a radius r1. In this example, cells in the cell cultures 160 may be away from any fluid transfer interface at maximum distance of r1/2. For example, the oxygen gradient may be reduced by installing the PMS tube 3210.

Figure 33:
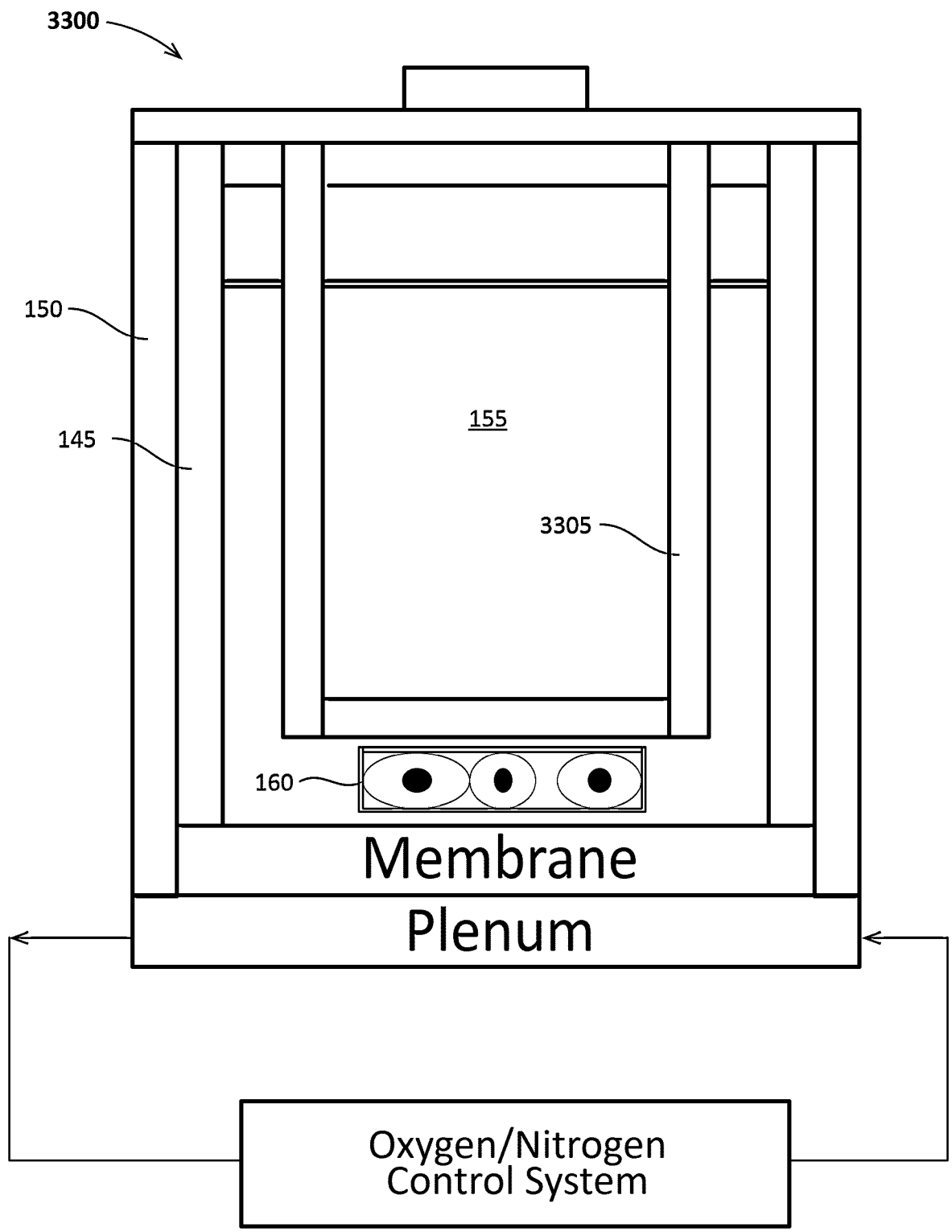
FIG. 33 shows an exemplary BCCB having an exemplary PMS configuration.

FIG. 33 shows an exemplary BCCB having an exemplary PMS configuration. In this example, a BCCB 3300 includes a drop-down plenum 3305 extending down from a top side of the BCCB 3300. The plenum 3305 may reduce a gradient at the cell culture 160 in the BCCB 3300.

Figures 34A, 34B:
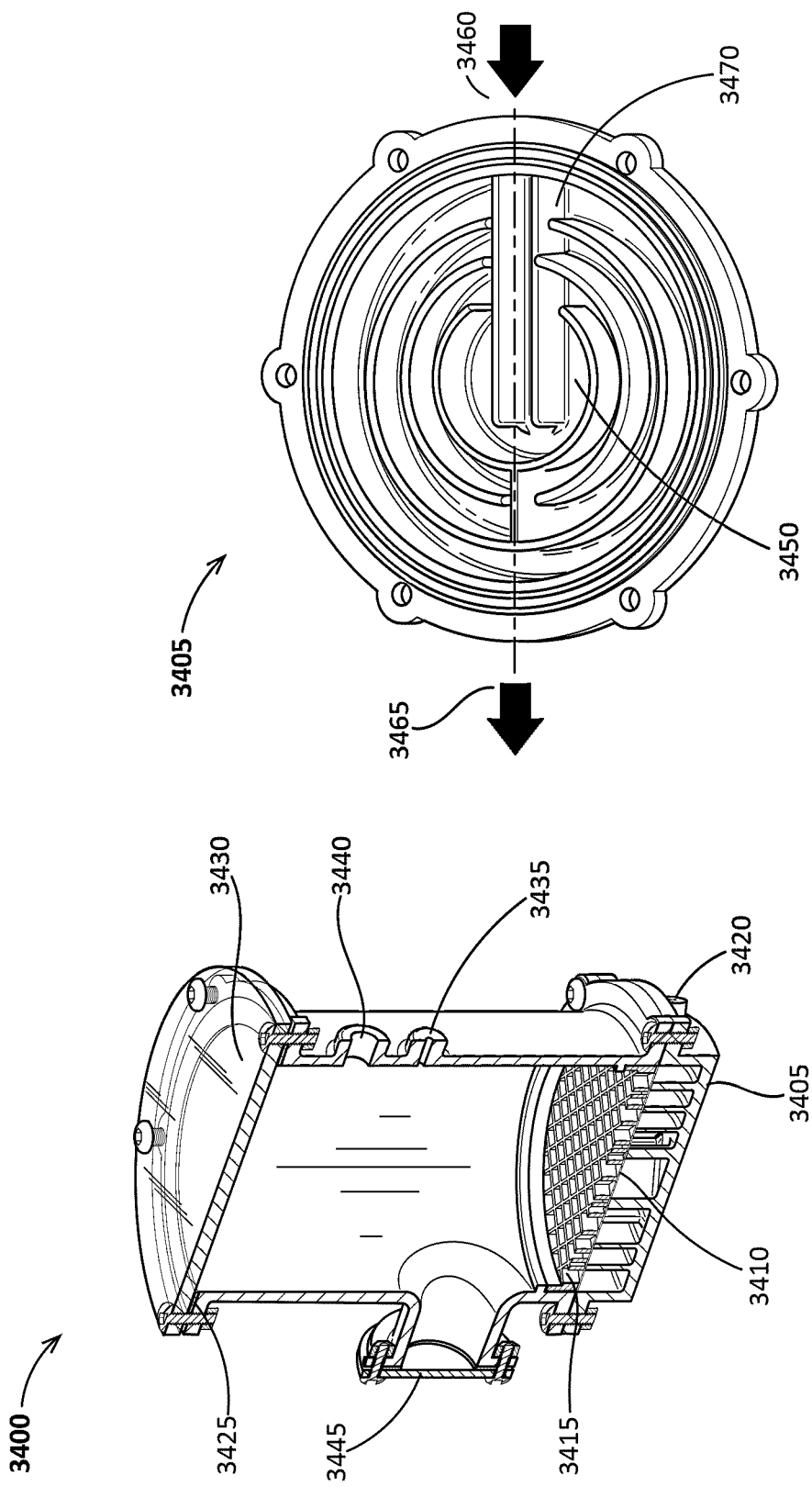
FIG. 34A is a cross-section diagram of an exemplary BCCB.
FIG. 34B shows an exemplary plenum tray.

FIG. 34A is a cross-section diagram of an exemplary BCCB 3400. In this example, the exemplary BCCB 3400 includes a media cavity 3401 and a plenum tray 3405 configured to be assembled together along a first axis with a gas-permeable membrane 3410 between them. The gas-permeable membrane 3410 may, for example, be stretched during an assembly process such that a generated tension in the gas-permeable membrane 3410 maintains a substantially planar surface of the gas-permeable membrane 3410 when a (predetermined) maximum pressure is applied to an underside of the gas-permeable membrane 3410.

The exemplary BCCB 3400 includes a membrane containment screen 3415. The membrane containment screen 3415 may, for example, be substantially planar. For example, the membrane containment screen 3415 may define a first aperture into a first cavity into the media cavity 3401. As shown, a first peripheral wall of the media cavity 3401 circumscribes and extends past the membrane containment screen 3415. Accordingly, the first peripheral wall may form a 'lip' extending past the membrane containment screen 3415.

As shown, the plenum tray 3405 includes a plenum air inlet 3420. For example, the plenum air inlet 3420 may be coupled to a gas supply unit to receive gas mixture to be released into the fist cavity. In some implementations, the gas permeable membrane 3410 is sized to cover and extend beyond the first aperture and the plenum air inlet 3420. The exemplary BCCB 3400 also includes a cover gasket 3425 to sealingly cover the exemplary BCCB 3400.

In this example, the cover gasket 3425 includes an inspection window 3430. For example, a user may visually monitor a cell culture within the exemplary BCCB 3400 via the inspection window 3430. The BCCB 3400 further includes a vent 3435 and a liquid exchange socket 3440. For example, waste fluid and liquid may be removed from the BCCB 3400 via the vent 3435 and the liquid exchange socket 3440. The BCCB 3400 also includes an oxygen measurement window 3445 to measure oxygen concentration within the BCCB 3400.

FIG. 34B shows an exemplary plenum tray 3405. The plenum tray 3405 includes, in this example, concentric baffle rings 3450 configured such that mass flow from an inlet 3460 to an outlet 3465 is substantially parallel to the planar surface between the media cavity 3401 and the plenum tray 3405. For example, the concentric baffle rings 3450 may be of decreasing cross-sectional area. The concentric baffle rings 3450 may be decreasing in diameter, for example. The baffle rings 3450 may, for example, include a substantially equal height of a depth of the plenum tray 3405. Accordingly, the baffle rings 3450 may, for example, substantially prevent flow over a top or bottom edge of the baffle rings.

Each of the baffle rings 3450 may, in some implementations, be circumferentially interrupted by at least two apertures. An aperture may, for example, be substantially a full height of the baffle ring. A pair of apertures in a particular baffle ring may, by way of example and not limitation, be disposed substantially 180° from each other (e.g., on opposite sides of the baffle ring). Each of the baffle rings 3450 may, for example, have apertures offset from apertures of an inner and/or outer baffle ring. Accordingly, flow of fluid may be forced to pass through an aperture of one baffle ring wall, and to flow laterally before reaching an aperture in a next baffle ring wall. In various embodiments the baffle rings 3450 may form a plenum labyrinth 3470. The plenum labyrinth 3470 may, for example, advantageously reduce a lateral pressure distribution across the plenum. In some embodiments, at least some mass may exit vertically through the gas-permeable membrane. Accordingly, an even pressure distribution, for example, across substantially the entire membrane may be induced.

Figure 35:
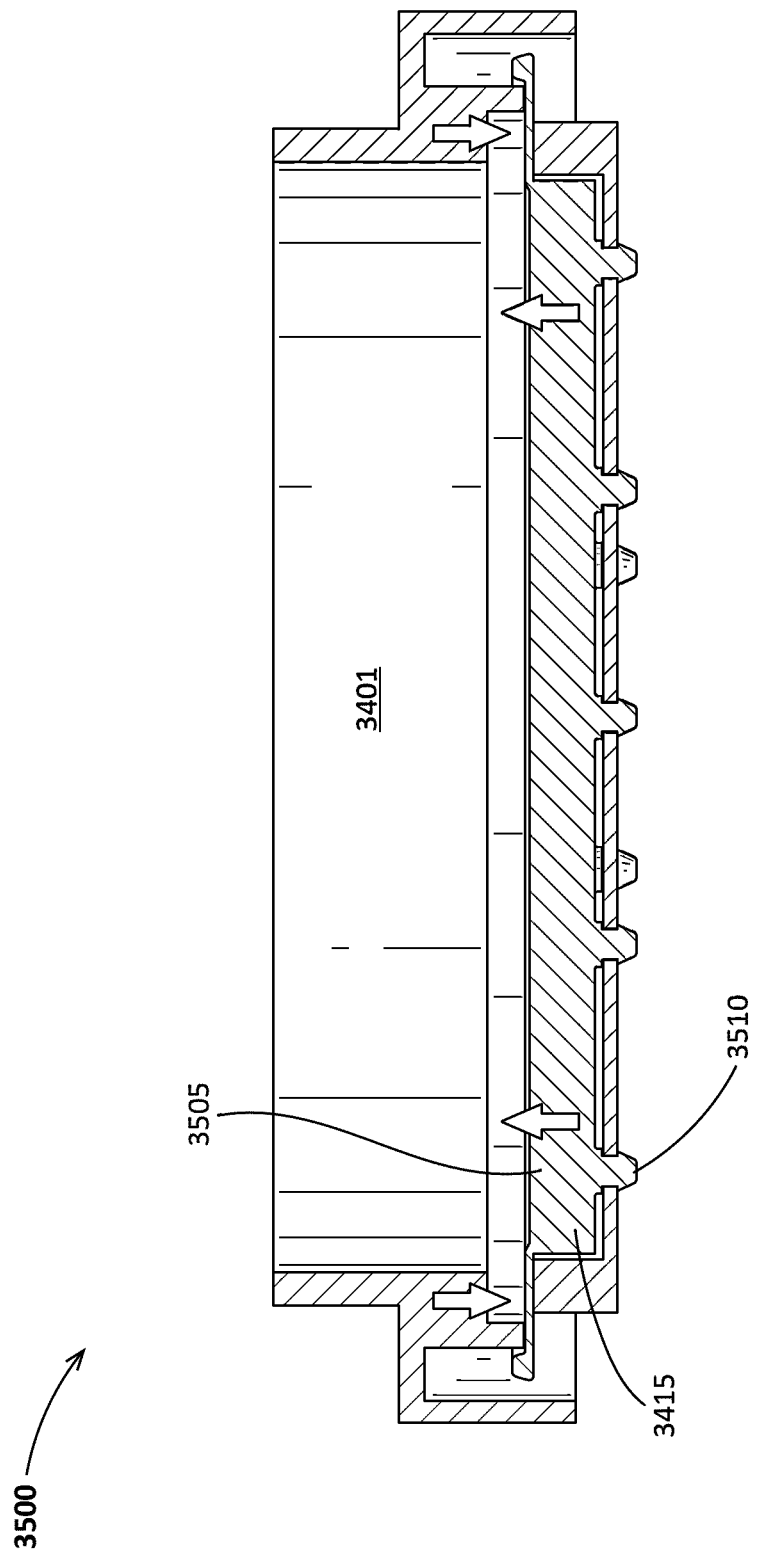
FIG. 35 is an assembly diagram of an exemplary overmolded membrane engaging an underside of an exemplary BCCB.
Figure 36D:
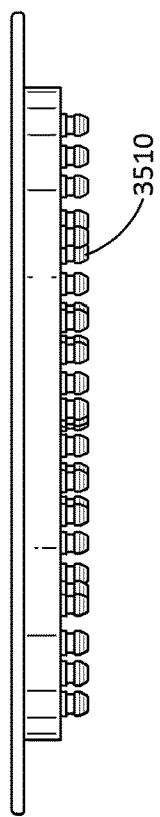
FIG. 36A, FIG. 36B, FIG. 36C, and FIG. 36D depict various views of an exemplary overmolded membrane.
Figure 36B:
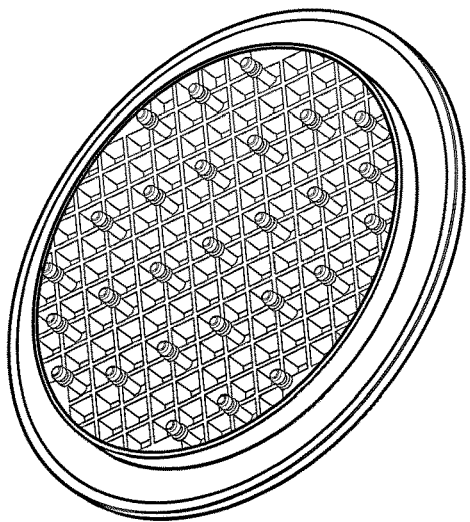
Figure 36A:
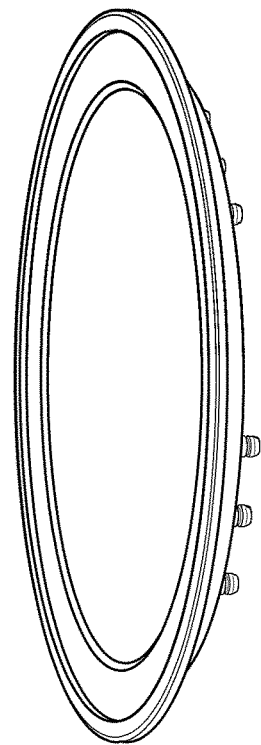
Figure 36C:
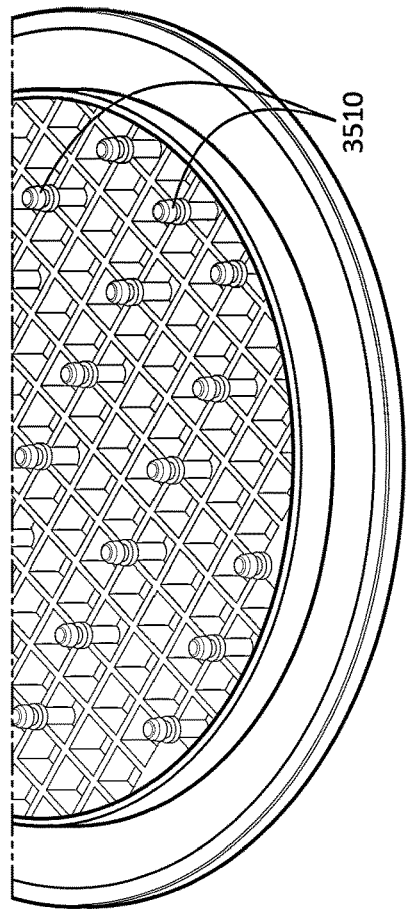

FIG. 35 is an assembly diagram of an exemplary overmolded membrane engaging an underside of an exemplary BCCB. For example, an underside 3500 may be an underside portion of the BCCB 3400. As shown, the underside 3500 includes an overmolded membrane 3505. The 3505 is fixated above the membrane containment screen 3415. A peripheral wall of the media cavity 3401 may form a lip to fixedly couple the 3505 to the membrane containment screen 3415. Accordingly, the overmolded membrane 3505 may be captured in a stretched state. Tensioning of the overmolded membrane 3505 may advantageously cause the membrane 3505 to form a planar surface separating the media cavity 3401 and the plenum tray 3405.

As shown, the membrane containment screen 3415 includes engagement element 3510. In some embodiments, multiple engagement elements 3510 may be embedded in the gas permeable membrane. The engagement elements may extend outward from an underside of the membrane. For example, the engagement elements may extend substantially orthogonally from the membrane. The membrane may, for example, be overmolded onto the engagement elements. In some embodiments, the engagement elements 3510 may be substantially rigid. For example, the engagement elements 3510 may be (stainless) steel.

FIG. 36A, FIG. 36B, FIG. 36C, and FIG. 36D depict various views of an exemplary overmolded membrane. As shown, the engagement elements 3510 may be evenly distributed to engage the plenum tray 3405.

Figure 37:
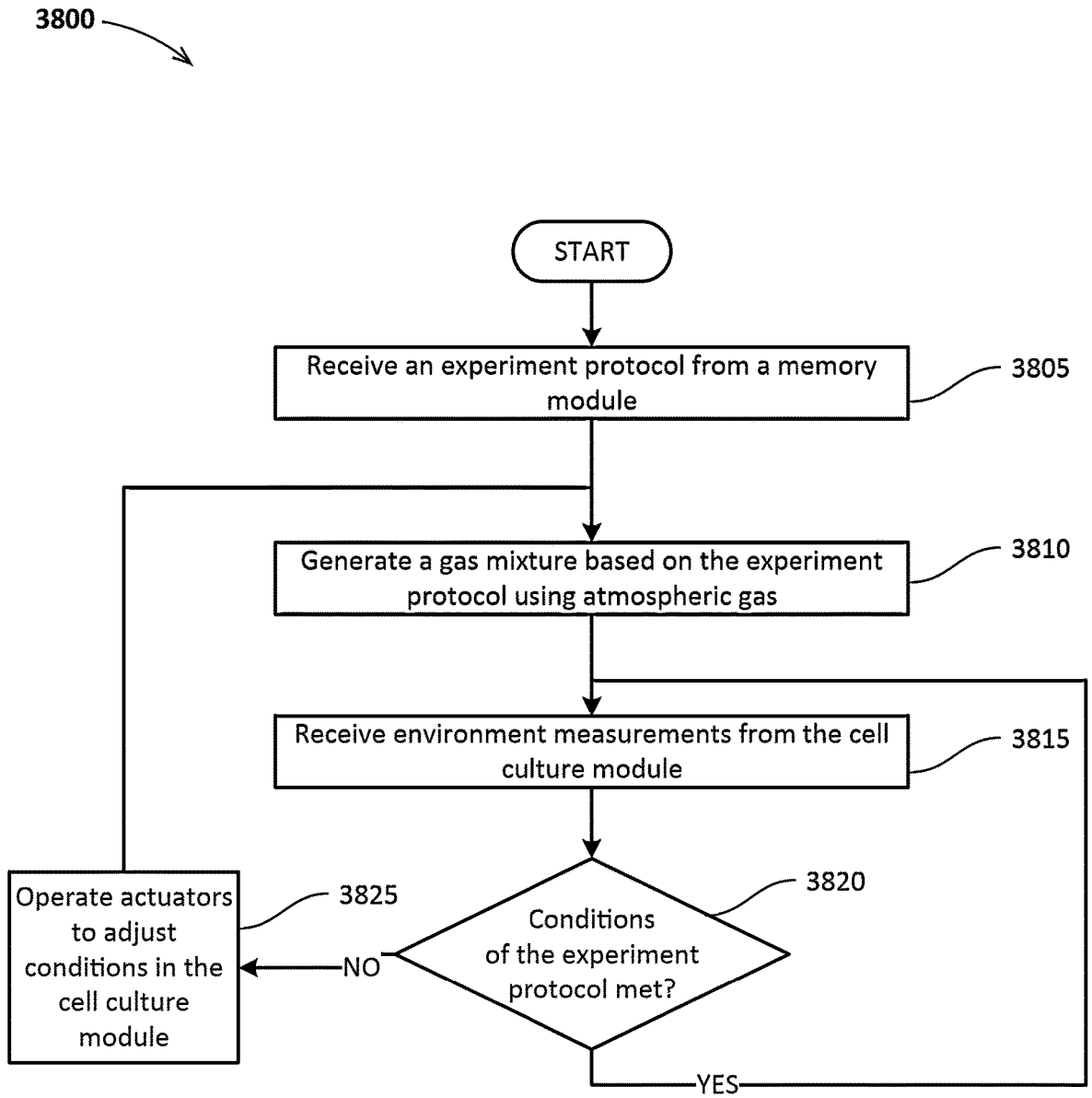
FIG. 37 is a flowchart illustrating an exemplary BCCB configuration method.

FIG. 37 is a flowchart illustrating an exemplary BCCB configuration method. For example, the method 3700 may be performed by a user (e.g., a researcher). For example, the method 3700 may be performed automatically by a computer program (e.g., the programming server 125). In this example, the method 3700 begins in step 3705 when a cell type and target conditions for the cell type is received. For example, a researcher may receive the cell type and the target conditions based on an experiment plan. In step 3710, dimensions and specifications of a cell culture module (e.g., a BCCB 110) is received. For example, the researcher may receive a height and width of a cell culture module used for the experiment. For example, the specifications may include a depth of the fluid media in the cell culture module.

Next, target placements of cell cultures in the cell culture module are received in step 3715. After the target placement is received, in step 3720, target boundary conditions are determined based on the cell type, a culture development phase of the cell culture, and the target placement. For example, the cell culture may require a hypoxia, in vitro oxygen concentration. In step 3725, a spatial distribution of the gas transfer interfaces in the cell culture module is determined. Next, placement of at least two gas transfer interfaces in the cell culture module is generated in step 3730. For example, the spatial distribution of gas transfer interfaces (the PMS 1400) may be determined to minimize an oxygen concentration gradient between the gas transfer interfaces. For example, the placement of at least two gas transfer interfaces in the cell culture module may be generated based on the spatial distribution while preserving a horizontal plane for cell growth.

In a decision point 3735, it is determined whether the target conditions are met. For example, the target conditions may be generated based on a simulation based on the cell culture placement, the dimension of the cell culture module, and/or the placement of the gas transfer interfaces. If the target conditions are met, the method 3700 ends. If the target conditions are not met, in step 3740, one or more specification of the cell culture module are adjusted, and the step 3710 is repeated. For example, a cell culture with other dimensions is selected. For example, the placement of the cell culture may be adjusted. For example, more gas transfer interfaces may be added.

Figure 38:
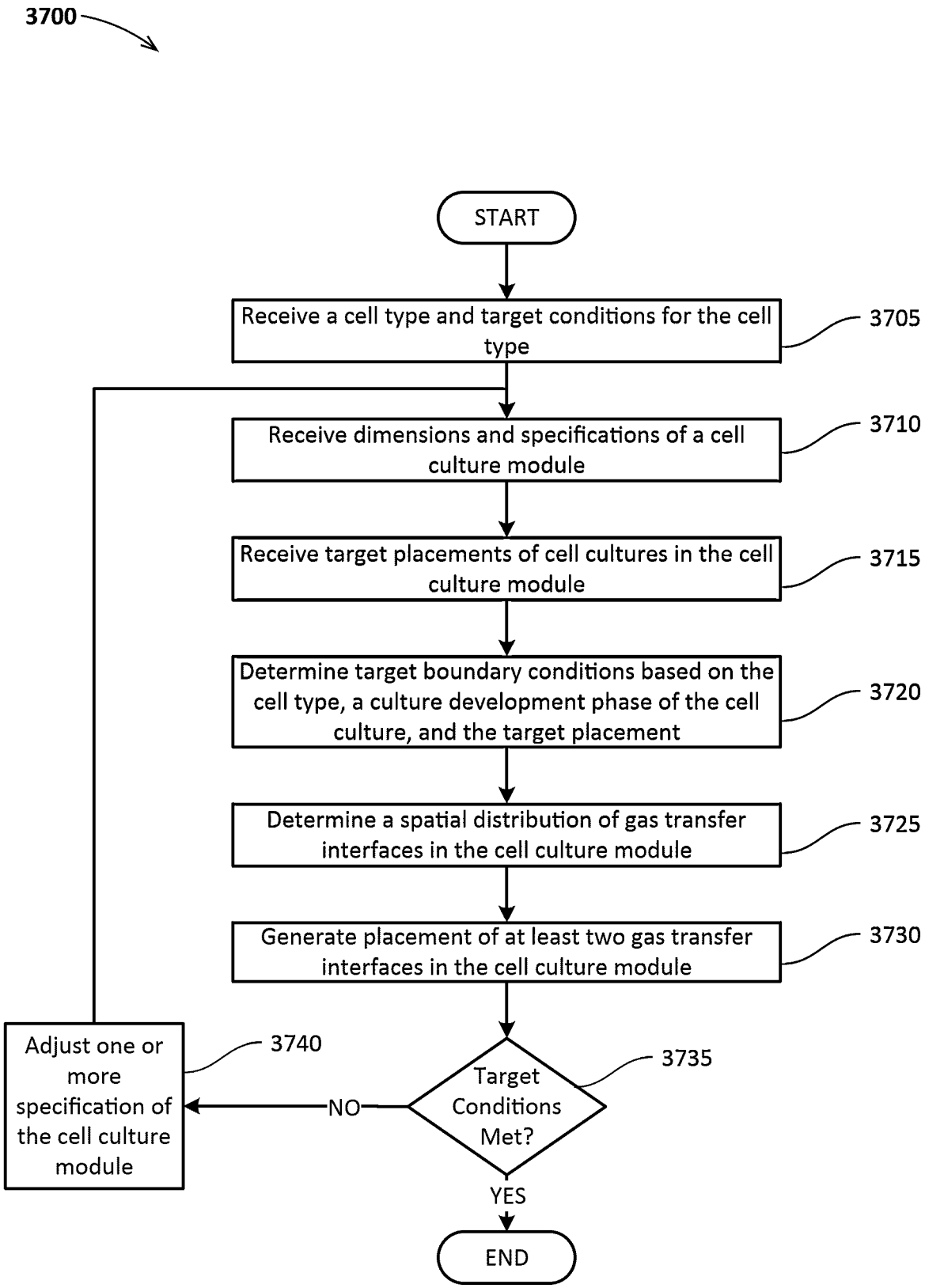
FIG. 38 is a flowchart illustrating an exemplary BCCB control method.

FIG. 38 is a flowchart illustrating an exemplary BCCB control method 3800. For example, the controller 115 may be configured to perform the method 3800 to automatically regulate a cell culture environment in the BCCB 110. In this example, the method 3800 begins when an experiment protocol from a memory module is received 3805. For example, the processor 225 may retrieve an experimental protocol from the memory 220. Next, a gas mixture is generated based on the experimental protocol using atmospheric gas. For example, the controller 115 may control the ODGCPU 120 to generate a gas mixture of predetermined gas ratio using the PSA 230. In step 3815, environmental measurements are received form the cell culture module. For example, the controller 115 may receive sensor input from the sensor circuit 405. In a decision point 3820, it is determined whether conditions of the experiment protocol are met. For example, the processor 225 may compare the received environmental measurement to conditions specified in the experiment protocol. If conditions of the experiment protocol are met, the step 3815 is repeated. If conditions of the experiment protocol are not met, in step 3825, actuators are operated to adjust conditions in the cell culture module, and the step 3810 is repeated. For example, the controller 115 may adjust a vent of the BCCB 110. For example, the controller 115 may increase a concentration of oxygen in the gas mixture. For example, the controller 115 may turn on the humidification unit 715. For example, the controller 115 may adjust the pressure valve 710.

Although various embodiments have been described with reference to the figures, other embodiments are possible. As an illustrative example, oxygen demand may vary significantly during cell growth phases. Not providing accurate and cell/tissue and phase specific oxygen concentration and not adjusting microenvironment factors in a cell culture bioreactor can result in lower cell yield, low viability, accelerated aging, low repeatability, and/or inducing cultured cells to adapt to an undesirable metabolic and growth state. Accordingly, some embodiments may be configured to provide a controllable oxygen level. The oxygen may be non-ambient (e.g., relative to a surrounding environment). For example, some embodiments may be configured to provide a hypoxic environment (relative to the room) such that target cells may be cultured in an environment having a similar oxygen level that they would have in the body (e.g., normoxic in muscle tissue may be hypoxic outside of the body). Accordingly, various embodiments may advantageously enable culturing cells at tightly controlled environmental conditions that may, for example, not be possible and/or feasible using standard incubators, culture dishes, and/or bioreactors. For example, some embodiments may advantageously reduce a gas concentration gradient across cell media. Some embodiments may, for example, advantageously reduce temporal variance in gas concentration gradient.

In certain embodiments, multiple cell culture vessels (e.g., the BCCB 110) may be connected to a single gas concentration component that delivers a product gas to all culture vessels. In certain embodiments, a product gas (e.g., the product gas 3110) may be controlled using one or more sensors (e.g., dissolved oxygen, pH, temperature, humidity, chemical sensing) embedded or submerged in the culture vessel. By this measure, the closed loop process may reduce a need for frequent operator engagement.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Temporary auxiliary energy inputs may be received, for example, from chargeable or single use batteries, which may enable use in portable or remote applications. Some embodiments may operate with other DC voltage sources, such as batteries, for example. Alternating current ($\Delta C$) inputs, which may be provided, for example from a 50/60 Hz power port, or from a portable electric generator, may be received via a rectifier and appropriate scaling. Provision for $\Delta C$ (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In an illustrative aspect, a cell culture system (e.g., 100) may include a manifold (e.g., 105). The system may include multiple cell culture modules (e.g., 110). Each module may, for example, be independently and releasably coupled to at least one of multiple coupling sites of the manifold. Each cell culture module of the multiple cell culture modules may, for example, include a chamber configured to hold a nutrient capacitive medium (e.g., 155). Each module may include a cell growth surface configured to support a cell culture (e.g., 160) disposed within the nutrient capacitive medium. Each module may include multiple gas transfer interfaces spatially distributed in relation to the cell growth surface and configured such that the nutrient capacitive medium is in gaseous communication with a controlled gas source (e.g., 130) through the multiple gas transfer interfaces. Each gas transfer interface may include, for example, a plenum (e.g., 150) in gas communication with the manifold. Each gas transfer interface may include a gas permeable membrane (e.g., 145) separating the nutrient capacitive medium and the plenum. The gas transfer interfaces may, for example, be disposed at least on sides and on a top of the cell culture such that a concentration of at least one target gas in the nutrient capacitive medium is selectively controlled by maintaining predetermined boundary conditions of the cell growth surface via the multiple gas transfer interfaces.

The multiple gas transfer interfaces may, for example, be disposed within the nutrient capacitive medium.

The multiple gas transfer interfaces may, for example, be configured to achieve hypoxic conditions by maintaining a sub-ambient concentration of oxygen in the plenum.

The cell culture system may include, for example, a control unit coupled to the manifold and configured to control the predetermined boundary conditions in the multiple cell culture modules coupled to the manifold.

The control unit further may include, for example, a pressure swing adsorption module configured to intake atmospheric gas and generate a gas mixture in a predetermined ratio. The gas mixture may include, for example, gas components of the intake atmospheric gas.

The control unit may include, for example, a membrane gas concentrator configured to intake atmospheric gas to generate a gas mixture in a predetermined ratio. The gas mixture may include, for example, gas components of the intake atmospheric gas.

The control unit may include, for example, a memory and a processor configured to execute programmable protocols stored in the memory. The memory may, for example, be configured to receive at least one user-defined protocol.

The control unit may include, for example, sensor elements configured to measure conditions within the nutrient capacitive medium. The programmable protocols may, for example, be configured to generate instructions based on the measured conditions.

The control unit may include, for example, a battery such that the cell culture system is portable.

The cell culture module may, for example, include a tubular gas transfer interface, wherein gas mixture is diffused radially from the tubular gas transfer interface into the nutrient capacitive medium.

At least one of the multiple cell culture modules may include, for example, stackable shelves disposed vertically on each other. The stackable shelves may, for example, include a hydrophilic polystyrene top layer configured to retain cells in a cell culture, and may, for example, include a gas permeable bottom layer configured to provide oxygen to cell cultures at a lower shelf, such that a uniform gas concentration is provided at each level of the shelves and a horizontal cell growth surface is preserved.

The concentration of at least one target gas may, for example, be generated based on intake from an atmospheric gas using pressure swing adsorption.

The concentration of at least one target gas may, for example, be controlled at hypoxia, relative to in vivo normoxia. The concentration of at least one target gas may, for example, be controlled at hypoxia, relative to in vitro normoxia. The concentration of at least one target gas may, for example, be controlled at normoxia, relative to in vivo normoxia. The concentration of at least one target gas may, for example, be controlled at normoxia, relative to in vitro normoxia.

A gradient of the concentration of at least one target gas may, for example, be less than 0.2%/mm.

In an illustrative aspect, a cell culture system (e.g., 100) may, for example, include multiple cell culture modules (e.g., 110) independently and releasably coupled to a manifold (105). Each of the cell culture modules may, for example, include a chamber configured to hold a nutrient capacitive medium (e.g., 155). Each module may, for example, include a cell growth surface configured to support a culture (e.g., 160) disposed within the nutrient capacitive medium. Each module may include, for example, multiple gas transfer interfaces spatially distributed in relation to the cell growth surface and configured such that the nutrient capacitive medium is in fluid communication with a controlled gas source (e.g., 130) through the multiple gas transfer interfaces.

Each of the gas transfer interfaces may, for example, include a plenum (e.g., 150) in fluid communication with the manifold. Each of the gas transfer interfaces may, for example, include a gas permeable membrane (e.g., 145) separating the nutrient capacitive medium and the plenum. A concentration of at least one target gas in the nutrient capacitive medium may, for example, be selectively controlled by maintaining predetermined boundary conditions of the cell growth surface via the multiple gas transfer interfaces.

At least some of the multiple gas transfer interfaces may, for example, be disposed on sides and on a top of the cell culture module such that a horizontal cell growth surface is preserved at a bottom of the cell culture module.

At least one of the multiple gas transfer interfaces may, for example, be disposed within the nutrient capacitive medium.

The gas transfer interfaces may, for example, be configured to achieve hypoxic conditions by maintaining a sub-ambient concentration of oxygen in the plenum.

The manifold may, for example, include a control unit configured to control the predetermined boundary conditions in the cell culture modules coupled to the manifold.

The control unit may, for example, include a pressure swing adsorption module configured to intake atmospheric gas to generate a gas mixture in a predetermined ratio. The gas mixture may, for example, include gas components of the intake atmospheric gas.

The control unit may include, for example, a membrane gas concentrator configured to intake atmospheric gas to generate a gas mixture in a predetermined ratio. The gas mixture may, for example, include gas components of the intake atmospheric gas.

The control unit may include, for example, a memory and a processor configured to execute programmable protocols stored in the memory. The memory may, for example, be configured to receive a user-defined protocol.

The control unit may include, for example, sensor elements configured to measure conditions within the nutrient capacitive medium. The programmable protocols may, for example, be configured to generate instructions based on the measured conditions.

The control unit may include, for example, a battery such that the cell culture system is portable.

At least one of the multiple cell culture modules may include, for example, a tubular gas transfer interface. Gas mixture may, for example, be diffused radially from the tubular gas transfer interface into the nutrient capacitive medium.

At least one of the multiple cell culture modules may include, for example, stackable shelves disposed vertically on each other. The stackable shelves may, for example, each include a hydrophilic polystyrene top layer configured to retain cells in a cell culture. Each stackable shelf may, for example, include a gas permeable bottom layer configured to provide oxygen to cell cultures at a lower shelf. Accordingly, for example, a uniform gas concentration may be advantageously provided at each level of the shelves and a horizontal cell growth surface may, for example, be advantageously preserved.

The concentration of at least one target gas may, for example, be generated based on intake from an atmospheric gas using pressure swing adsorption.

The concentration of at least one target gas may, for example, be generated based on intake from an atmospheric gas using membrane separation.

The concentration of at least one target gas may, for example, be controlled at hypoxic conditions relative to an in vivo environment.

The concentration of at least one target gas may, for example, be controlled at hypoxic conditions relative to an in vitro environment.

The concentration of at least one target gas may, for example, be controlled at normoxic conditions relative to an in vivo environment.

The concentration of at least one target gas may, for example, be controlled at normoxic conditions relative to an in vitro environment.

The concentration of at least one target gas may, for example, be controlled at hyperoxic conditions relative to an in vivo environment.

The concentration of at least one target gas may, for example, be controlled at hyperoxic conditions relative to an in vitro environment.

A gradient of the concentration of at least one target gas may, for example, be less than 0.2%/mm.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

The invention claimed is:

1. A cell culture system comprising:
   a manifold; and,
   a plurality of cell culture modules each independently and releasably coupled to at least one of a plurality of coupling sites of the manifold, each cell culture module of the plurality of cell culture modules comprising:
   a chamber configured to hold a nutrient capacitive medium;
   a cell growth surface configured to support a cell culture disposed within the nutrient capacitive medium;
   a plurality of gas transfer interfaces spatially distributed in relation to the cell growth surface and configured such that the nutrient capacitive medium is in gaseous communication with a controlled gas source through the plurality of gas transfer interfaces, each of the plurality of gas transfer interface comprising:
   a plenum in gas communication with the manifold; and,
   a gas permeable membrane separating the nutrient capacitive medium and the plenum,
   wherein the plurality of gas transfer interfaces are disposed at least on sides and on a top of the cell culture such that a concentration of at least one target gas in the nutrient capacitive medium is selectively controlled by maintaining predetermined boundary conditions of the cell growth surface via the plurality of gas transfer interfaces.

2. A cell culture system comprising:
   a plurality of cell culture modules independently and releasably coupled to a manifold, each of the plurality of cell culture modules comprising:
   a chamber configured to hold a nutrient capacitive medium;
   a cell growth surface configured to support a culture disposed within the nutrient capacitive medium; and,
   a plurality of gas transfer interfaces spatially distributed in relation to the cell growth surface and configured such that the nutrient capacitive medium is in fluid communication with a controlled gas source through the plurality of gas transfer interfaces, each of the plurality of gas transfer interfaces comprising:
   a plenum in fluid communication with the manifold; and,
   a gas permeable membrane separating the nutrient capacitive medium and the plenum,
   wherein a concentration of at least one target gas in the nutrient capacitive medium is selectively controlled by maintaining predetermined boundary conditions of the cell growth surface via the plurality of gas transfer interfaces.

3. The cell culture system of claim 2, wherein at least some of the plurality of gas transfer interfaces are disposed on sides and on a top of the cell culture module such that a horizontal cell growth surface is preserved at a bottom of the cell culture module.

4. The cell culture system of claim 2, wherein at least one of the plurality of gas transfer interfaces is disposed within the nutrient capacitive medium.

5. The cell culture system of claim 2, wherein the gas transfer interfaces are configured to achieve hypoxic conditions by maintaining a sub-ambient concentration of oxygen in the plenum.

6. The cell culture system of claim 2, wherein the manifold comprises a control unit configured to control the predetermined boundary conditions in the cell culture modules coupled to the manifold.

7. The cell culture system of claim 6, wherein the control unit further comprises a pressure swing adsorption module configured to intake atmospheric gas to generate a gas mixture in a predetermined ratio, wherein the gas mixture comprises gas components of the intake atmospheric gas.

8. The cell culture system of claim 6, wherein the control unit further comprises a membrane gas concentrator configured to intake atmospheric gas to generate a gas mixture in a predetermined ratio, wherein the gas mixture comprises gas components of the intake atmospheric gas.

9. The cell culture system of claim 6, wherein the control unit further comprises a memory and a processor configured to execute programable protocols stored in the memory, wherein the memory is configured to receive user-defined protocol.

10. The cell culture system of claim 9, wherein the control unit further comprises sensor elements configured to measure conditions within the nutrient capacitive medium, wherein the programable protocols are configured to generate instructions based on the measured conditions.

11. The cell culture system of claim 6, wherein the control unit further comprises a battery such that the cell culture system is portable.

12. The cell culture system of claim 2, wherein at least one of the plurality of cell culture modules comprises a tubular gas transfer interface, wherein gas mixture is diffused radially from the tubular gas transfer interface into the nutrient capacitive medium.

13. The cell culture system of claim 2, wherein at least one of the plurality of cell culture modules comprises stackable shelves disposed vertically on each other, wherein the stackable shelves each comprise:
- a hydrophilic top layer configured to retain cells in a cell culture; and,
- a gas permeable bottom layer configured to provide oxygen to cell cultures at a lower shelf, such that a uniform gas concentration is provided at each level of the shelves and a horizontal cell growth surface is preserved.

14. The cell culture of claim 2, wherein the concentration of at least one target gas is generated based on intake from an atmospheric gas using pressure swing adsorption.

15. The cell culture of claim 2, wherein the concentration of at least one target gas is generated based on intake from an atmospheric gas using membrane separation.

16. The cell culture of claim 2, wherein the concentration of at least one target gas is controlled at hypoxic conditions relative to an in vivo environment.

17. The cell culture of claim 2, wherein the concentration of at least one target gas is controlled at hypoxic conditions relative to an in vitro environment.

18. The cell culture of claim 2, wherein the concentration of at least one target gas is controlled at normoxic conditions relative to an in vivo environment.

19. The cell culture of claim 2, wherein the concentration of at least one target gas is controlled at normoxic conditions relative to an in vitro environment.

20. The cell culture of claim 2, wherein the concentration of at least one target gas is controlled at hyperoxic conditions relative to an in vivo environment.

21. The cell culture of claim 2, wherein the concentration of at least one target gas is controlled at hyperoxic conditions relative to an in vitro environment.

22. The cell culture of claim 2, wherein a gradient of the concentration of at least one target gas from a top surface of the nutrient capacitive medium to the culture is less than 0.2%/mm.

23. The cell culture system of claim 2, wherein the plurality of cell culture modules are portable such that the nutrient capacitive medium within each of the plurality of cell culture modules comprises a gas reservoir of the predetermined controlled concentrations.

24. The cell culture system of claim 2, wherein each of the plurality of cell culture modules is enveloped by the gas permeable membrane and the plenum.

25. The cell culture system of claim 13, wherein the hydrophilic top layer is a hydrophilic polystyrene top layer.

* * * * *